United States Patent
Kim et al.

(10) Patent No.: US 11,076,365 B2
(45) Date of Patent: Jul. 27, 2021

(54) METHOD AND APPARATUS FOR TRANSMITTING AND RECEIVING DATA OF TERMINAL

(71) Applicant: Samsung Electronics Co., Ltd., Suwon-si (KR)

(72) Inventors: Youngbum Kim, Seoul (KR); Donghan Kim, Osan-si (KR); Yongjun Kwak, Yongin-si (KR); Taehyoung Kim, Seoul (KR); Seunghoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/819,842

(22) Filed: Mar. 16, 2020

(65) Prior Publication Data

US 2020/0221393 A1    Jul. 9, 2020

Related U.S. Application Data

(63) Continuation of application No. 15/821,323, filed on Nov. 22, 2017, now Pat. No. 10,595,283.

(Continued)

(30) Foreign Application Priority Data

Dec. 14, 2016 (KR) ........................ 10-2016-0170611

(51) Int. Cl.
*H04B 7/00* (2006.01)
*H04W 52/32* (2009.01)
*H04W 52/28* (2009.01)

(52) U.S. Cl.
CPC ....... *H04W 52/322* (2013.01); *H04W 52/283* (2013.01); *H04W 52/325* (2013.01)

(58) Field of Classification Search
CPC ............ H04W 52/283; H04W 52/325; H04W 52/322

See application file for complete search history.

(56) References Cited

U.S. PATENT DOCUMENTS

| 8,532,140 B2 * | 9/2013 | Shimizu ............ H04W 74/0866 370/468 |
| 2009/0168738 A1 * | 7/2009 | Trainin ................. H04W 16/14 370/342 |

(Continued)

FOREIGN PATENT DOCUMENTS

WO     2016-036142 A1     3/2016

OTHER PUBLICATIONS

ZTE et al., 'Considerations on Ss block design', 3GPP TSG RAN WG1 Meeting #87, R1-1611268, Reno, USA, Nov. 5, 2016.

(Continued)

*Primary Examiner* — Md K Talukder
(74) *Attorney, Agent, or Firm* — Jefferson IP Law, LLP

(57) ABSTRACT

A communication technique and system for converging, with Internet of things (IoT) technology, a $5^{th}$ generation (5G) communication system for supporting a higher data transmission rate beyond a $4^{th}$ generation (4G) system is provided. The present disclosure may be applied to intelligent services (for example, smart homes, smart buildings, smart cities, smart cars or connected cards, health care, digital education, retail business, security and safety related services, etc.), on the basis of the 5G communication technology and IoT associated technology. According to an embodiment, a method of a terminal in a wireless communication system is provided. The method includes receiving system information, identifying power information for a synchronization signal and a broadcast channel, based on the system information, and transmitting and receiving a signal, based on the power information. In this method, the power (Continued)

information for the synchronization signal and the broadcast channel are set equally.

16 Claims, 40 Drawing Sheets

Related U.S. Application Data

(60) Provisional application No. 62/425,369, filed on Nov. 22, 2016.

(56) References Cited

U.S. PATENT DOCUMENTS

| | | | |
|---|---|---|---|
| 2010/0240367 A1* | 9/2010 | Lee | H04W 36/0077 455/435.2 |
| 2011/0249635 A1* | 10/2011 | Chen | H04W 74/002 370/329 |
| 2012/0275428 A1* | 11/2012 | Feng | H04L 5/0064 370/330 |
| 2015/0078300 A1 | 3/2015 | Xu et al. | |
| 2016/0066215 A1* | 3/2016 | Yang | H04W 16/14 455/454 |
| 2016/0302228 A1* | 10/2016 | Kazmi | H04L 1/1887 |
| 2016/0337893 A1 | 11/2016 | Gheorghiu et al. | |
| 2017/0272299 A1* | 9/2017 | Chae | H04W 52/54 |
| 2018/0146439 A1* | 5/2018 | Kim | H04W 52/322 |
| 2018/0220345 A1* | 8/2018 | Moon | H04B 7/0695 |
| 2020/0221393 A1* | 7/2020 | Kim | H04W 52/322 |

OTHER PUBLICATIONS

Samsung, 'Carrier raster and synchronization signal transmission', 3GPP TSG RAN WG1 Meeting #86bis, R1-1609114, Lisbon, Portugal, Sep. 30, 2016.
Samsung, 'Multiplexing of synchronization signals and system information delivery channels for below 6 GHz and above 6 GHz', 3GPP TSG RAN WG1 Meeting #86bis, R1-1609111, Lisbon, Portugal, Sep. 30, 2016.
International Search Report dated Feb. 27, 2018, issued in International Application No. PCT/KR2017/013350.
Mediatek Inc, "Discussion on inital access for NR", 3GPP Draft, R1-167542, Discussion on Inital Access in NR, 3rd Generation Partnership Project (3GPP), Mobile Competence Cenrew, 650, Route Des Lucioles, F-06921 Sophia-Antipolis Cedex, France, vol. RAN WG1, Gothenburg, Sweden, Aug. 22, 2016-Aug. 26, 2016, Aug. 21, 2016, XP051125968, Retrieved from the Internet: URL: http://www.3gpp.org/ftp/Meetings_3GPP_SYNC/RAN1/Docs/ [retrieved on Aug. 21, 2016].
Qualcomm Incorporated, "Open Issues on BWP", 3GPP Draft, R1-1720693, Open Issues on BWP, 3rd Generation Partnership Project (3GPP), Mobile Competence Centre, 650, Route Des Lucioles, F-06921 Sophia-Antipolis Cedex, France, vol. RAN WG1, Reno, NV, USA, Nov. 27, 2017-Dec. 1, 2017, Nov. 18, 2017, XP051370154, Retrieved from the Internet: URL: http://www.3gpp.org/ftp/tsg%5FranWG1%5FRL1/TSGR1%5F91/Docs/ [retrieved on Nov. 18, 2017].
Interdigital et al, "Details of BWP switching operation", 3GPP Draft, R1-1720556 (R15 NR WI AI 7341 Details of BWP Switching Operation), 3rd Generation Partnership Project (3GPP), Mobile Competence Centre, 650, Route Des Lucioles, F-06921 Sophia-Antipolis, vol. RAN WG1, Reno, U.S.A, Nov. 27, 2017-Dec. 1, 2017, Nov. 18, 2017, XP051370043, Retrieved from the Internet: URL: http://www.3gpp.org/ftp/tsg%5Fran/WG1%5FRL1/TSGR1%5F91/Docs/ [retrieved on Nov. 18, 2017].
Huawei et al, "Support of flexible bandwidth", 3GPP Draft, R1-1608841, 3rd Generation Partnership Project (3GPP), Mobile Competence Centre, 650, Route Des Lucioles, F-06921 Sophia-Antipolis Cedex, France, vol. RAN WG1, Lisbon, Portugal, Oct. 10, 2016-Oct. 14, 2016, Oct. 9, 2016, XP051148895, Retrieved from the Internet: URL: http://www.3gpp.org/ftp/Meetings_3GPP_SYNC/RAN1/Docs/ [retrieved on Oct. 9, 2016].
Extended European Search Report dated Sep. 6, 2019, issued in European Patent Application No. 17874041.1.
Extended European Search Report dated Apr. 12, 2021, issued in European Patent Application No. 20217072.6.

* cited by examiner

METHOD AND APPARATUS FOR TRANSMITTING AND RECEIVING DATA OF TERMINAL

CROSS-REFERENCE TO RELATED APPLICATION(S)

This application is a continuation application of prior application Ser. No. 15/821,323, filed on Nov. 22, 2017, which was based on and claimed priority under 35 U.S.C. § 119(e) of a U.S. Provisional application Ser. No. 62/425,369 filed on Nov. 22, 2016, in the U.S. Patent and Trademark Office, and under 35 U.S.C. § 119(a) of a Korean patent application number 10-2016-0170611, filed on Dec. 14, 2016, in the Korean Intellectual Property, the disclosure each of which is incorporated by reference herein in its entirety.

TECHNICAL FIELD

The present disclosure relates to a cellular wireless communication system. More particularly, the present disclosure relates to a method for adjusting transmission and reception bandwidth of a terminal.

In addition, the present disclosure relates to a mobile communication system and, more particularly, to a method of transmitting and receiving data at a terminal.

Further, the present disclosure relates to a wireless communication system and, more particularly, to a method and apparatus for generating and transmitting a synchronization signal at a base station in a next generation mobile communication so as to support initial access and inter-cell movement of a terminal in a cell. Also, the present disclosure relates to a method and apparatus for performing time and frequency synchronization and cell search at a terminal in response to a synchronization signal transmitted from a base station in a next generation mobile communication.

BACKGROUND

To meet a demand for radio data traffic that is on an increasing trend since commercialization of a 4$^{th}$ generation (4G) communication system, efforts to develop an improved 5$^{th}$ generation (5G) communication system or a pre-5G communication system have been conducted. For this reason, the 5G communication system or the pre-5G communication system is called a beyond 4G network communication system or a post long term evolution (LTE) system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive multiple-input and multiple-output (MIMO), full dimensional MIMO (FD-MIMO), array antenna, analog beamforming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid frequency shift keying (FSK) and quadrature amplitude modulation (QAM) modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for adjusting transmission and reception bandwidth of a terminal in a cellular wireless communication system.

Another aspect of the present disclosure is to provide a data transmission and reception method for enhancing frequency efficiency in a mobile communication system.

Further, the 5th generation wireless cellular communication system is required to support a variety of services having different transmission/reception techniques and different transmission/reception parameters in one system so as to satisfy user's various requirements and services. Also, the 5G communication system should be able to provide forward compatibility so that new communication services and applications to be provided in the future will not be restricted in accordance with design specifications of the current system. According to the 5G design requirements, the present disclosure is to provide a method and apparatus in which a base station transmits a synchronous signal capable of supporting efficient time/frequency synchronization and cell search of a terminal.

Another aspect of the present disclosure is to provide a method and apparatus in which a terminal efficiently performs time and frequency synchronization and cell search in response to a synchronization signal transmitted by a base station.

In accordance with an aspect of the present disclosure, a method of a terminal in a wireless communication system is provided. The method includes receiving system information, identifying power information for a synchronization signal and a broadcast channel, based on the system information, and transmitting and receiving a signal, based on the power information, wherein the power information for the synchronization signal and the broadcast channel are set equally.

In accordance with an aspect of the present disclosure, a method of a base station in a wireless communication system is provided. The method includes transmitting system information including power information for a synchronization signal and a broadcast channel, and transmitting and receiving a signal, based on the power information, wherein the power information for the synchronization signal and the broadcast channel are set equally.

In accordance with an aspect of the present disclosure, a terminal in a wireless communication system is provided. The terminal includes a transceiver, and a controller electrically coupled with the transceiver and configured to receive system information, to identify power information for a synchronization signal and a broadcast channel, based on the system information, and to transmit and receive a signal, based on the power information, wherein the power information for the synchronization signal and the broadcast channel are set equally.

In accordance with an aspect of the present disclosure, a base station in a wireless communication system is provided. The base station includes a transceiver, and a controller electrically coupled with the transceiver and configured to transmit system information including power information for a synchronization signal and a broadcast channel, and to transmit and receive a signal, based on the power information, wherein the power information for the synchronization signal and the broadcast channel are set equally.

In accordance with an aspect of the present disclosure, a method of a terminal in a wireless communication system is provided. The method includes receiving a bandwidth adjusting command, transmitting a response to the bandwidth adjusting command, and transmitting and receiving a signal in a bandwidth changed according to the bandwidth adjusting command. The method of the terminal may further include determining whether a timer expires, and transmitting and receiving a signal in a bandwidth before change, when the timer expires. In the method of the terminal, the receiving the bandwidth adjusting command may further include reporting information on bandwidth adjusting capability of the terminal. In the method of the terminal, the signal is transmitted and received in the changed bandwidth after a bandwidth transition time elapses from a time point of receiving the bandwidth adjusting command, and the bandwidth transition time is determined based on the information on the bandwidth adjusting capability of the terminal.

In accordance with an aspect of the present disclosure, a method of a base station in a wireless communication system is provided. The method includes transmitting a bandwidth adjusting command, receiving a response to the bandwidth adjusting command, and transmitting and receiving a signal in a bandwidth changed according to the bandwidth adjusting command.

In accordance with an aspect of the present disclosure, a terminal in a wireless communication system is provided. The terminal includes a transceiver, and a controller configured to receive a bandwidth adjusting command, to transmit a response to the bandwidth adjusting command, and to transmit and receive a signal in a bandwidth changed according to the bandwidth adjusting command.

In accordance with an aspect of the present disclosure, a base station in a wireless communication system is provided. The base station includes a transceiver, and a controller configured to transmit a bandwidth adjusting command, to receive a response to the bandwidth adjusting command, and to transmit and receive a signal in a bandwidth changed according to the bandwidth adjusting command.

In accordance with an aspect of the present disclosure, a method of a terminal in a wireless communication system is provided. The method includes receiving control information, determining whether slot aggregation is applied to a slot which is a basic time unit for performing scheduling based on the control information, and decoding the control information in units of an aggregated slot when the slot aggregation is applied. In this method, when the slot aggregation is applied, one transport block is repeatedly mapped to at least one slot. In this method, when the slot aggregation is applied, transmission power is adjusted in units of the aggregated slot. In this method, when the slot aggregation is applied, a hybrid automatic repeat request (HARQ) soft buffer is allocated for each HARQ process based on the number of aggregated slots.

In accordance with an aspect of the present disclosure, a method of a base station in a wireless communication system is provided. The method includes determining whether slot aggregation is applied to a slot which is a basic time unit for performing scheduling based on the control information, and transmitting control information in units of an aggregated slot when the slot aggregation is applied.

In accordance with an aspect of the present disclosure, a terminal in a wireless communication system is provided. The terminal includes a transceiver, and a controller configured to receive control information, to determine whether slot aggregation is applied to a slot which is a basic time unit for performing scheduling based on the control information, and to decode the control information in units of an aggregated slot when the slot aggregation is applied.

In accordance with an aspect of the present disclosure, a base station in a wireless communication system is provided. The base station includes a transceiver, and a controller configured to determine whether slot aggregation is applied to a slot which is a basic time unit for performing scheduling based on the control information, and to transmit control information in units of an aggregated slot when the slot aggregation is applied.

The present disclosure may reduce the power consumption of a terminal by defining a method for adjusting the transmission/reception bandwidth of the terminal in a mobile communication system.

In addition, the present disclosure may improve the frequency efficiency by defining a data transmission/reception method of a terminal in a mobile communication system.

In addition, as described above, a base station for constituting the 5G communication system according to an embodiment of the present disclosure may transmit a synchronization signal for efficient synchronization of a terminal. In addition, the terminal may access the base station by performing the time and frequency synchronization in response to the synchronization signal transmitted by the base station.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
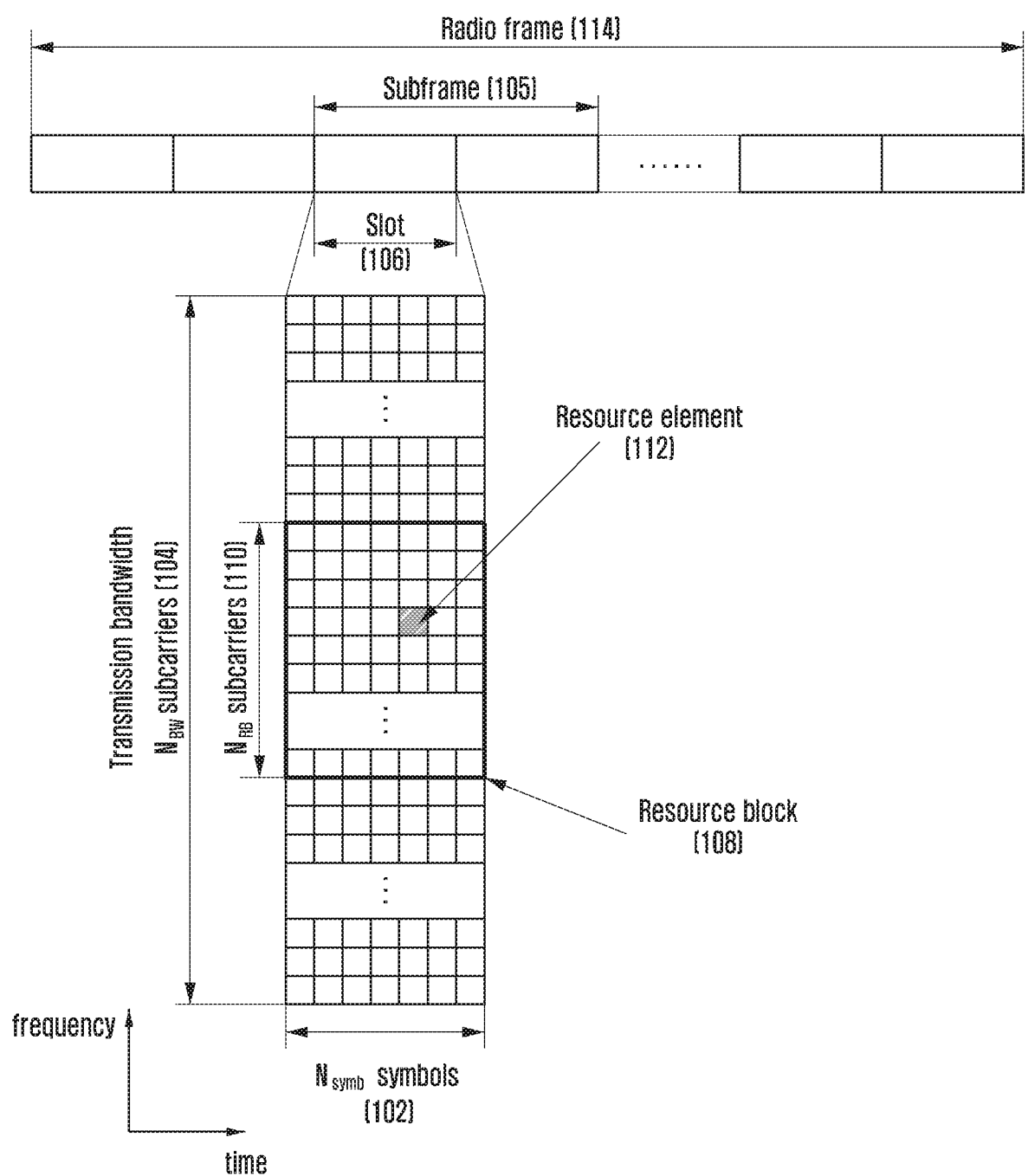
FIG. 1 is a diagram illustrating a basic structure of a time-frequency resource area which is a radio resource area in which data or control channels of long term evolution (LTE) and LTE-advanced (LTE-A) systems are transmitted according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the embodiments, descriptions of techniques which are well known in the art to which the present disclosure belongs and which are not directly related to the present disclosure will not be described or illustrated in detail. This is to avoid obscuring the subject matter of the present disclosure.

For the same reason, some elements are exaggerated, omitted or shown schematically in the accompanying drawings. Also, the size of each element does not entirely reflect the actual size. In the drawings, the same or corresponding elements are denoted by the same reference numerals.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. To fully disclose the scope of the disclosure to those skilled in the art, and the disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented to drive one or more CPUs in a device or a secure multimedia card. Also, in embodiments, a unit may include one or more processors.

First Embodiment

In order to handle mobile data traffic that has recently exploded, there is a lively discussion on a new radio access technology (NR) or a next generation communication system after long term evolution (LTE), also referred to as evolved universal terrestrial radio access (E-UTRA), and LTE-advanced (LTE-A), also referred to as E-UTRA evolution. Compared to the existing mobile communication system that focuses on traditional voice/data communication, the 5G system aims to satisfy various services and requirements such as an enhanced mobile broadband (eMBB) service, an ultra-reliable and low-latency communication (URLLC) service, and a massive machine type communication (massive MTC) service for supporting mass communication of things.

While the bandwidth of a system transmission bandwidth per single carrier of the existing LTE and LTE-A is limited to a maximum of 20 MHz, the 5G system aims at a high-speed data service of several Gbps by utilizing a greater ultra-wide bandwidth. Thus, the 5G system considers, as a frequency candidate, ultra-high frequency bands from several GHz to 100 GHz which are relatively easy to secure the ultra-wide bandwidth frequency. In addition, the 5G system further considers securing the wide bandwidth frequency through frequency relocation or allocation among frequency bands of several hundred MHz to several GHz used in the existing mobile communication system.

The radio wave in the ultra-high frequency band has a wavelength of several millimeters and is thus called a millimeter wave (mmWave). However, in the ultra-high frequency band, the path loss of radio waves increases in proportion to the frequency band, and therefore the coverage of the mobile communication system becomes small.

In order to overcome the shortcomings of a reduction in the coverage of the ultra-high frequency band, a beamforming technique for concentrating the radiation energy of radio waves to a certain target point by using a plurality of antennas to increase the range of radio waves is becoming important. The beamforming technique may be applied to both transmitting and receiving ends. In addition to the effect of increasing the coverage, the beamforming technique has the effect of reducing interference in regions other than a beamforming direction. For a proper operation of the beamforming technique, an accurate transmit/receive beam measurement and feedback method is required.

Another requirement of the 5G system is an ultra-low latency service having a transmission delay of about 1 ms between the transmitting and receiving ends. As a way to reduce the transmission delay, it is necessary to design a frame structure based on a shorter transmission time interval (TTI) in comparison with the LTE and the LTE-A. The TTI is a basic time unit of scheduling, and the TTI of the existing LTE and LTE-A systems is 1 ms corresponding to the length of one subframe. Meanwhile, short TTIs to meet the requirements for the ultra-low latency service of the 5G system may be 0.5 ms, 0.2 ms, 0.1 ms, etc. shorter than that of the existing LTE and LTE-A systems. Hereinafter, the frame structure of the LTE and LTE-A systems will be described with reference to the drawings, and then a design concept of the 5G system will be described.

FIG. 1 is a diagram illustrating a basic structure of a time-frequency resource area which is a radio resource area in which data or control channels of LTE and LTE-A systems are transmitted according to an embodiment of the present disclosure.

Referring to FIG. 1, the horizontal axis represents the time domain, and the vertical axis represents the frequency domain. An uplink (UL) refers to a radio link through which a terminal transmits data or a control signal to a base station, and a downlink (DL) refers to a radio link through which a base station transmits data or a control signal to a terminal. The minimum transmission units in the time domain of the LTE and LTE-A systems are orthogonal frequency division multiplexing (OFDM) symbols for downlink and single carrier frequency division multiple access (SC-FDMA) symbols. $N_{symb}$ symbols 102 constitute one slot 106, and two slots constitute one subframe 105. The length of the slot is 0.5 ms, and the length of the subframe is 1.0 ms. A radio frame 114 is the time domain unit composed of ten subframes. The minimum transmission unit in the frequency domain is a subcarrier (subcarrier spacing=15 kHz), and the entire system transmission bandwidth is composed of $N_{BW}$ subcarriers 104.

In the time and frequency domains, a basic unit of resources, i.e., a resource element (RE) 112, may be represented by an OFDM symbol or SC-FDMA symbol index and a subcarrier index. A resource block (RB) 108 or a physical resource block (PRB) is defined as $N_{symb}$ consecutive OFDM symbols 102 or SC-FDMA symbols in the time domain and $N_{RB}$ consecutive subcarriers 110 in the frequency domain. Therefore, one RB 108 is composed of REs 112 of $N_{symb}$ by $N_{RB}$. In the LTE and LTE-A systems, data is mapped in units of RB, and the base station performs scheduling for the terminal in units of a RB-pair which forms one subframe. The number of SC-FDMA symbols or OFDM symbols, $N_{symb}$, is determined depending on the length of a cyclic prefix (CP) added to each symbol in order to prevent inter-symbol interference. For example, when a normal CP is applied, the $N_{symb}$ is seven, and when an extended CP is applied, the $N_{symb}$ is six. The extended CP may be applied to a system having a relatively greater radio propagation distance in comparison with the normal CP, thereby maintaining the orthogonality between symbols.

The subcarrier spacing, the CP length, and the like are information essential for OFDM transmission and reception, so that the base station and the terminal need to be aware of such information as a common value to enable smooth transmission and reception.

The $N_{BW}$ and the $N_{RB}$ are proportional to the bandwidth of the system transmission band. The data rate increases in proportion to the number of RBs scheduled to the terminal.

The above-discussed frame structure of the LTE and LTE-A systems is designed in consideration of typical voice/data communication, thus confronting restrictions on scalability to satisfy various services and requirements in the 5G system. Therefore, in 5G system, it is necessary to define and operate the frame structure flexibly by considering various services and requirements.

Figure 2:
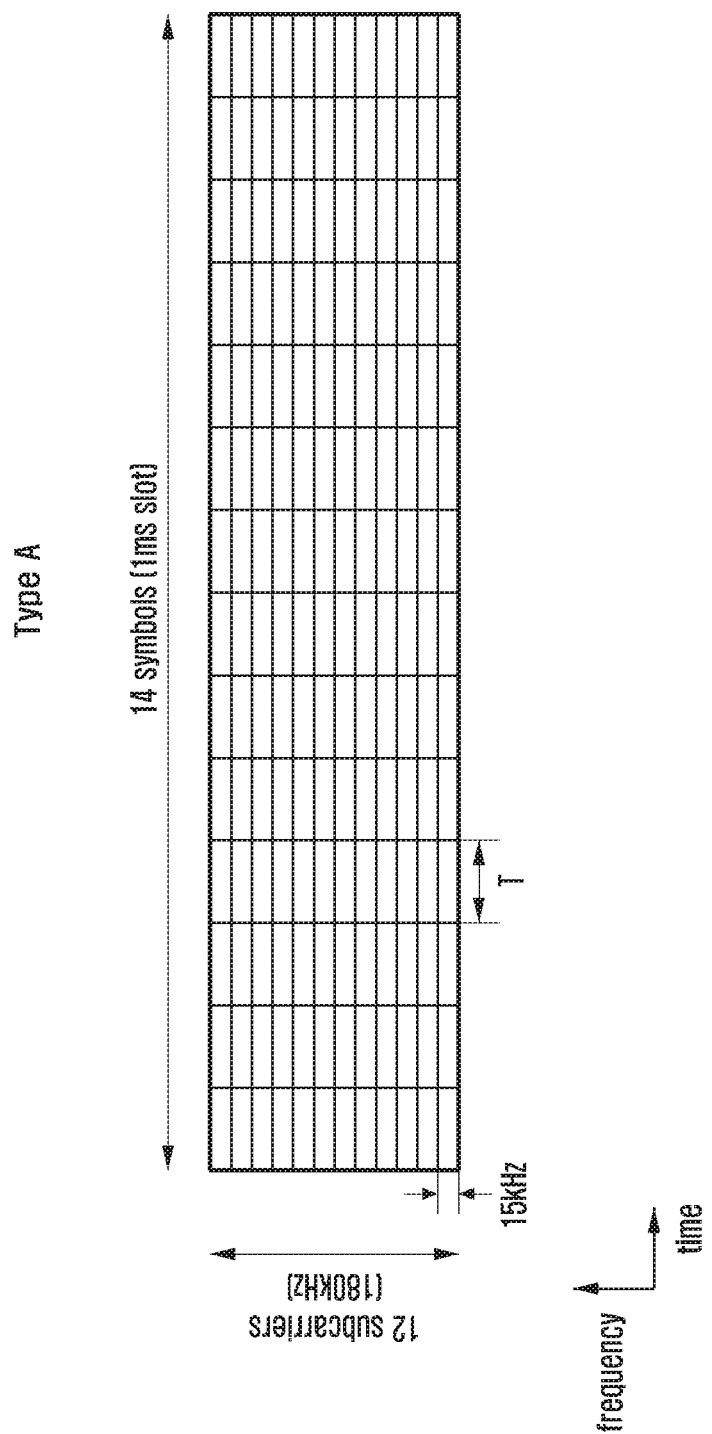
FIG. 2 is a diagram illustrating an example of an extended frame structure of a $5^{th}$ generation (5G) system according to an embodiment of the present disclosure.
Figure 3:
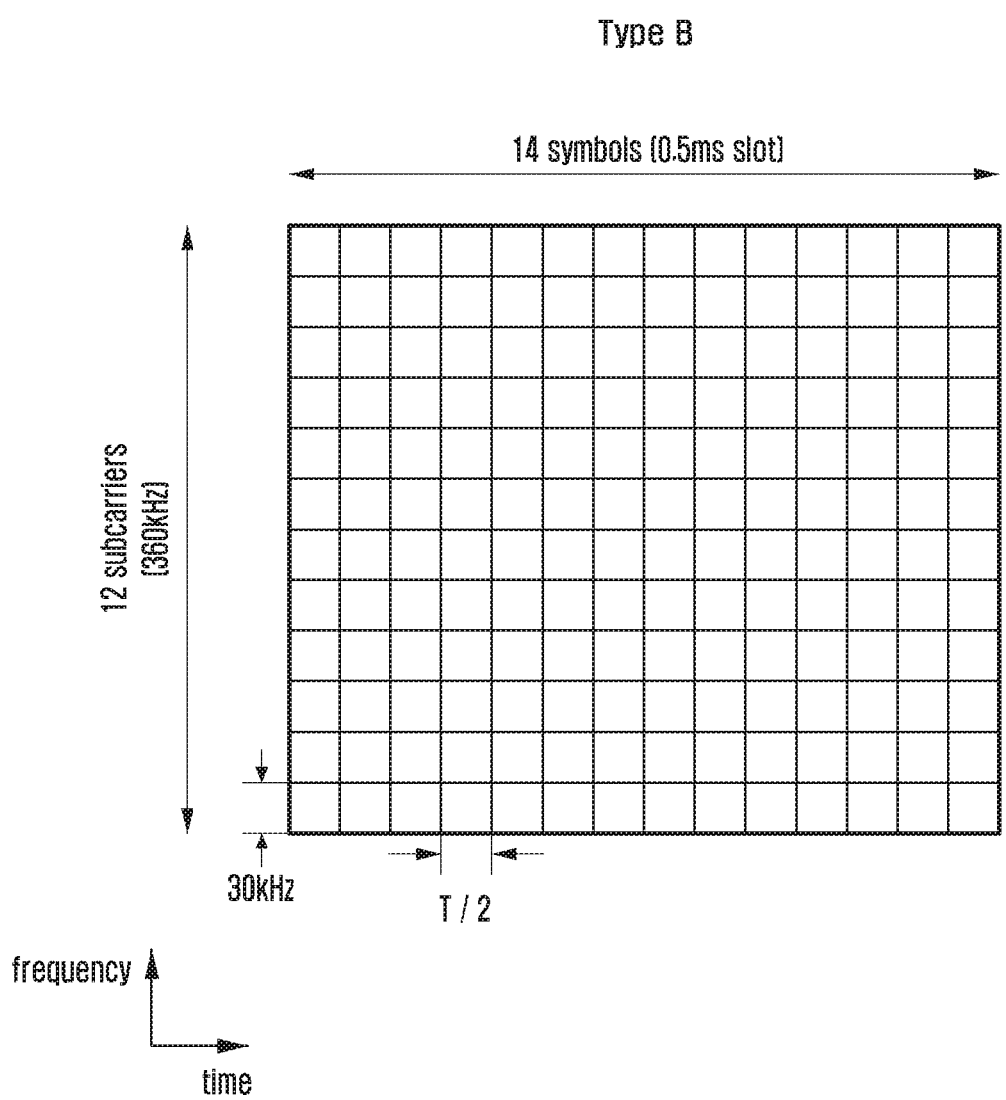
FIG. 3 is a diagram illustrating another example of an extended frame structure of a 5G system according to an embodiment of the present disclosure.
Figure 4:
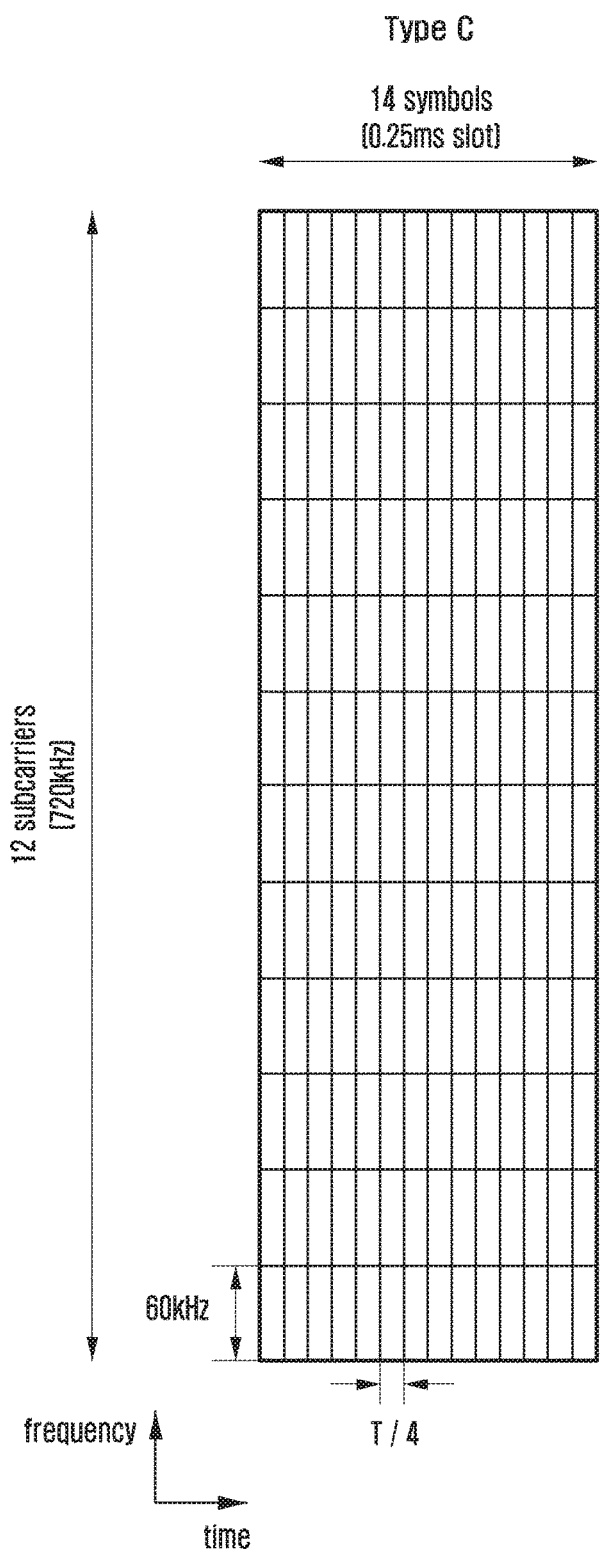
FIG. 4 is a diagram illustrating still another example of an extended frame structure of a 5G system according to an embodiment of the present disclosure.

FIGS. 2 to 4 are diagrams illustrating examples of the extended frame structure according to an embodiment of the present disclosure.

Referring to FIGS. 2 to 4, a set of essential parameters for defining the extended frame structure includes the subcarrier spacing, the CP length, the slot length, and the like. In the 5G system, the basic time unit for scheduling is referred to as a slot.

At the beginning of the introduction, the 5G system is expected to coexist with the existing LTE/LTE-A systems or operate in dual mode. This may enable the existing LTE/LTE-A systems to provide a stable system operation and also enable the 5G system to provide an enhanced service. Therefore, the extended frame structure of the 5G system needs to include at least the frame structure or a set of essential parameters of the LTE/LTE-A systems.

FIG. 2 shows a 5G frame structure, or a set of essential parameters, identical with the LTE/LTE-A frame structure. Referring to FIG. 2, in a frame structure type A, the subcarrier spacing is 15 kHz, 14 symbols constitute the slot of 1 ms, and 12 subcarriers (=180 kHz=12×15 kHz) constitute the PRB.

FIG. 3 shows a frame structure type B in which the subcarrier spacing is 30 kHz, 14 symbols constitute the slot of 0.5 ms, and 12 subcarriers (=360 kHz=12×30 kHz) constitute the PRB. Namely, in the frame structure type B in comparison with the frame structure type A, the subcarrier spacing and the PRB size increase two times, and the slot length and the symbol length decrease two times.

FIG. 4 shows a frame structure type C in which the subcarrier spacing is 60 kHz, 14 symbols constitute the symbol of 0.25 ms, and 12 subcarriers (=720 kHz=12×60 kHz) constitute the PRB. Namely, in the frame structure type C in comparison with the frame structure type A, the subcarrier spacing and the PRB size increase four times, and the slot length and the symbol length decrease four times.

That is, when generalized, the subcarrier spacing, the CP length, the slot length, etc., which are a set of essential parameters, have the relation of integer multiple in the frame structure types, thereby providing high scalability. In addition, the subframe having a fixed length of 1 ms is defined to indicate a reference time unit irrelevant to the frame structure type. Accordingly, one subframe is composed of one slot in the frame structure type A, composed of two slots in the frame structure type B, and composed of four slots in the frame structure type C.

The above-described frame structure types may be selectively applied to various scenarios. From the viewpoint of cell size, the frame structure type A having a greater CP length may support a larger cell in comparison with the frame structure types B and C. From the viewpoint of the operating frequency band, the greater the subcarrier spacing is, the more favorable the phase noise recovery in the high frequency band is. Therefore, the frame structure type C may support a higher operating frequency than the frame structure types A and B. From the viewpoint of the service, it is advantageous to shorten the subframe length to support an ultra low latency service like URLLC. Therefore, the frame structure type C is suitable for the URLLC service as compared with the frame structure types A and B.

In addition, the above-discussed frame structure types may be integrated for one system.

As described above, in order to achieve high-speed data services of several Gbps, the 5G system considers signal transmission and reception in an ultra-wide bandwidth of tens or hundreds MHz or several GHz. However, considering that the power consumption increases in proportion to the transmission/reception bandwidth, it is necessary to efficiently manage the power consumption of the terminal or the base station through the adjustment of the transmission/reception bandwidth. While the base station can be powered at all times, the terminal has a relatively higher need for efficient power consumption management due to battery capacity limitations.

The present disclosure proposes a method for efficiently managing the power consumption of the terminal by changing the transmission/reception bandwidth of the terminal to a narrow band at the base station when the terminal does not need to transmit and receive an ultra-wideband signal.

Hereinafter, the present disclosure will be described in detail through embodiments.

First Embodiment—1

Figure 5:
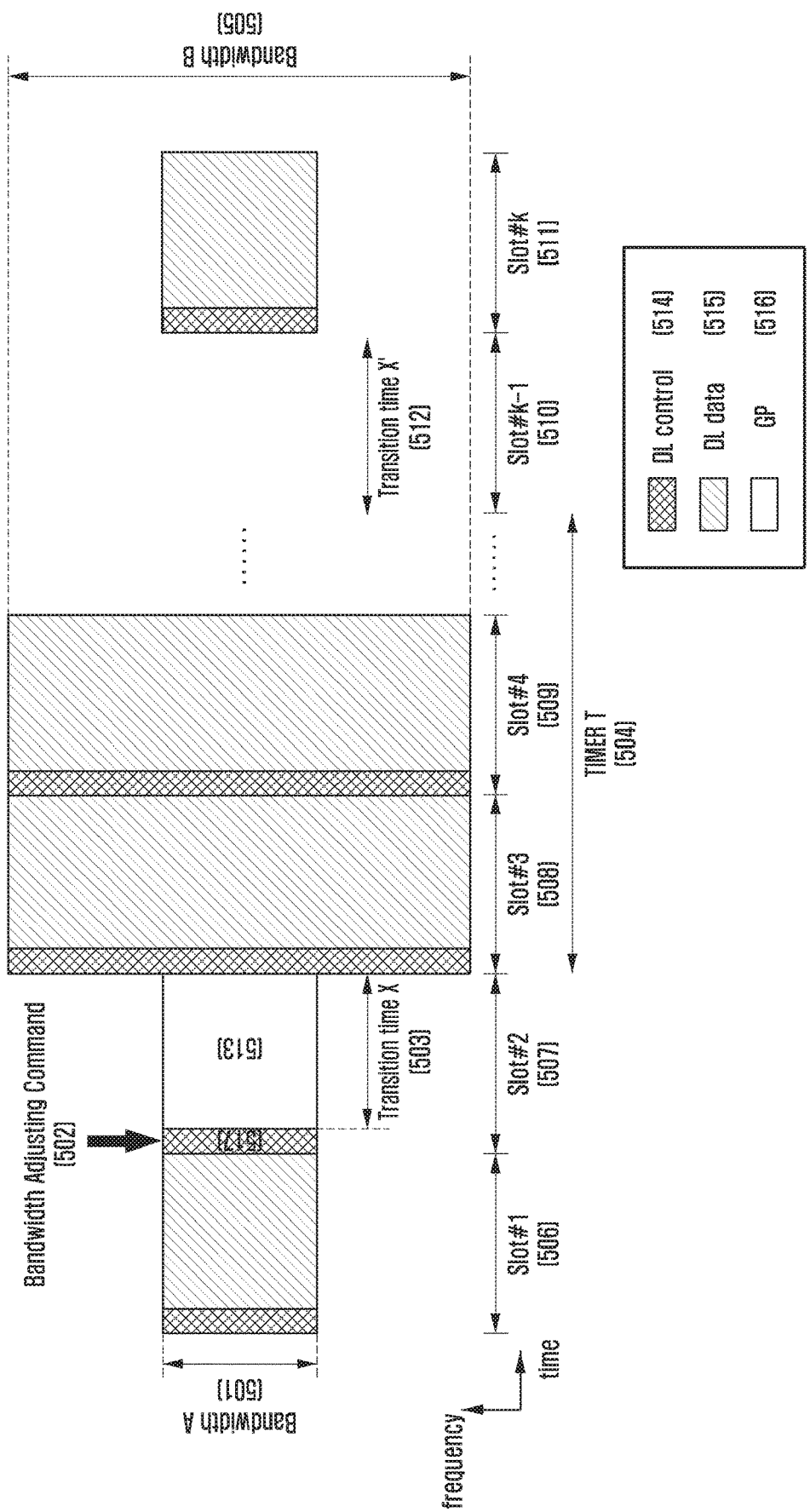
FIG. 5 is a diagram illustrating a method for efficiently managing terminal power consumption by adjusting the transmission/reception bandwidth according to an embodiment of the present disclosure.

FIG. 5 is a diagram illustrating a method for efficiently managing terminal power consumption by adjusting the transmission/reception bandwidth according to an embodiment of the present disclosure.

Referring to FIG. 5, the horizontal axis represents the time domain, and the vertical axis represents the frequency domain. DL control channel 514, a DL data channel 515, and a GP 516 are shown. In this example of FIG. 5, the terminal receives a DL control channel and a DL data channel corresponding to bandwidth A 501 at most from the base station in the slot #1 506. The bandwidth A may be a predetermined reference bandwidth, a bandwidth determined at the initial access of the terminal, or a bandwidth determined through setting between the terminal and the base station.

When the base station instructs the terminal to change the bandwidth of the terminal to bandwidth B 505 through a bandwidth adjusting command 502 in the slot #2 507, the terminal acquires the command and then performs a bandwidth transition operation. In this example of FIG. 5, it is assumed that the bandwidth B is greater than the bandwidth A. The bandwidth A and the bandwidth B may be expressed in PRB units. The terminal needs a certain time to successfully receive the bandwidth adjusting command and acquire it through decoding, and also needs a certain time to change the setting of a terminal RF module for the bandwidth transition. In this example of FIG. 5, it is assumed that the terminal needs bandwidth transition time X 503 at most from receiving the bandwidth adjusting command to completing the bandwidth transition. In this example of FIG. 5, the bandwidth adjusting command 502 is included in a downlink control channel 517 and transmitted to the terminal. In addition, the downlink signal reception or the uplink signal transmission of the terminal does not occur during a certain time period 513.

The terminal completes the bandwidth transition to the bandwidth B within the bandwidth transition time X and then operates in the bandwidth B from the slot #3 508. Therefore, the base station may transmit a signal corresponding to the bandwidth B at most to the terminal from the slot #3 508. In this example of FIG. 5, the base station transmits the DL control channel and the DL data channel corresponding to the bandwidth B at most to the terminal in the slot #3 508 and the slot #4 509.

If the base station desires to instruct the terminal to change or return or restore the bandwidth to the bandwidth A after the slot #3 508, the bandwidth transition of the terminal may be performed through at least one of the following two methods.

Terminal Bandwidth Reduction (Restoration) Method 1 (Implicit Method): The terminal sets a timer T 504 and automatically changes to the original bandwidth A when the timer T 504 expires. The terminal starts the countdown of the timer T 504 when the bandwidth B begins to be applied. In case of FIG. 5, the terminal starts the countdown of the timer T 504 at the time of the slot #3 508, and the timer T 504 expires just before the slot #k−1 510. When the timer T 504 expires, the terminal performs the bandwidth transition from the bandwidth B to the bandwidth A. After a predetermined bandwidth transition time X' 512 elapses, the terminal operates in the bandwidth A from the slot #k 511. The bandwidth transition time X' 512 may be equal to or different from the bandwidth transition time X 503. The bandwidth transition time X' 512 may be included in a time interval of the timer T 504. If the terminal receives additional scheduling from the base station before the timer T 504 expires, the timer T 504 may extend a time span of applying the bandwidth B by stopping the countdown for a certain time or resetting the timer T 504.

Terminal Bandwidth Reduction (Restoration) Method 2 (Explicit Method): The base station instructs the terminal to change to the bandwidth A through explicit signaling on the bandwidth adjusting command. However, excessively frequent bandwidth transition may cause unnecessary power consumption of the terminal. Therefore, after signaling of the bandwidth adjusting command, the base station may not further transmit the bandwidth adjusting command for a given time.

The bandwidth transition time X, the bandwidth transition time X', and the timer T 504 are previously notified to the terminal by the base station through signaling or use fixed values. The signaling is at least one of physical layer signaling, MAC layer signaling, and RRC signaling. The units of the bandwidth transition time X, the bandwidth transition time X', and the timer T 504 may be a symbol length, a slot length, a subframe length, or the like. In addition, regarding the setting of the bandwidth transition time X, the bandwidth transition time X', and the timer T504, the base station may apply different values to each terminal according to the terminal capability. For example, even if the bandwidth transition time X, the bandwidth transition time X', and the timer T 504 are set to relatively small values, a high-capability terminal having excellent processing performance may execute and complete the bandwidth transition within a relevant time. That is, the high-capability terminal may reduce a delay that may occur during the bandwidth transition. In order to support such terminal-specific setting, the terminal may report its capability including bandwidth transition processing capability to the base station, and then the base station may inform the terminal on the terminal-specific setting determined considering the received capability of the terminal. Alternatively, an association rule may be predefined between the capability of the terminal and at least the bandwidth transition time X and the bandwidth transition time X'. In this case, since the base station does not have to signal the setting information on the bandwidth transition time X and the bandwidth transition time X' to the terminal, the signaling overhead is reduced. For example, the association rule may be defined as follows.

Terminal capability 1→ {bandwidth transition time X1, bandwidth transition time X1'}, Terminal capability 2→ {bandwidth transition time X2, bandwidth transition time X2'}, Terminal capability 3→ {bandwidth transition time X3, bandwidth transition time X3'},

. . .

If the bandwidth transition time X and the bandwidth transition time X' are sufficiently short, the bandwidth of the terminal may be changed within the slot in which the bandwidth adjusting command is transmitted. Otherwise, the slot in which the bandwidth adjusting command is transmitted may be different from the slot in which the terminal completes the bandwidth adjustment and applies the changed bandwidth.

The bandwidth adjusting command 502 may be represented by 1 bit at least to N bits at most (N>1).

Bandwidth Adjusting Command Construction Method 1 (1 bit): If there are two bandwidths, i.e., the bandwidth A and the bandwidth B, adjustable by the terminal, the bandwidth to be applied by the terminal may represented by 1 bit. For example, 1-bit information '0' indicates the bandwidth A, and 1-bit information '1' indicates the bandwidth B.

Bandwidth Adjusting Command Construction Method 2 (N bits): 2N adjustable bandwidths may be represented by N bits. For example, if the adjusting command is 2 bits, '00', '01', '10', and '11' indicate bandwidth A, bandwidth B, 'bandwidth C', and 'bandwidth D', respectively.

The base station may transmit the bandwidth adjusting command 502 to the terminal through at least one of physical layer signaling, MAC layer signaling, and RRC signaling. Among them, the physical layer signaling is characterized by allowing the quick processing of the terminal. The base station may signal the bandwidth adjusting command to each terminal individually (i.e., UE-specific signaling) or to a plurality of terminals in the cell at once (i.e., UE-group-specific or common signaling).

Normally, in order for the base station to transmit DL data to the terminal or for the terminal to transmit UL data to the base station, the base station transmits scheduling information, including radio resource allocation information about the DL or UL data, modulation and coding scheme (MCS) related control information, HARQ related control information, etc., to the terminal through the DL control channel. The base station may signal the bandwidth adjusting command 502 to the terminal through at least one of the following two methods.

Bandwidth Adjusting Command Transmission Method A: The base station transmits the bandwidth adjusting command 502 to the terminal by including it in the scheduling information. When receiving DL data indicated by the scheduling information, the terminal sends, as feedback, HARQ-ACK/NACK indicating the successful reception of the DL data or not to the base station. Through this feedback, the terminal may indirectly notify the successful acquisition of the bandwidth adjusting command to the base station. In other words, if the terminal sends the HARQ-ACK/NACK to the base station, this means that the terminal completely decodes the DL data, successfully receives the scheduling information for scheduling the DL data, and successfully acquires the bandwidth adjusting command contained in the scheduling information. Similarly, if the terminal transmits the UL data indicated by the scheduling information to the base station, this means that the terminal indirectly notify the successful acquisition of the bandwidth adjusting command contained in the scheduling information to the base station.

Bandwidth Adjusting Command Transmission Method B: The base station constructs the bandwidth adjusting command 502 in a separate control channel independently of the scheduling information and transmits it to the terminal. Thus, even when the base station does not schedule data transmission to the terminal in a given time interval, the base station may signal the bandwidth adjusting command to the terminal through the separate control channel. In case of the method B, the terminal feeds back the successful reception of the bandwidth adjusting command to the base station, so that the terminal and the base station have a common understanding of the terminal bandwidth. For example, if the terminal successfully receives the bandwidth adjusting command, the terminal transmits bandwidth adjusting command response control information to the base station so as to notify the successful reception of the bandwidth adjusting command. If the terminal fails to successfully receive the bandwidth adjusting command, the terminal does not transmit the bandwidth adjusting command response control information to the base station. Therefore, if the bandwidth adjusting command response control information is not received from the terminal, the base station recognizes that the terminal has not successfully received the bandwidth adjusting command Through this operation, it is possible to minimize any unnecessary transmission operation of the terminal and to reduce the power consumption of the terminal.

If the terminal notifies the bandwidth adjusting command response to the base station directly or indirectly according to the bandwidth adjusting command transmission method A or B of the base station, the bandwidth transition time X may be increased.

Figure 6:
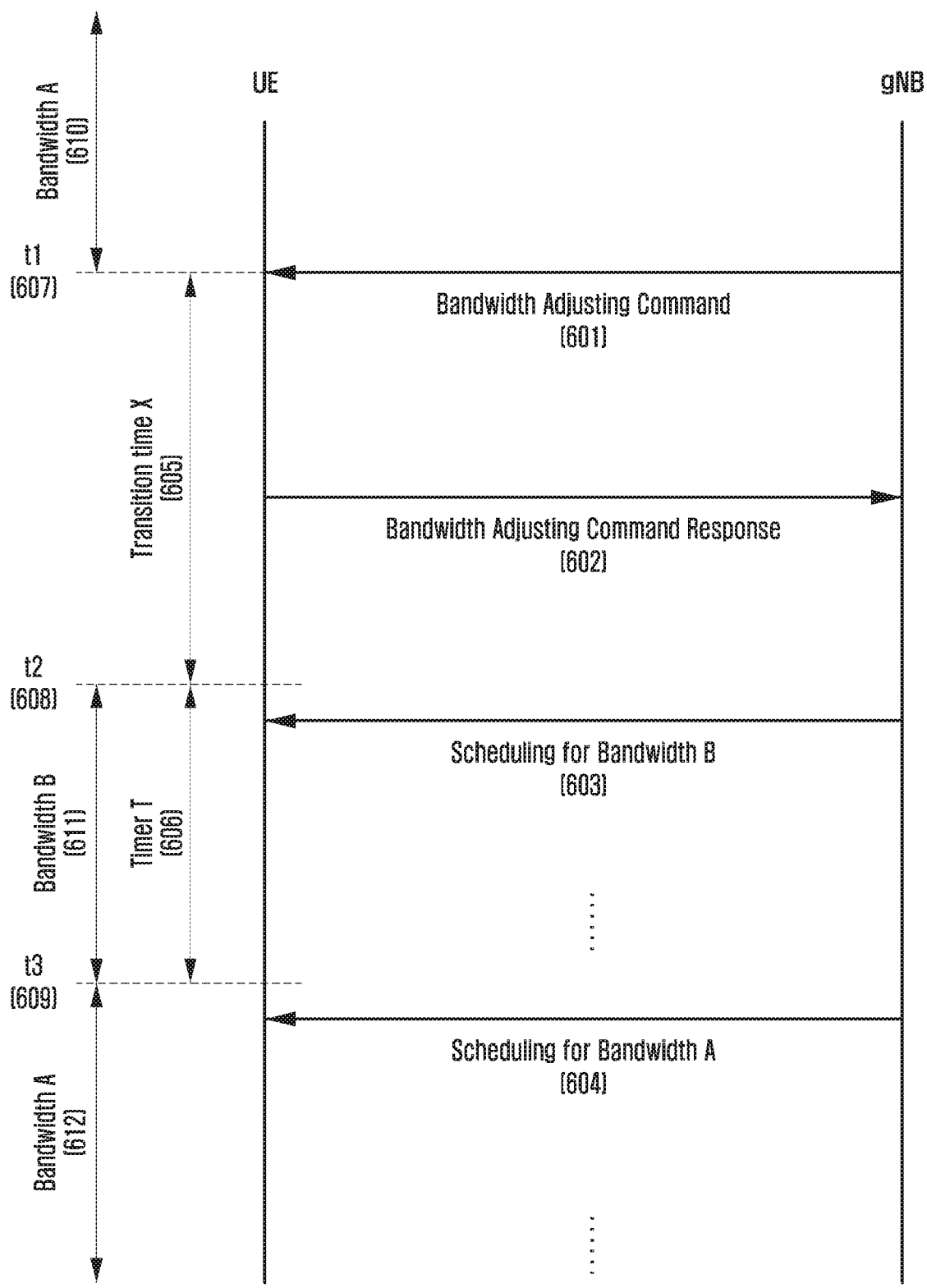
FIG. 6 is a flow diagram illustrating a process of changing a bandwidth of a terminal between the terminal and a base station according to an embodiment of the present disclosure.

FIG. 6 is a flow diagram illustrating a process of changing a bandwidth of a terminal between the terminal and a base station according to an embodiment of the present disclosure.

Referring to FIG. 6, the terminal operates in the bandwidth A 610 until a time point t1 607. When the terminal receives from the base station the bandwidth adjusting command 601 instructing the bandwidth transition to the bandwidth B 611 at the time point t1 607, the terminal performs the bandwidth transition to the bandwidth B 611 within a bandwidth transition time X 605. The base station may transmit the bandwidth adjusting command to the terminal according to the bandwidth adjusting command transmission method A or B described above.

If the terminal successfully acquires the bandwidth adjusting command, the terminal may feed bandwidth adjusting command response control information back to the base station 602. Alternatively, as described above, if the base station transmits the bandwidth adjusting command according to the bandwidth adjusting command transmission method A, the terminal may indirectly inform the base station about the successful reception or not of the bandwidth adjusting command.

The base station may perform scheduling 603 for the terminal according to the changed bandwidth B 611 from a time point t2 608 at which the bandwidth transition time X 605 is terminated. The terminal may count down the timer T 606 from the time point t2 608 and operate in the bandwidth B 611 until the timer T 606 expires.

After a time point t3 609 at which the timer T 606 expires, the base station performs scheduling for the terminal according to the bandwidth A 604. Namely, after the time point t3 609, the terminal operates in the bandwidth A 612. Alternatively, as described above, the terminal and the base station do not set the timer T 606, and the base station may reduce (return or restore) the bandwidth of the terminal to the bandwidth A 612 through the explicit signaling according to the terminal bandwidth reduction (restoration) method 2.

Figure 7:
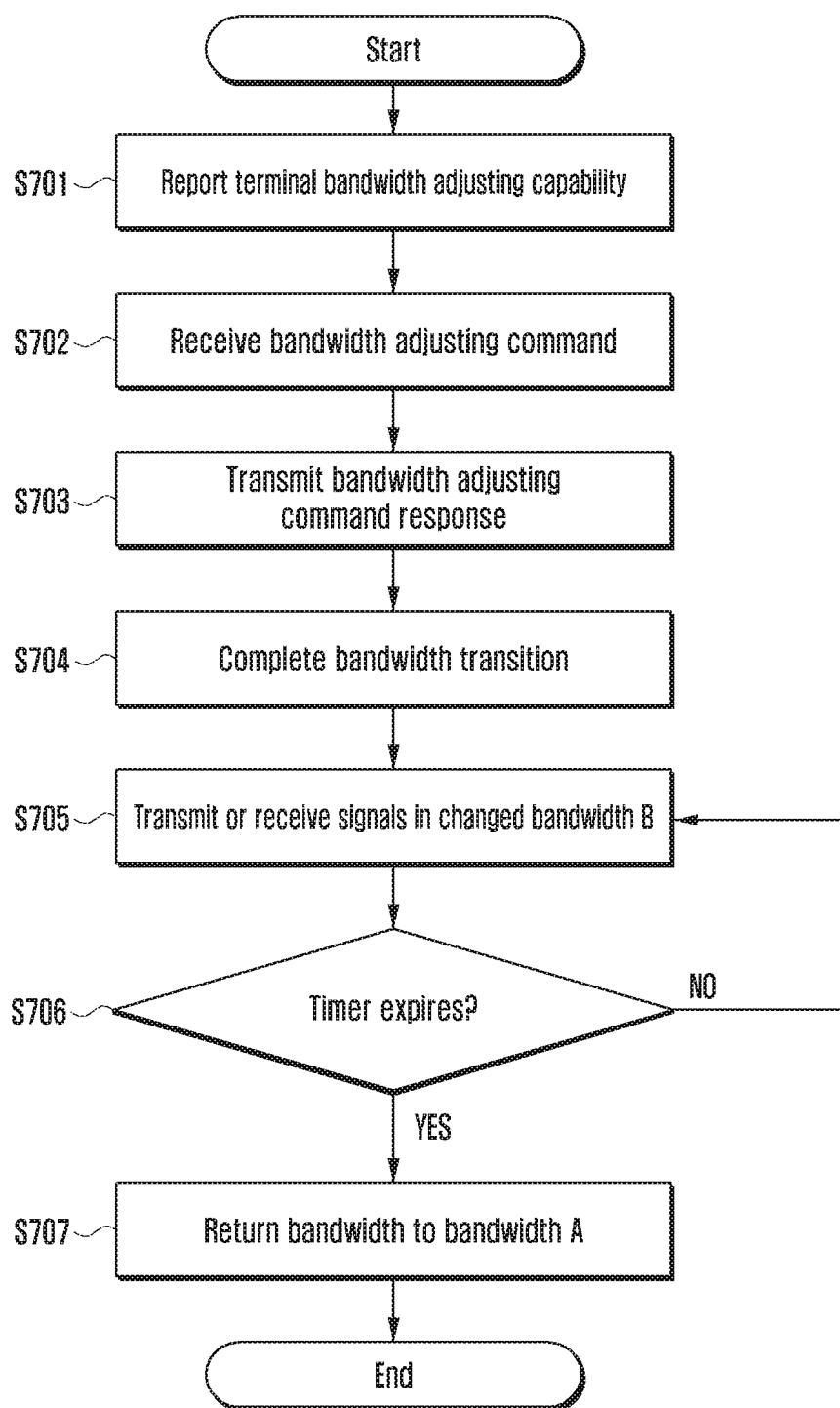
FIG. 7 is a diagram illustrating a terminal procedure for changing a bandwidth of a terminal according to an embodiment of the present disclosure.

FIG. 7 is a diagram illustrating a terminal procedure for changing a bandwidth of a terminal according to an embodiment of the present disclosure.

Referring to FIG. 7, at operation S701 the terminal reports capability information including terminal bandwidth adjusting capability to the base station.

Then, at operation S702, when the terminal receives, from the base station, and successfully acquires a bandwidth adjusting command instructing the bandwidth transition to the bandwidth B, the terminal performs the bandwidth transition from the currently used bandwidth A to the instructed bandwidth B within a bandwidth transition time X.

If the terminal successfully acquires the bandwidth adjusting command, the terminal transmits bandwidth adjusting command response control information to the base station at operation S703. Alternatively, as described above, the terminal may indirectly inform the base station about the successful reception or not of the bandwidth adjusting command.

When the bandwidth transition of the terminal is completed at operation S704, the terminal may transmit and receive a signal within the changed bandwidth B from operation S705. When the bandwidth transition time X elapses, the terminal counts down a timer T and performs operations in the bandwidth B while the timer T is running.

At operation S706, the terminal determines whether the timer T expires. If the timer T has not yet expired, the terminal proceeds to operation S705 to perform the related operation.

If the timer T expires, the terminal reduces (returns or restores) the bandwidth to the bandwidth A at operation S707. Alternatively, as described above, the terminal may not set the timer T and reduce (return or restore) the bandwidth thereof to the bandwidth A through the explicit signaling of the base station according to the terminal bandwidth reduction (restoration) method 2.

Figure 8:
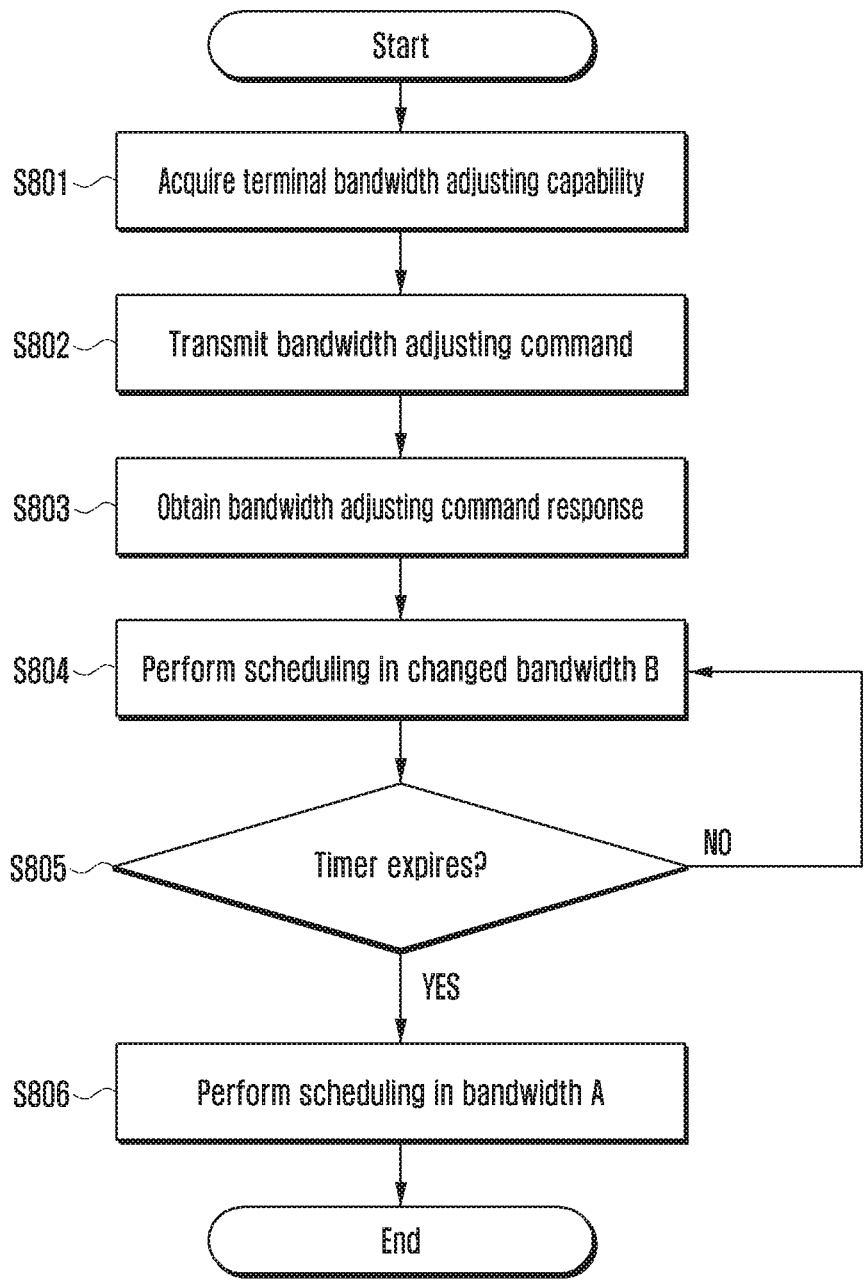
FIG. 8 is a diagram illustrating a base station procedure for changing a bandwidth of a terminal according to an embodiment of the present disclosure.

FIG. 8 is a diagram illustrating a base station procedure for changing a bandwidth of a terminal according to an embodiment of the present disclosure.

Referring to FIG. 8, at operation S801 the base station acquires the capability information including the terminal bandwidth adjusting capability from the terminal.

Then, at operation S802, the base station transmits the bandwidth adjusting command instructing the bandwidth transition to the bandwidth B to the terminal.

At operation S803, the base station successfully obtains the bandwidth adjusting command response control information from the terminal or indirectly receives a notification of successful reception of the bandwidth adjusting command from the terminal.

If the bandwidth transition time X elapses after the transmission of the bandwidth adjusting command, the base station determines that the bandwidth transition of the terminal is completed, and then performs scheduling operation in the changed bandwidth B at operation S804. Alternatively, if the bandwidth transition time X elapses after the transmission of the bandwidth adjusting command, the base station counts down the timer T and then performs the scheduling for the terminal within the bandwidth B while the timer T is running.

At operation S805, the base station determines whether the timer T expires. If the timer T has not yet expired, the base station proceeds to operation S804 to perform the related operation.

If the timer T expires, the base station determines that the bandwidth of the terminal is reduced (returned or restored)

to the original bandwidth A, and then performs the scheduling operation for the terminal within the bandwidth A at operation S806. Alternatively, as described above, the base station may not set the timer T and reduce (return or restore) the bandwidth of the terminal to the bandwidth A through the explicit signaling according to the terminal bandwidth reduction (restoration) method 2.

Meanwhile, as another modification of the first embodiment—1, if the terminal has a downlink receiving RF module and an uplink transmitting RF module separately (e.g., in case of a frequency division duplex (FDD) type terminal), the bandwidth transition operation of the terminal may be independently defined for each of downlink and uplink.

First Embodiment—2

As a method for realizing the ultra-low latency service in the 5G system, in addition to the above-described flexible frame structure, a self-contained transmission scheme that downlink data transmission and HARQ-ACK/NACK feedback for downlink data are performed in a slot which is a basic unit for scheduling is now studied. In addition, from the viewpoint of uplink data transmission, the self-contained transmission scheme means that scheduling information transmission of the base station for scheduling uplink data of the terminal and corresponding uplink data transmission of the terminal are performed in the same slot. Hereinafter, at least six slot formats (from slot format 1 to slot format 6) necessary to support the self-contained transmission will be described with reference to FIG. 9.

Figure 9:
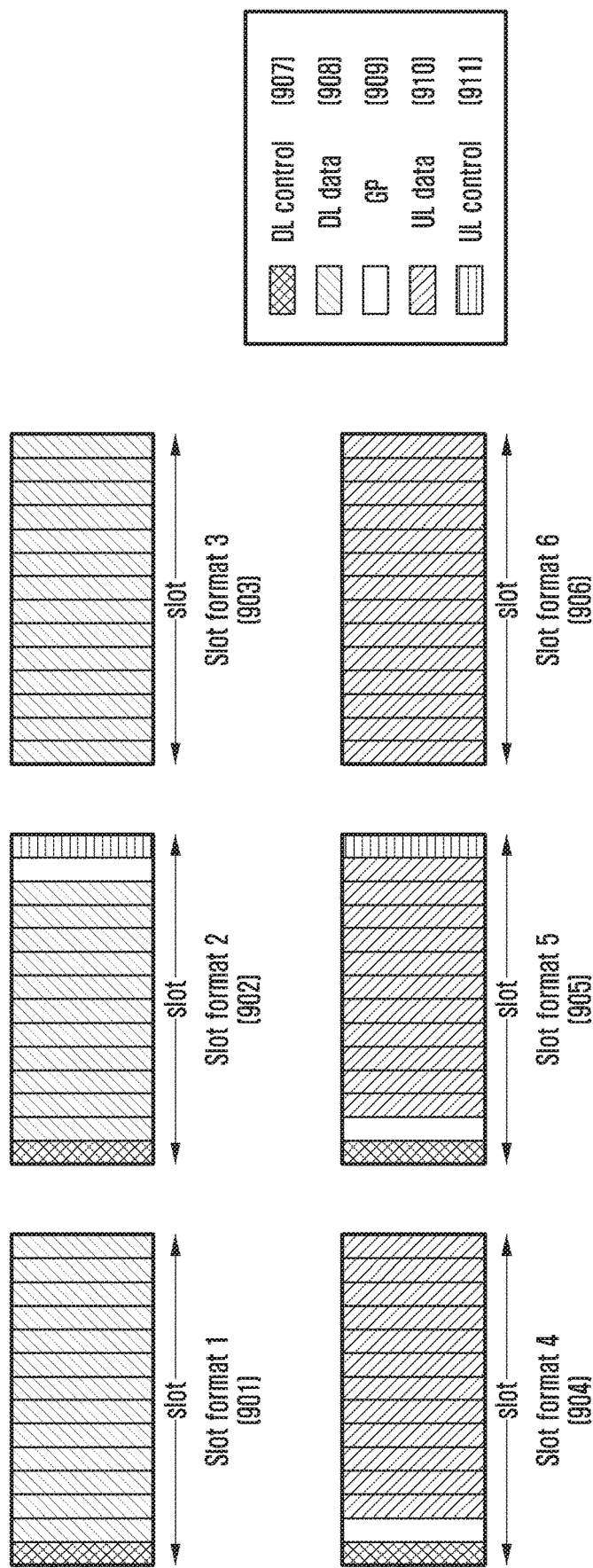
FIG. 9 is a diagram illustrating various slot formats according to an embodiment of the present disclosure.

FIG. 9 is a diagram illustrating various slot formats according to an embodiment of the present disclosure.

Referring to FIG. 9, each slot is composed of 14 symbols. Each slot format may be defined using a combination of a symbol 907 for downlink control information (DCI) transmission, a symbol 908 for downlink data transmission, a symbol 909 for guard period (GP) for downlink-uplink shift, a symbol 910 for uplink data transmission, and a symbol 911 for uplink control information transmission. These symbols constituting each slot format may be formed in various combinations according to the amount of control information to be transmitted, the amount of data to be transmitted, the time required for the terminal to change the RF module from downlink to uplink, and the like.

The slot format 1 901, the slot format 2 902, and the slot format 3 903 are slot formats for downlink data transmission.

The slot format 1 901 indicates a slot composed of at least one symbol for DCI transmission and at least one symbol for downlink data transmission. All symbols are used for downlink transmission.

The slot format 2 902 indicates a slot composed of at least one symbol for DCI transmission, at least one symbol for downlink data transmission, at least one symbol for GP, and at least one symbol for uplink control information transmission. Symbols for downlink transmission and symbols for uplink transmission (UL Tx) coexist within one slot. Therefore, the slot format 2 may be used for supporting the downlink self-contained transmission scheme.

The slot format 3 903 is characterized in that all symbols are used for downlink data transmission. Therefore, the slot format 3 may minimize overhead for control information transmission and thereby maximize the efficiency of downlink data transmission.

The slot format 4 904, the slot format 5 905, and the slot format 6 906 are slot formats for uplink data transmission.

The slot format 4 904 indicates a slot composed of at least one symbol for DCI transmission, at least one symbol for GP, and at least one symbol for uplink data transmission. That is, the downlink transmission symbols and the UL Tx symbols coexist in one slot, so that the slot format 4 may be used for supporting the uplink self-contained transmission scheme.

The slot format 5 905 indicates a slot composed of at least one symbol for DCI transmission, at least one symbol for GP, at least one symbol for uplink data transmission, and at least one symbol for uplink control information transmission. That is, the downlink transmission symbols and the UL Tx symbols coexist in one slot, so that the slot format 5 may be used for supporting the downlink self-contained transmission scheme.

The slot format 6 906 is characterized in that all symbols are used for uplink data transmission. Therefore, the slot format 6 may minimize overhead for control information transmission and thereby maximize the efficiency of uplink data transmission.

The above slot formats may be used intermixed with each other in terms of time.

Figure 10:
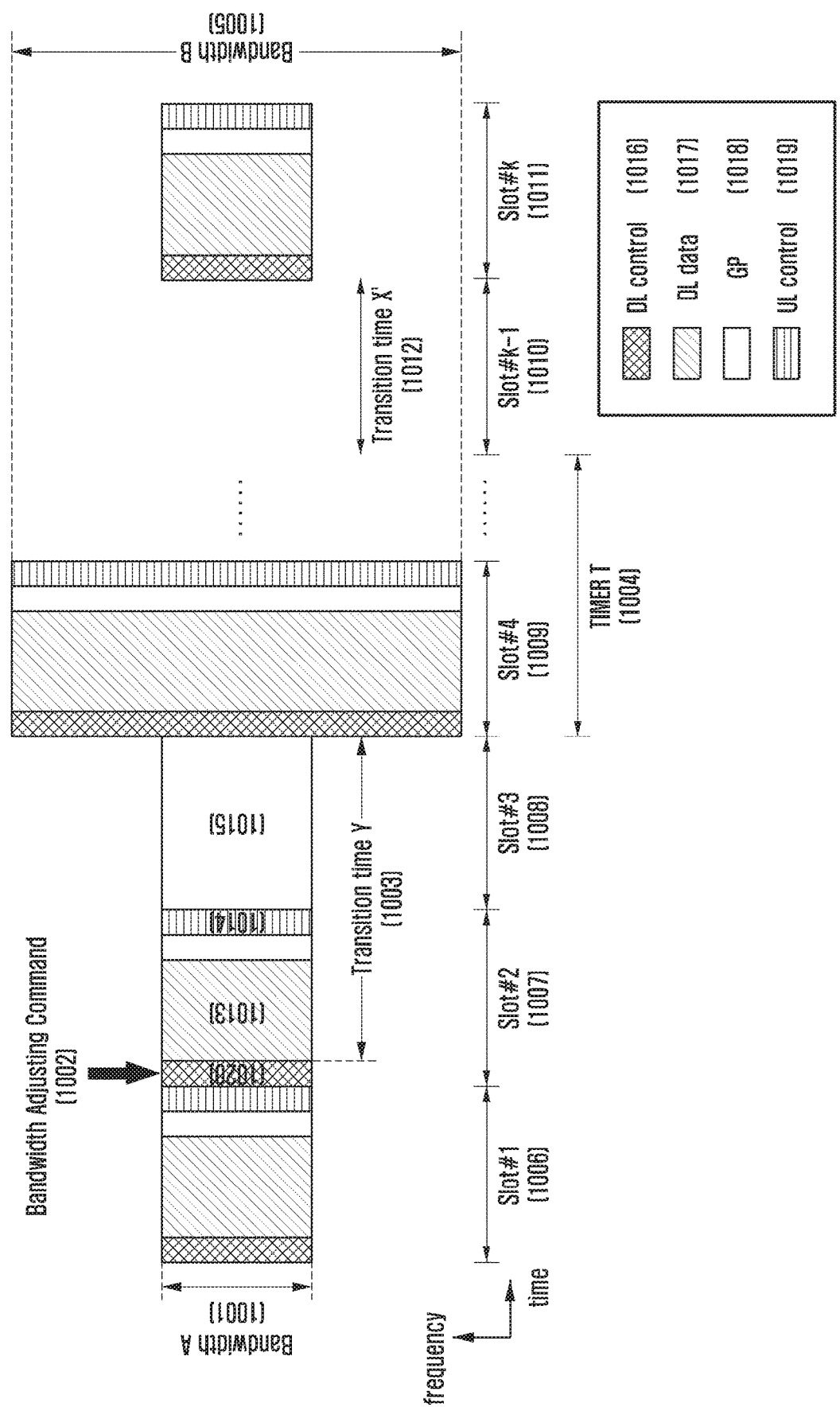
FIG. 10 is a diagram illustrating a method for efficiently managing terminal power consumption by adjusting the transmission/reception bandwidth according to an embodiment of the present disclosure.

FIG. 10 shows a method for adjusting a transmission/reception bandwidth of the terminal according to an embodiment of the present disclosure.

Referring to FIG. 10, the slot format 2 will be used for description, but this description is not limited to the slot format 2.

In FIG. 10, the horizontal axis represents the time domain, and the vertical axis represents the frequency domain. In this example of FIG. 10, the terminal receives a DL control channel and a DL data channel corresponding to bandwidth A 1001 at most from the base station in the slot #1 1006, and transmits HARQ ACK/NACK indicating the successful decoding or not of the received DL data channel to the base station in the same slot #1 1006. The bandwidth A may be a predetermined reference bandwidth, a bandwidth determined at the initial access of the terminal, or a bandwidth determined through setting between the terminal and the base station.

In this example of FIG. 10, the base station instructs the terminal to change the bandwidth of the terminal to bandwidth B 1005 through a bandwidth adjusting command 1002 in the slot #2 1007, and the terminal receives a DL control channel 1020 and a DL data channel 1013 corresponding to the bandwidth A 1001 at most. Then, the terminal transmits HARQ-ACK/NACK 1014 indicating the successful decoding or not of the received DL data channel to the base station in the same slot #2 1007 within the bandwidth A at most. In this example of FIG. 10, it is assumed that the bandwidth B is greater than the bandwidth A. The bandwidth A and the bandwidth B may be expressed in PRB units. The bandwidth adjusting command 1002 transmitted to the terminal may be included in the DL control channel 1020 or included in any other DL control channel different from the DL control channel 1020.

The terminal cannot perform the bandwidth transition operation during the transmission/reception operation. Therefore, the terminal defers executing the acquired bandwidth adjusting command until the HARQ-ACK/NACK 1014 is completely transmitted in the slot #2 1007. Therefore, a bandwidth transition time Y 1003 required until the terminal receives the bandwidth adjusting command and then completes the bandwidth transition is determined as the sum of a certain time of deferring the execution of the bandwidth adjusting command by the terminal, a certain time required for the terminal to successfully receive and acquire the bandwidth adjusting command through decoding, and a certain time required for the terminal to change the setting of a terminal RF module for the bandwidth transition. Compared to the bandwidth transition time X described in the first embodiment—1, the bandwidth transition time Y is greater than the bandwidth transition time X.

The terminal completes the bandwidth transition to the bandwidth B within the bandwidth transition time Y, and perform signal transmission/reception in the bandwidth B from the slot #4 1009. In this example of FIG. 10, the base station transmits the DL control channel and the DL data channel corresponding to the bandwidth B at most to the terminal in the slot #4 1009, and the terminal transmits the HARQ ACK/NACK control information corresponding to the DL data in the same slot #4 1009.

If the base station desires to instruct the terminal to change or return or restore the bandwidth to the original bandwidth A after the slot #4 1009, the bandwidth transition of the terminal may be performed through the terminal bandwidth reduction (restoration) method 1 or 2 as described above in the first embodiment—1.

Figure 11:
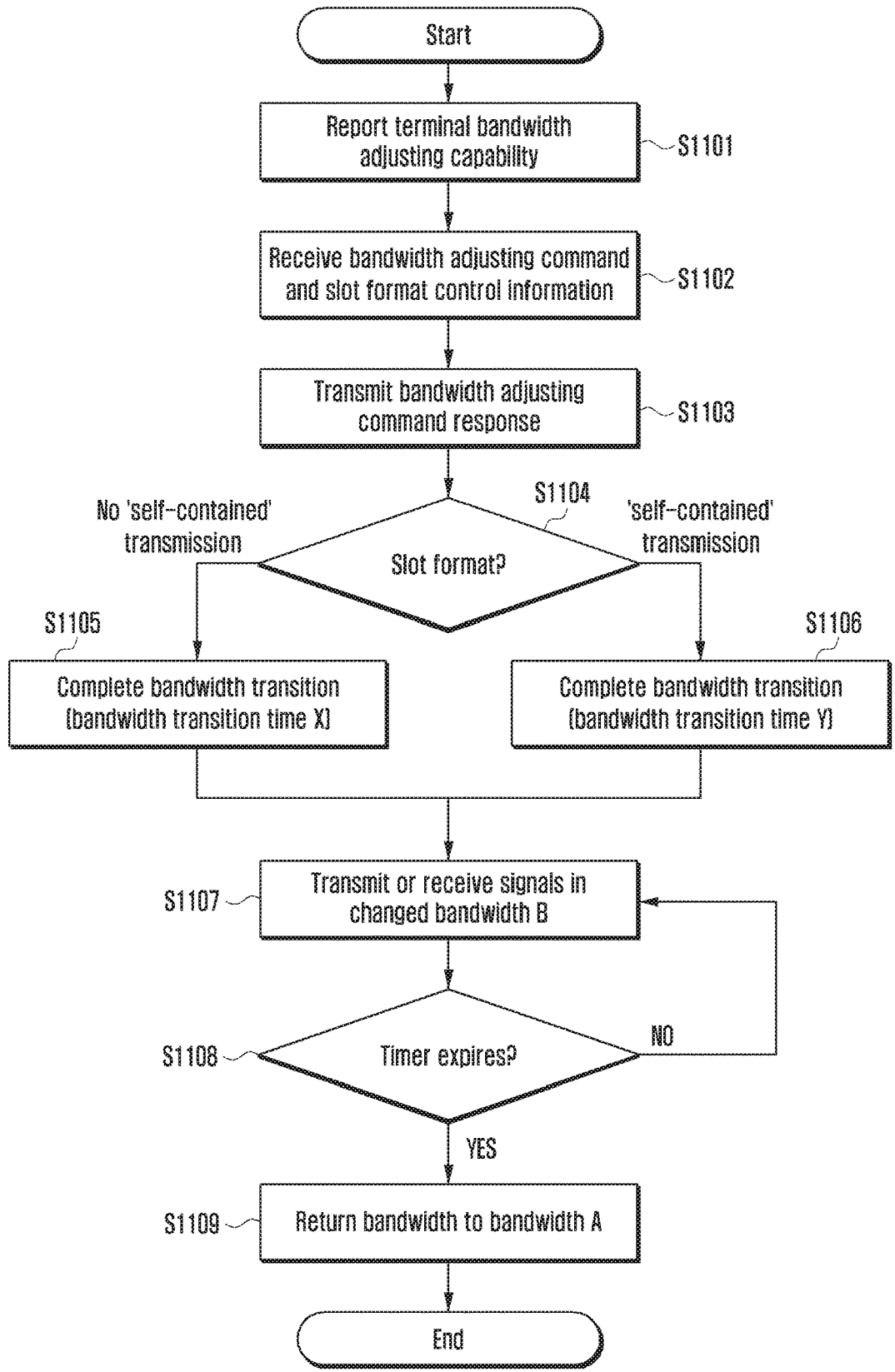
FIG. 11 is a diagram illustrating a terminal procedure for changing a bandwidth of a terminal according to an embodiment of the present disclosure.

FIG. 11 is a diagram illustrating a terminal procedure for changing a bandwidth of a terminal according to an embodiment of the present disclosure.

Referring to FIG. 11, at operation S1101, the terminal reports capability information including terminal bandwidth adjusting capability to the base station.

Then, at operation S1102, the terminal receives, from the base station, a bandwidth adjusting command for instructing bandwidth transition to the bandwidth B and control information for indicating a slot format.

If the terminal successfully acquires the bandwidth adjusting command, the terminal transmits bandwidth adjusting command response control information to the base station at operation S1103. Alternatively, as described above in the first embodiment—1, the terminal may indirectly inform the base station about the successful reception or not of the bandwidth adjusting command.

At operation S1104, the terminal identifies the slot format through the received slot format control information.

If the identified slot format is one of the slot formats 2, 4 and 5 which support the self-contained transmission, the terminal performs at operation S1106 the bandwidth transition from the currently used bandwidth A to the instructed bandwidth B within the bandwidth transition time Y after receiving the bandwidth adjusting command. When the bandwidth transition time Y elapses, the terminal counts down the timer T and performs operations in the bandwidth B while the timer T is running Thereafter, the terminal performs operation S1107.

If the identified slot format is not the slot format 2, 4 or 5 which supports the self-contained transmission at operation S1104, the terminal performs at operation S1105 the bandwidth transition from the currently used bandwidth A to the instructed bandwidth B within the bandwidth transition time X after receiving the bandwidth adjusting command. When the bandwidth transition time X elapses, the terminal counts down the timer T and performs operations in the bandwidth B while the timer T is running Thereafter, the terminal performs operation S1107.

When the bandwidth transition of the terminal is completed, the terminal performs a transmission/reception operation within the changed bandwidth B from operation S1107.

At operation S1108, the terminal determines whether the timer T expires. If the timer T has not yet expired, the terminal proceeds to operation S1107 to perform the related operation.

If the timer T expires, the terminal reduces (returns or restores) the bandwidth to the original bandwidth A at operation S1109. Alternatively, as described above, the terminal may not set the timer T and reduce (return or restore) the bandwidth thereof to the bandwidth A through the explicit signaling of the base station according to the terminal bandwidth reduction (restoration) method 2.

Figure 12:
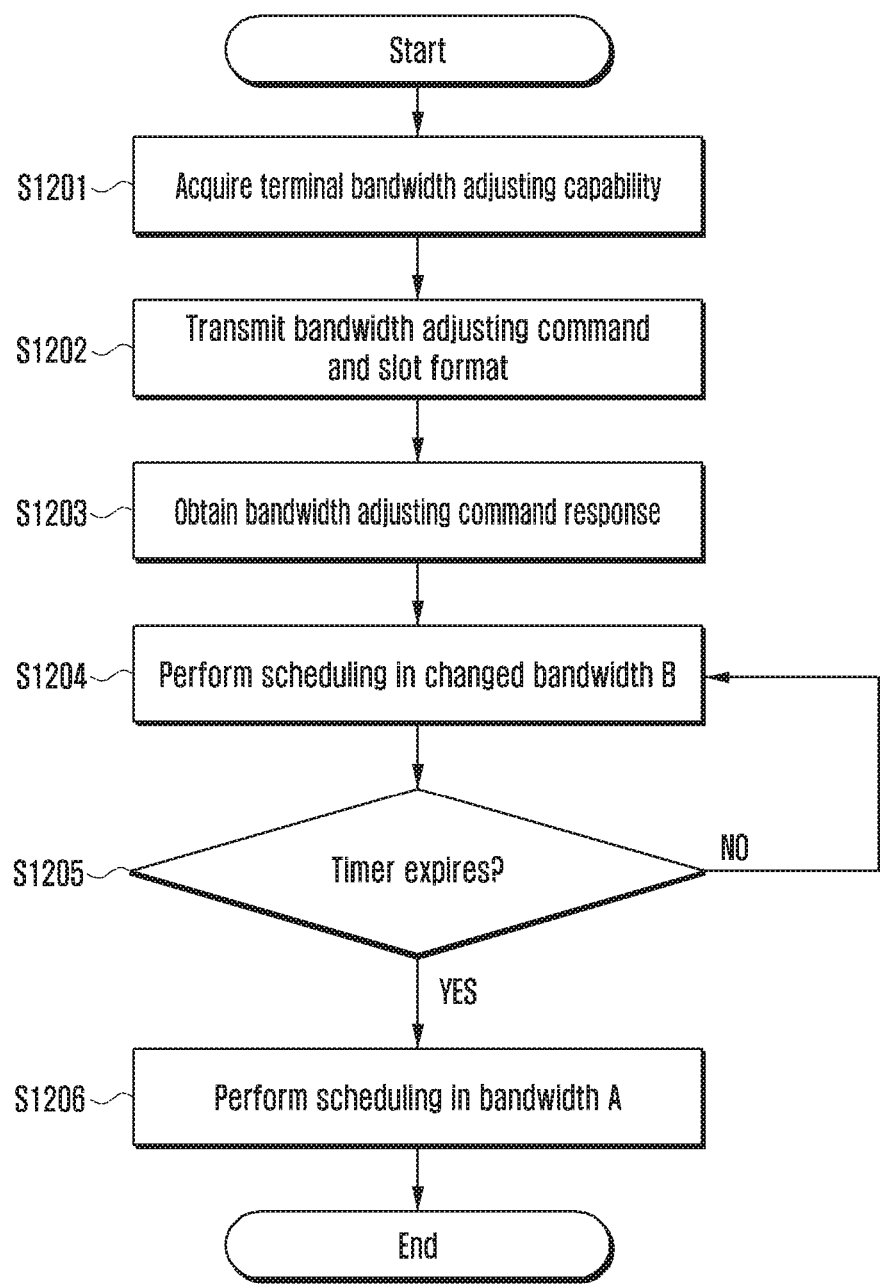
FIG. 12 is a diagram illustrating a base station procedure for changing a bandwidth of a terminal according to an embodiment of the present disclosure.

FIG. 12 is a diagram illustrating a base station procedure for changing a bandwidth of a terminal according to an embodiment of the present disclosure.

Referring to FIG. 12, at operation S1201 the base station acquires the capability information including the terminal bandwidth adjusting capability from the terminal.

Then, at operation S1202, the base station transmits, to the terminal, the bandwidth adjusting command instructing the bandwidth transition to the bandwidth B and the slot format control information.

At operation S1203, the base station successfully obtains the bandwidth adjusting command response control information from the terminal or indirectly receives a notification of successful reception of the bandwidth adjusting command from the terminal.

If the bandwidth transition time X (in case of the slot format incapable of supporting the self-contained transmission) or the bandwidth transition time Y (in case of the slot format capable of supporting the self-contained transmission) elapses after the transmission of the bandwidth adjusting command, the base station determines that the bandwidth transition of the terminal is completed, and then performs scheduling operation in the changed bandwidth B at operation S1204. Alternatively, if the bandwidth transition time X (in case of the slot format incapable of supporting the self-contained transmission) or the bandwidth transition time Y (in case of the slot format capable of supporting the self-contained transmission) elapses after the transmission of the bandwidth adjusting command, the base station counts down the timer T and then performs the scheduling for the terminal within the bandwidth B while the timer T is running.

At operation S1205, the base station determines whether the timer T expires. If the timer T has not yet expired, the base station proceeds to operation S1204 to perform the related operation.

If the timer T expires, the base station determines that the bandwidth of the terminal is reduced (returned or restored) to the original bandwidth A, and then performs the scheduling operation for the terminal within the bandwidth A at operation S1206. Alternatively, as described above, the base station may not set the timer T and reduce (return or restore) the bandwidth of the terminal to the bandwidth A through the explicit signaling according to the terminal bandwidth reduction (restoration) method 2.

Meanwhile, the first embodiment—2 is not limited to the self-contained transmission scheme and may be modified variously. Referring to FIG. 10, if the transmission/reception of data or control information for the terminal does not occur during a certain time interval including the slot #2 1007 after the base station instructs the bandwidth adjusting command in the slot #2, the terminal completes the bandwidth transition operation within the bandwidth transition time X. However, if the transmission/reception of data or control information for the terminal occurs during a certain time interval including the slot #2 1007 after the base station instructs the bandwidth adjusting command in the slot #2, the terminal completes the bandwidth transition operation within the bandwidth transition time Y. In this case, the bandwidth transition time Y is greater than the bandwidth transition time X.

As another modification, if the terminal has a downlink receiving RF module and an uplink transmitting RF module separately (e.g., in case of an FDD type terminal), the bandwidth transition operation of the terminal may be independently defined for each of downlink and uplink.

Meanwhile, in case of supporting the bandwidth transition of the terminal according to the present disclosure, it is necessary to adjust the setting for measurement of the terminal according to the changed bandwidth of the terminal. By performing measurement for a serving cell currently managing the communication of the terminal or a neighbor cell around the serving cell, the terminal may measure the quality of a corresponding cell and, if necessary, proceed a procedure such as handover.

The setting for measurement of the terminal includes at least a time cycle in which the terminal performs the measurement, and a frequency domain bandwidth in which the terminal performs the measurement. The frequency domain bandwidth in which the terminal performs the measurement cannot exceed the current reception bandwidth of the terminal. For example, as shown in Table 1, the measurement setting of the terminal may define a mapping relation with respect to each reception bandwidth (Rx BW) of the terminal. In Table 1, the terminal reception bandwidth means the reception bandwidth adjusted according to embodiments of the present disclosure. For example, when the terminal reception bandwidth is adjusted to B 1, the measurement cycle of the terminal is set to T1, and the terminal measurement bandwidth is set to M1. The mapping relation as shown in Table 1 may be notified to the terminal by the base station through signaling or use fixed values agreed between the terminal and the base station without any separate signaling for the mapping relation.

TABLE 1

| Terminal Rx BW | Measurement Cycle | Measurement BW |
|---|---|---|
| B1 | T1 | M1 (M1 ≤ B1) |
| B2 | T2 | M2 (M2 ≤ B2) |
| B3 | T3 | M3 (M3 ≤ B3) |
| ... | ... | ... |

Figure 13:
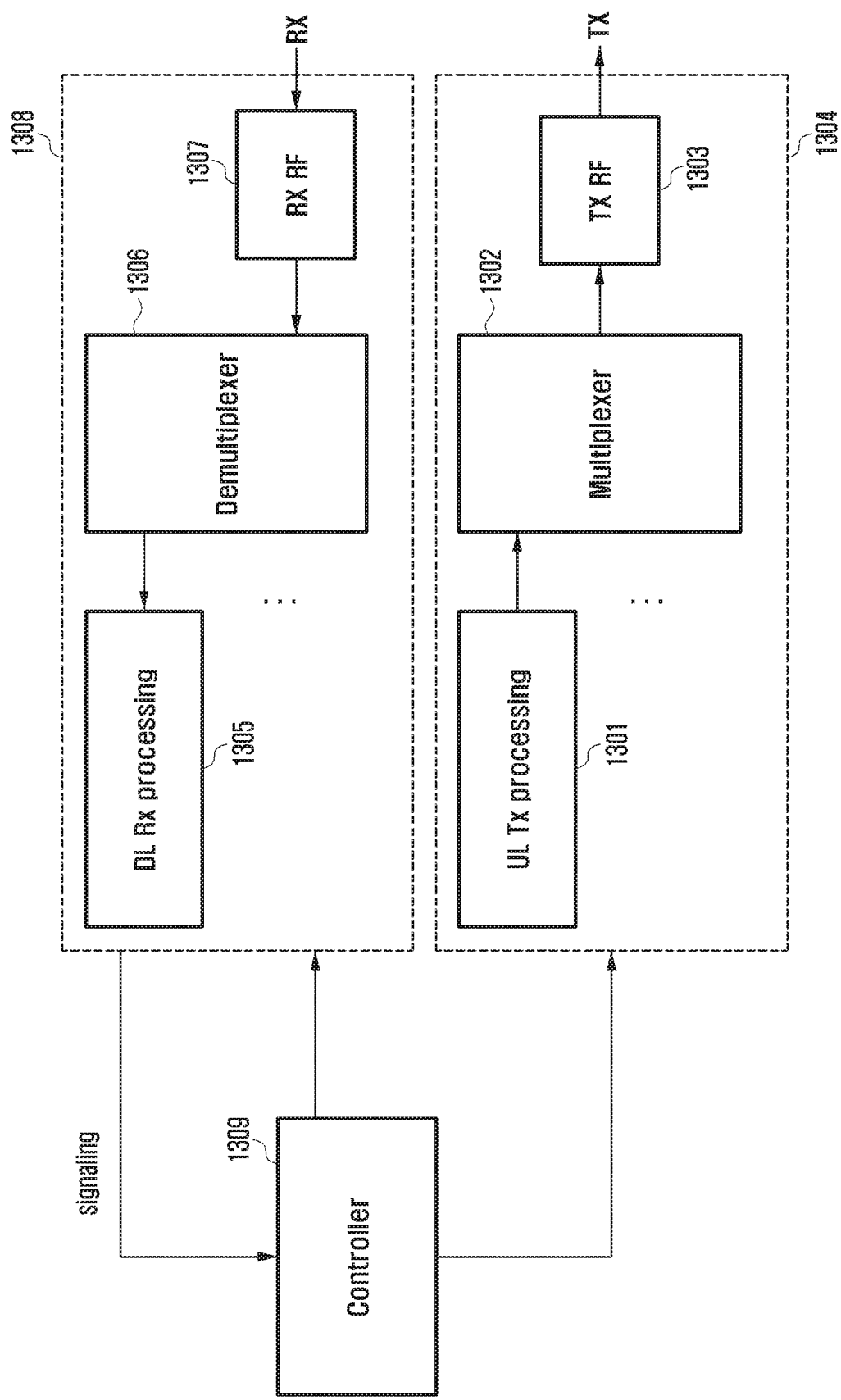
FIG. 13 is a diagram illustrating a terminal according an embodiment of to the present disclosure.

FIG. 13 shows a terminal according to an embodiment of the present disclosure.

For convenience of explanation, the description and illustration of elements which are not directly related to the present disclosure are omitted.

Referring to FIG. 13, the terminal includes a transmitter 1304, a receiver 1308, and a controller 1309. The transmitter 1304 is composed of an UL Tx processing block 1301, a multiplexer 1302, and a Tx RF block 1303. The receiver 1308 is composed of a downlink reception (DL Rx) processing block 1305, a demultiplexer 1306, and a Rx RF block 1307. The controller 1309 determines, from the bandwidth adjusting command acquired through the base station signaling, when to start and complete the terminal bandwidth transition operation, how much to change the terminal bandwidth, and the like. Then, the controller 1309 controls the respective blocks of the receiver 1308 for receiving a DL signal and the respective blocks of the transmitter 1304 for transmitting an UL signal.

In the transmitter 1304 of the terminal, the UL Tx processing block 1301 generates a signal to be transmitted by performing a process such as channel coding and modulation. The signal generated by the UL Tx processing block 1301 is multiplexed with any other UL signal by the multiplexer 1302, processed by the Tx RF block 1303, and transmitted to the base station.

The receiver 1308 of the terminal demultiplexes a signal received from the base station and distributes it to the respective DL Rx processing blocks. The DL Rx processing block 1305 acquires control information or data transmitted by the base station by performing a process such as demodulation and channel decoding of the received signal. The receiver 1308 offers an output result of the DL Rx processing block 1305 to the controller 1309 to support the operation of the controller 1309.

While the present disclosure has been particularly shown and described with reference to various embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

Second Embodiment

The second embodiment relates to a data transmission/reception method and apparatus through slot aggregation.

As in the LTE and LTE-A systems, a hybrid automatic repeat request (HARQ) scheme may be applied to improve data transmission efficiency in the 5G system. The HARQ scheme means that, if a receiver fails to correctly decode data sent by a transmitter, the receiver transmits negative acknowledgement (NACK) indicating a failure in decoding to the transmitter so as to enable the transmitter to retransmit the corresponding data on the physical layer. The receiver stores the decoding failed data in a soft buffer, and then combines (i.e., HARQ combining) it with data retransmitted by the transmitter to improve data reception performance. In addition, if the receiver correctly decodes data, the receiver transmits an acknowledgment (ACK) indicating a success in decoding to the transmitter so as to enable the transmitter to transmit new data. The size of the soft buffer for HARQ combining is determined depending on the hardware specification of the terminal and is varied according to the terminal capability. For example, the soft buffer size of a high-capability terminal is relatively larger than that of a low-capability terminal.

In order for the base station to transmit downlink data to the terminal or for the terminal to transmit uplink data to the base station, the base station transmits scheduling information, including radio resource allocation information about the DL or UL data, MCS related control information, HARQ related control information, etc., to the terminal through the downlink control channel. The base station determines scheduling for the terminal by referring to channel status information (CSI) reporting of the terminal or sounding reference signal (SRS) reception quality which is a reference signal (RS) for measuring an uplink channel status.

Hereinafter, the downlink data scheduling operation of the base station will be described with reference to FIG. 14.

Figure 14:
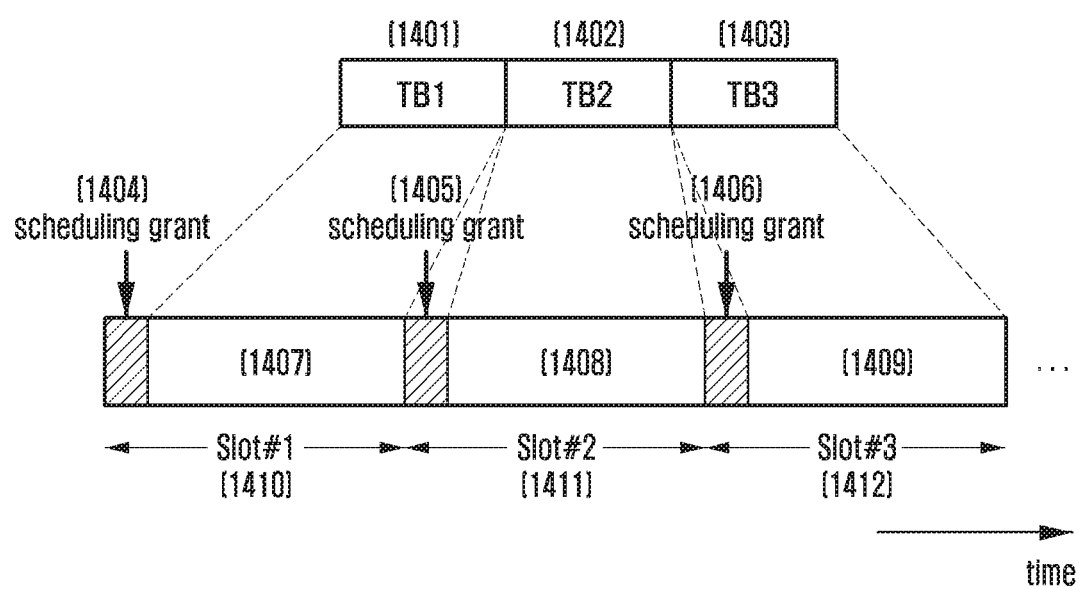
FIG. 14 is a diagram illustrating a downlink data scheduling operation of a base station with respect to a terminal when slot aggregation is not applied according to an embodiment of the present disclosure.

FIG. 14 is a diagram illustrating a downlink data scheduling operation of a base station with respect to a terminal when slot aggregation is not applied according to an embodiment of the present disclosure.

Referring to FIG. 14, a basic time unit for performing the scheduling in the 5G system is a slot. Namely, the base station may perform the scheduling operation for the terminal in each slot and transmit downlink data. The base station may divide the downlink data to be transmitted into transport blocks (TBs) which is a data processing unit. Then, the base station performs signal processing such as channel coding and modulation for each TB, maps the processed TB to meet a slot structure, and transmits the mapped TB to the terminal.

In this example of FIG. 14, the base station maps a TB1 1401, a TB2 1402 and a TB3 1403 to data regions 1407, 1408 and 1409 of a slot #1 1410, a slot #2 1411 and a slot #3 1412, respectively, to transmit them to the terminal. In addition, the base station constructs downlink control channels including scheduling information for the corresponding TB for the respective slots, and maps the downlink control channels to control channel regions 1404, 1405 and 1406 to transmit them to the terminal. Accordingly, the terminal determines the scheduling or not of the base station by detecting and decoding the downlink control channel in the control channel region at each slot.

If the terminal acquires the scheduling information of the base station through successful decoding of the downlink control channel, the terminal decodes downlink data according to the acquired scheduling information. The transmission format and mapping scheme of the downlink control channel may be configured variously to be suitable for various radio channel environments. Therefore, the terminal performs blind decoding for the downlink control channel of various configurations at each slot. However, as the number of times of blind decoding increases, the terminal complexity and terminal power consumption increase.

Additionally, the terminal feeds back an ACK/NACK indicating the success or not of decoding for each TB to the base station.

If there is a sufficient amount of downlink data to be transmitted to the terminal by the base station, and if the base station can perform the scheduling once for several slots without a need of scheduling for each slot, it is possible to reduce signaling overhead due to the downlink control channel transmission of the base station. Also, the terminal can expect the effect of reducing the power consumption due to a reduction of the blind decoding operation. Hereinafter, the scheduling operation of the base station will be referred to as slot aggregation.

The present disclosure proposes three methods of slot aggregation, as follows.

Slot Aggregation Method 1:
The base station transmits scheduling information regarding N slots.
The base station maps a TB independently to each slot.
The terminal generates and feeds back an HARQ ACK/NACK for the TB of each slot.

Slot Aggregation Method 2:
The base station transmits scheduling information regarding N slots.
The base station repeatedly maps one TB to each slot.
The terminal generates and feeds back one HARQ ACK/NACK corresponding to the one TB.

Slot Aggregation Method 3:
The base station transmits scheduling information regarding N slots.
The base station divides and maps one TB to each slot.
The terminal generates and feeds back one HARQ ACK/NACK corresponding to the one TB.

The base station may transmit the number N of the aggregated slots or whether to apply the slot aggregation, to the terminal through at least one of physical layer signaling, MAC layer signaling, and RRC signaling. Among them, the physical layer signaling is characterized by allowing the quick processing of the terminal.

Now, cases where the base station transmits downlink data by applying the slot aggregation method 1, 2, or 3 will be described with reference to FIGS. 15 to 17. In these examples of FIGS. 15 to 17, three slots aggregated for scheduling are exemplarily shown.

Figure 15:
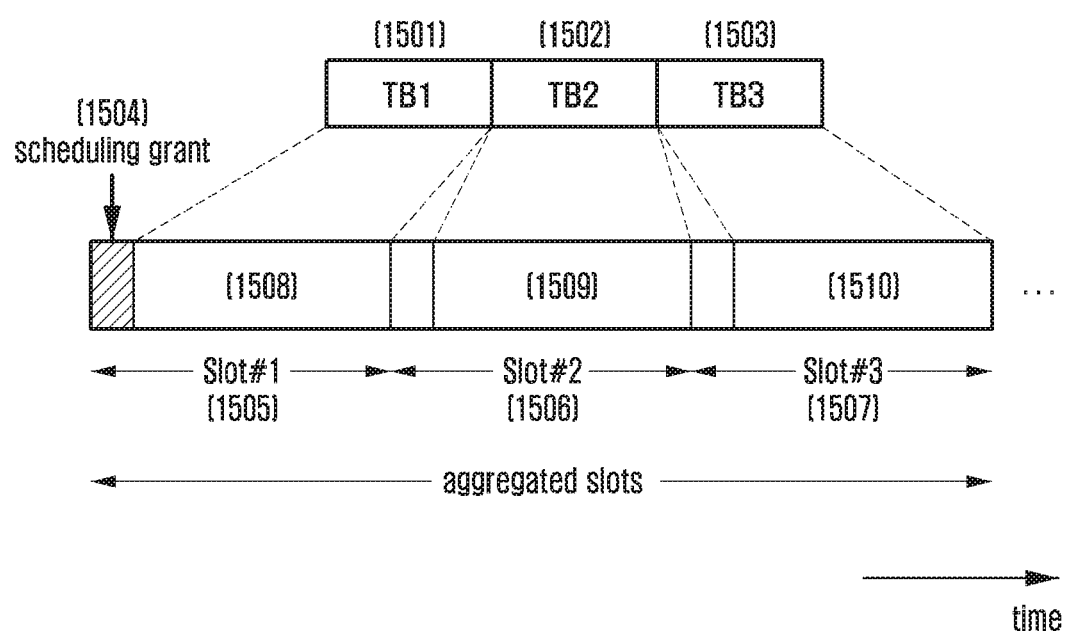
FIG. 15 is a diagram illustrating a downlink data scheduling method of a base station when the first slot aggregation method is applied according to an embodiment of the present disclosure.

FIG. 15 is a diagram illustrating a downlink data scheduling method of a base station when the first slot aggregation method is applied according to an embodiment of the present disclosure.

Unlike the case of FIG. 14, the base station transmits scheduling information 1504 to the terminal only in a slot #1 1505 among three aggregated slots. Therefore, when the scheduling information 1504 is successfully acquired, the terminal recognizes the scheduling based on the slot aggregation scheme and does not perform the blind decoding for the downlink control channel including the scheduling information of the downlink data in the remaining slot #2 1506 and slot #3 1507.

The base station maps a TB1 1501, a TB2 1502 and a TB3 1503 to data regions 1508, 1509 and 1510 of the slot #1 1505, the slot #2 1506 and the slot #3 1507, respectively, to transmit them to the terminal. The scheduling information 1504 of the slot #1 includes all scheduling information for the TB1 1501, the TB2 1502 and the TB3 1503.

Then, the terminal feeds back an ACK/NACK indicating the success or not of decoding for each TB to the base station. The ACK/NACK feedback timing of the terminal may be contained in the scheduling information 1504 and notified to the terminal by the base station, or may be defined as fixed timing. In this case, the terminal transmits an ACK/NACK for the TB1 1501 after the ACK/NACK feedback timing from the slot #1 1505 in which the TB1 1501 is transmitted. Similarly, the terminal transmits an ACK/NACK for the TB2 1502 after the ACK/NACK feedback timing from the slot #2 1506 in which the TB2 1502 is transmitted. Also, the terminal transmits an ACK/NACK for the TB3 1503 after the ACK/NACK feedback timing from the slot #3 1507 in which the TB3 1503 is transmitted.

Figure 16:
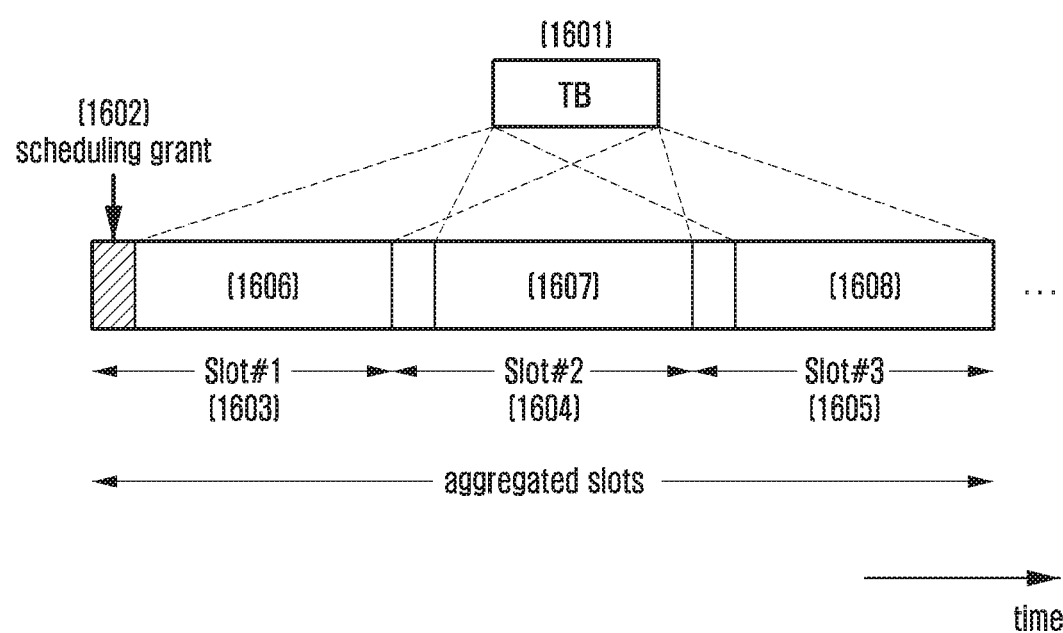
FIG. 16 is a diagram illustrating a downlink data scheduling method of a base station when the second slot aggregation method is applied according to an embodiment of the present disclosure.

FIG. 16 is a diagram illustrating a downlink data scheduling method of a base station when the second slot aggregation method is applied according to an embodiment of the present disclosure.

Unlike the case of FIG. 14, the base station transmits scheduling information 1602 to the terminal only in a slot #1 1603 among three aggregated slots. Therefore, when the scheduling information 1602 is successfully acquired, the terminal recognizes the scheduling based on the slot aggregation scheme and does not perform the blind decoding for the downlink control channel including the scheduling information of the downlink data in the remaining slot #2 1604 and slot #3 1605.

The base station repeatedly maps one TB 1601 to data regions 1606, 1607 and 1608 of the slot #1 1603, the slot #2 1604 and the slot #3 1605, respectively, to transmit them to the terminal. The scheduling information 1602 of the slot #1 includes scheduling information for the repeatedly mapped TB 1601.

Then, the terminal feeds back an ACK/NACK indicating the success or not of decoding for the TB 1601 to the base station. The ACK/NACK feedback timing of the terminal may be contained in the scheduling information 1602 and notified to the terminal by the base station, or may be defined as fixed timing. In this case, the terminal transmits an ACK/NACK for the TB 1601 after the ACK/NACK feedback timing from the slot #3 1605 in which the TB 1601 is transmitted finally.

Figure 17:
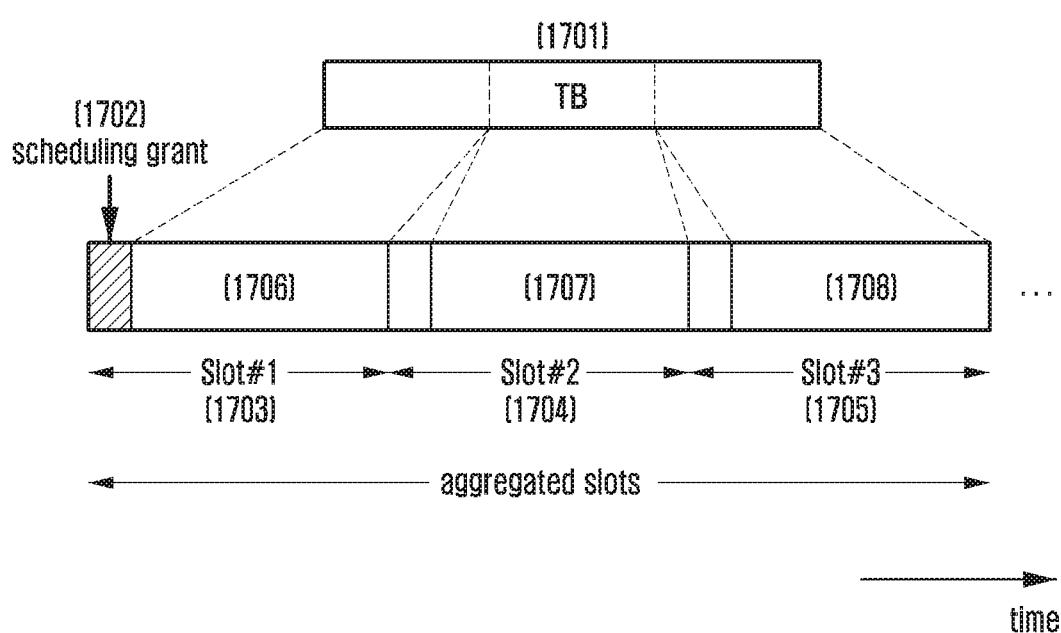
FIG. 17 is a diagram illustrating a downlink data scheduling method of a base station when the third slot aggregation method is applied according to an embodiment of the present disclosure.

FIG. 17 is a diagram illustrating a downlink data scheduling method of a base station when the third slot aggregation method is applied according to an embodiment of the present disclosure.

Unlike the case of FIG. 14, the base station transmits scheduling information 1702 to the terminal only in a slot #1 1703 among three aggregated slots. Therefore, when the scheduling information 1702 is successfully acquired, the terminal recognizes the scheduling based on the slot aggregation scheme and does not perform the blind decoding for the downlink control channel including the scheduling information of the downlink data in the remaining slot #2 1704 and slot #3 1705.

The base station divides and maps one TB 1701 to data regions 1706, 1707 and 1708 of the slot #1 1703, the slot #2 1704 and the slot #3 1705, respectively, to transmit them to the terminal. The scheduling information 1702 of the slot #1 includes scheduling information for the TB 1701.

Then, the terminal feeds back an ACK/NACK indicating the success or not of decoding for the TB 1701 to the base station. The ACK/NACK feedback timing of the terminal may be contained in the scheduling information 1702 and notified to the terminal by the base station, or may be defined as fixed timing. In this case, the terminal transmits an ACK/NACK for the TB 1701 after the ACK/NACK feedback timing from the slot #3 1705 in which the TB 1701 is transmitted finally.

Figure 18:
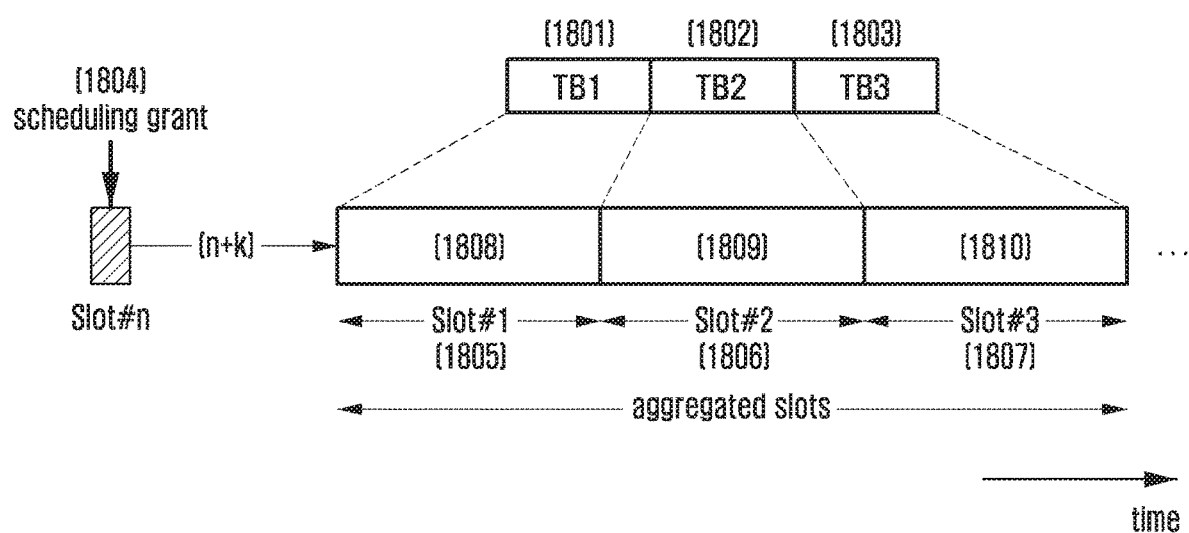
FIG. 18 is a diagram illustrating an uplink data scheduling method of a base station when the first slot aggregation method is applied according to an embodiment of the present disclosure.
Figure 19:
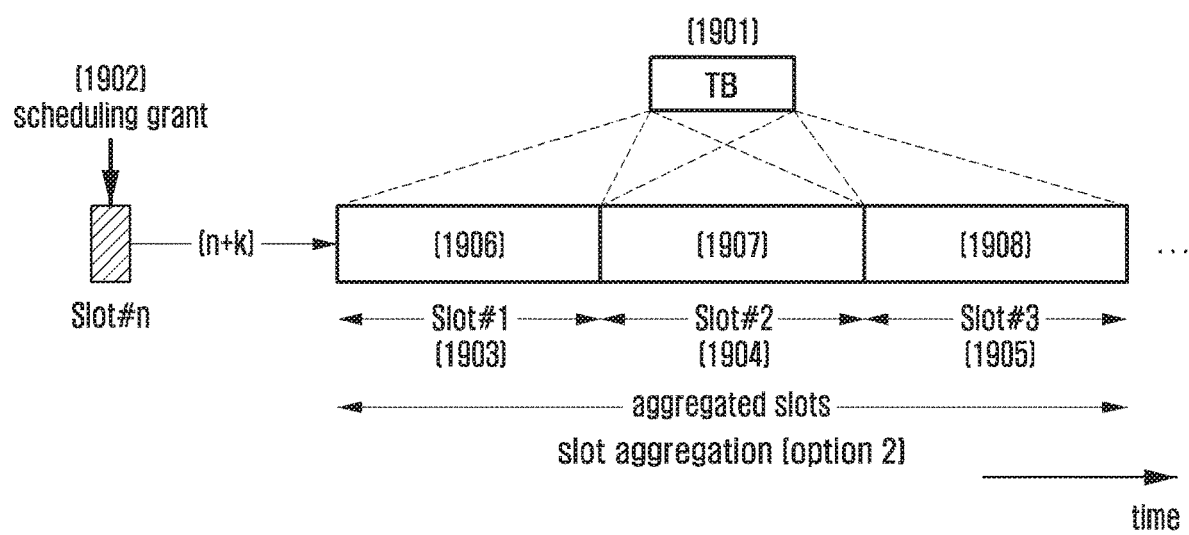
FIG. 19 is a diagram illustrating an uplink data scheduling method of a base station when the second slot aggregation method is applied according to an embodiment of the present disclosure.
Figure 20:
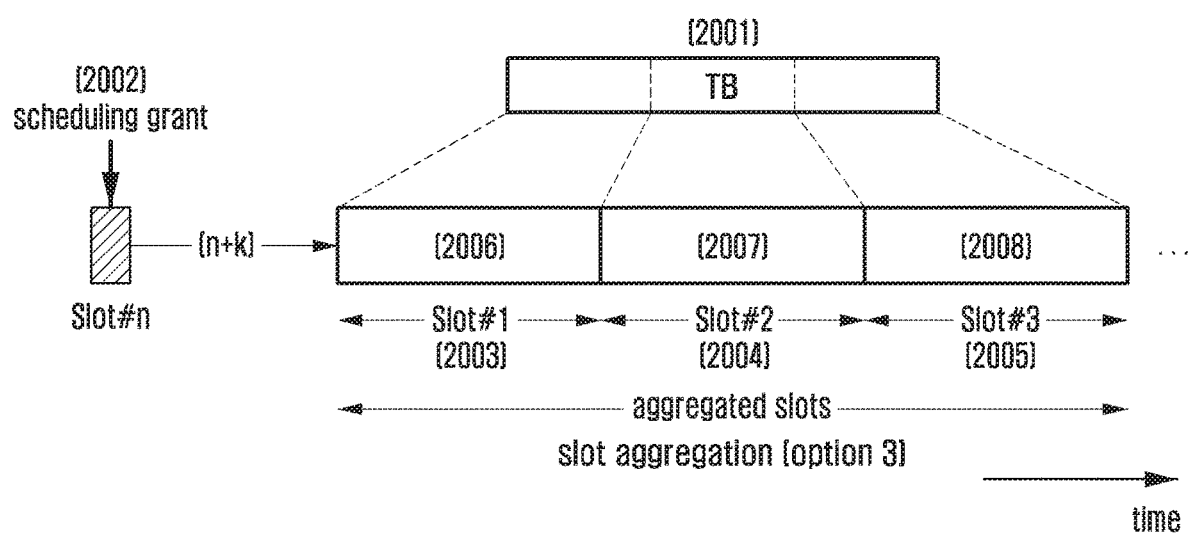
FIG. 20 is a diagram illustrating an uplink data scheduling method of a base station when the third slot aggregation method is applied according to an embodiment of the present disclosure.

FIGS. 18 to 20 show cases where the terminal transmits uplink data by applying the slot aggregation method 1, 2, or 3. In these examples of FIGS. 18 to 20, three slots aggregated for scheduling are exemplarily shown.

FIG. 18 is a diagram illustrating an uplink data scheduling method of a base station when the first slot aggregation method is applied according to an embodiment of the present disclosure.

Referring to FIG. 18, the base station transmits scheduling information 1804 for three aggregated slots to the terminal in a slot #n. The scheduling information 1804 includes information about whether scheduling is based on the slot aggregation scheme, information about a timing relation between the scheduling information transmission time point (slot #n) and an uplink data transmission time point (slot #(n+k)), and the like. Therefore, when the scheduling information 1804 is successfully acquired, the terminal recognizes the scheduling based on the slot aggregation scheme and does not perform the blind decoding for the downlink control channel including the scheduling information of the uplink data for the remaining aggregated slots.

The terminal that successfully acquires the scheduling information 1804 maps a TB1 1801, a TB2 1802 and a TB3 1803 to data regions 1808, 1809 and 1810 of a slot #1 1805, a slot #2 1806 and a slot #3 1807, respectively, to transmit them to the base station.

The scheduling information 1804 includes all scheduling information for the TB1 1801, the TB2 1802 and the TB3 1803. Then, the base station feeds back an ACK/NACK indicating the success or not of decoding for each TB to the terminal.

FIG. 19 is a diagram illustrating an uplink data scheduling method of a base station when the second slot aggregation method is applied according to an embodiment of the present disclosure.

Referring to FIG. 19, the base station transmits scheduling information 1902 for three aggregated slots to the terminal in a slot #n. The scheduling information 1902 includes information about whether scheduling is based on the slot aggregation scheme, information about a timing relation between the scheduling information transmission time point (slot #n) and an uplink data transmission time point (slot #(n+k)), and the like. Therefore, when the scheduling information 1902 is successfully acquired, the terminal recognizes the scheduling based on the slot aggregation scheme and does not perform the blind decoding for the downlink control channel including the scheduling information of the uplink data for the remaining aggregated slots.

The terminal that successfully acquires the scheduling information 1902 repeatedly maps one TB 1901 to data regions 1906, 1907 and 1908 of a slot #1 1903, a slot #2 1904 and a slot #3 1905, respectively, to transmit them to the base station.

The scheduling information 1902 includes scheduling information for the repeatedly mapped TB 1901. Then, the base station feeds back an ACK/NACK indicating the success or not of decoding for the TB to the terminal.

FIG. 20 is a diagram illustrating an uplink data scheduling method of a base station when the third slot aggregation method is applied according to an embodiment of the present disclosure.

Referring to FIG. 20, the base station transmits scheduling information 2002 for three aggregated slots to the terminal in a slot #n. The scheduling information 2002 includes information about whether scheduling is based on the slot aggregation scheme, information about a timing relation between the scheduling information transmission time point (slot #n) and an uplink data transmission time point (slot #(n+k)), and the like. Therefore, when the scheduling information 2002 is successfully acquired, the terminal recognizes the scheduling based on the slot aggregation scheme and does not perform the blind decoding for the downlink control channel including the scheduling information of the uplink data for the remaining aggregated slots.

The terminal that successfully acquires the scheduling information 2002 divides and maps one TB 2001 to data regions 2006, 2007 and 2008 of a slot #1 2003, a slot #2 2004 and a slot #3 2005, respectively, to transmit them to the base station.

The scheduling information 2002 includes scheduling information for the TB 2001. Then, the base station feeds back an ACK/NACK indicating the success or not of decoding for the TB to the terminal.

Figure 21:
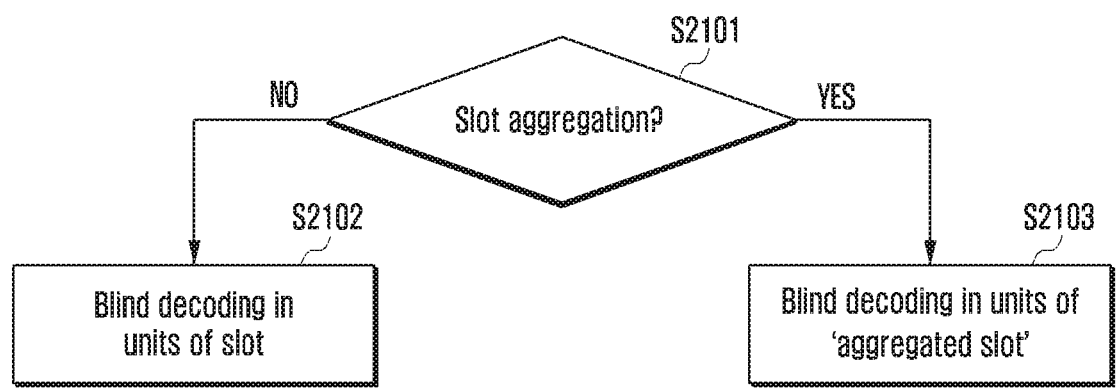
FIG. 21 is a diagram illustrating a terminal procedure based on a slot aggregation method according to an embodiment of the present disclosure.

FIG. 21 is a diagram illustrating a terminal procedure based on a slot aggregation method according to an embodiment of the present disclosure.

Referring to FIG. 21, at operation S2101 the terminal determines whether the slot aggregation is applied.

The terminal acquires information about whether the slot aggregation is applied, or information about how many (N) slots are aggregated, from the base station through the base station signaling. This signaling may be at least one of physical layer signaling, MAC layer signaling, and RRC signaling. Among them, the physical layer signaling is characterized by allowing the quick processing of the terminal.

If it is determined at operation S2101 that the slot aggregation is not applied, the terminal performs the blind decoding for the downlink control channel in units of slot at operations S2102.

However, if it is determined that the slot aggregation is applied, the terminal performs the blind decoding for the downlink control channel in units of N slots at operations S2103. The blind decoding of the terminal includes at least two methods, as follows.

Blind Decoding Method 1: The base station applies information about whether to apply the slot aggregation, and the number (N) of slots to be aggregated, independently to uplink and downlink. Accordingly, the terminal independently processes the blind decoding for the downlink control channel for scheduling the downlink data channel and the blind decoding for the downlink control channel for scheduling the uplink data channel.

For example, the terminal may perform the blind decoding for the downlink control channel for scheduling the uplink data channel in units of N slots by applying the slot aggregation to the uplink, and may perform the blind decoding for the downlink control channel for scheduling the downlink data channel in units of slot by applying no slot aggregation.

Blind Decoding Method 2: The base station applies information about whether to apply the slot aggregation, and the number (N) of slots to be aggregated, in common to uplink and downlink. Accordingly, the terminal commonly processes the blind decoding for the downlink control channel for scheduling the downlink data channel and the blind decoding for the downlink control channel for scheduling the uplink data channel.

When the slot aggregation is applied as described above, a method for determining a transport block size (TBS) will be described through the second embodiment—1, as follows.

Second Embodiment—1

The base station configures DCI for scheduling information about downlink data or uplink data, performs processing such as channel coding and modulation, and then transmits the DCI to the terminal through the downlink physical control channel. The DCI for data scheduling includes HARQ related control information, MCS related control information, RB allocation control information, and an uplink transmit power control (TPC) command.

The HARQ related control information includes at least one of a new data indicator (NDI) indicating whether HARQ is initial transmission or retransmission, a redundancy version (RV) indicating a transmission pattern of HARQ, and HARQ process ID information.

The MCS related control information notifies a modulation scheme used for data transmission and a TBS index (ITBS) for determining the TBS of a transport block (TB) which is data to be transmitted. The TBS corresponds to a size before the channel coding for error correction is applied to the TB.

The RB allocation control information notifies the PRB allocated to data transmission. The size of the RB allocation control information may be determined depending on the system bandwidth and the resource allocation scheme. On the other hand, the HARQ related control information and the MCS related control information are independent of the system bandwidth and may maintain a fixed bit size. The terminal may acquire the number of RBs (NPRB) for data transmission from the RB allocation control information.

The uplink TPC command adjusts the transmission power of an uplink signal of the terminal.

If the slot aggregation is not considered, the terminal determines the TBS by referring to a TBS table from the TBS index (ITBS) and the number of RBs (NPRB) for data transmission which are obtained from the DCI. Table 2 shows a part of the TBS table. The terminal and the base station use the previously agreed TBS table so as to have a common understanding in the TBS calculation.

TABLE 2

| $I_{TBS}$ | \multicolumn{10}{c|}{$N_{PRB}$} | |
|---|---|---|---|---|---|---|---|---|---|---|---|
| | 1 | 2 | 3 | 4 | 5 | 6 | 7 | 8 | 9 | 10 | ... |
| 0 | 16 | 32 | 56 | 88 | 120 | 152 | 176 | 208 | 224 | 256 | ... |
| 1 | 24 | 56 | 88 | 144 | 176 | 208 | 224 | 256 | 328 | 344 | |
| 2 | 32 | 72 | 144 | 176 | 208 | 256 | 296 | 328 | 376 | 424 | |
| 3 | 40 | 104 | 176 | 208 | 256 | 328 | 392 | 440 | 504 | 568 | |
| 4 | 56 | 120 | 208 | 256 | 328 | 408 | 488 | 552 | 632 | 696 | |
| 5 | 72 | 144 | 224 | 328 | 424 | 504 | 600 | 680 | 776 | 872 | |
| 6 | 328 | 176 | 256 | 392 | 504 | 600 | 712 | 808 | 936 | 1032 | |
| 7 | 104 | 224 | 328 | 472 | 584 | 712 | 840 | 968 | 1096 | 1224 | |
| 8 | 120 | 256 | 392 | 536 | 680 | 808 | 968 | 1096 | 1256 | 1384 | |
| 9 | 136 | 296 | 456 | 616 | 776 | 936 | 1096 | 1256 | 1416 | 1544 | |
| 10 | 144 | 328 | 504 | 680 | 872 | 1032 | 1224 | 1384 | 1544 | 1736 | |
| 11 | 176 | 376 | 584 | 776 | 1000 | 1192 | 1384 | 1608 | 1800 | 2024 | |
| 12 | 208 | 440 | 680 | 904 | 1128 | 1362 | 1608 | 1800 | 2024 | 2280 | |
| 13 | 224 | 488 | 744 | 1000 | 1256 | 1544 | 1800 | 2024 | 2280 | 2536 | |
| 14 | 256 | 552 | 840 | 1128 | 1416 | 1736 | 1992 | 2280 | 2600 | 2856 | |
| 15 | 280 | 600 | 904 | 1224 | 1544 | 1800 | 2152 | 2472 | 2728 | 3112 | |
| 16 | 328 | 632 | 968 | 1288 | 1608 | 1928 | 2280 | 2600 | 2984 | 3240 | |
| 17 | 336 | 696 | 1064 | 1416 | 1800 | 2152 | 2536 | 2856 | 3240 | 3624 | |
| 18 | 376 | 776 | 1160 | 1544 | 1992 | 2344 | 2792 | 3112 | 3624 | 4008 | |
| 19 | 408 | 840 | 1288 | 1736 | 2152 | 2600 | 2984 | 3496 | 3880 | 4264 | |
| 20 | 440 | 904 | 1384 | 1864 | 2344 | 2792 | 3240 | 3752 | 4136 | 4584 | |
| 21 | 488 | 1000 | 1480 | 1992 | 2472 | 2984 | 3496 | 4008 | 4584 | 4968 | |
| 22 | 520 | 1064 | 1608 | 2152 | 2664 | 3240 | 3752 | 4264 | 4776 | 5352 | |
| 23 | 552 | 1128 | 1736 | 2280 | 2856 | 3496 | 4008 | 4584 | 5160 | 5736 | |
| 24 | 584 | 1192 | 1800 | 2408 | 2981 | 3624 | 4264 | 4968 | 5544 | 5992 | |
| 25 | 616 | 1256 | 1864 | 2530 | 3112 | 3752 | 4392 | 5160 | 5736 | 6200 | |
| 26 | 712 | 1480 | 2216 | 2984 | 3752 | 4392 | 5160 | 5992 | 6712 | 7480 | |

The TBS determination method will be described with reference to Table 2. For example, it is assumed that the terminal acquires, from scheduling information of the base station, 9 as the TBS index ($I_{TBS}$) and 9 as the number of RBs ($N_{PRB}$) for data transmission. In this case, according to Table 2, the TBS becomes 1416 bits. This means the TBS mapped to the RB for data transmission in one slot which is the basic unit of scheduling.

However, if the slot aggregation is applied, the time unit of scheduling is extended to N slots, and thus available radio resources are increased N times. Therefore, there is a need to adjust the TBS.

For example, the slot aggregation method 3 by which one TBS is transmitted over N slots should further consider, as factors for determining the TBS, the number (N) of slots in addition to the TBS index ($I_{TBS}$) and the number of RBs ($N_{PRB}$) for data transmission. Through this operation, it is possible to prevent a coding rate from being excessively lowered compared to the existing coding rate, and also to reduce the decoding complexity of the terminal or the base station.

For example, when the TBS index ($I_{TBS}$) being 9, the number of RBs ($N_{PRB}$) for data transmission being 9, and the number (N) of aggregated slots being 3 are acquired from the scheduling information of the base station, the terminal temporarily determines the TBS to be 1416 bits according to Table 2. Then, the terminal finally determines the TBS to be 4248 bits (i.e., 1416×3) by reflecting the number (N) of aggregated slots. Further, in order to facilitate the processing of the terminal and the base station, the calculated TBS may be readjusted by rounding up to meet the unit of bytes (i.e., 8 bits).

The TBS may be generalized depending on whether the slot aggregation is applied, as follows.

If the slot aggregation is not applied, the TBS is:
TBS=f(TBS index ($I_{TBS}$), Number of RBs ($N_{PRB}$) for data transmission)

If the slot aggregation is applied, the TBS is:
TBS=f(TBS index ($I_{TB}$s), Number of RBs ($N_{PRB}$) for data transmission, Number (N) of aggregated slots)

In the above, the function f(x) means a TBS determination function having x as input factors.

Figure 22:
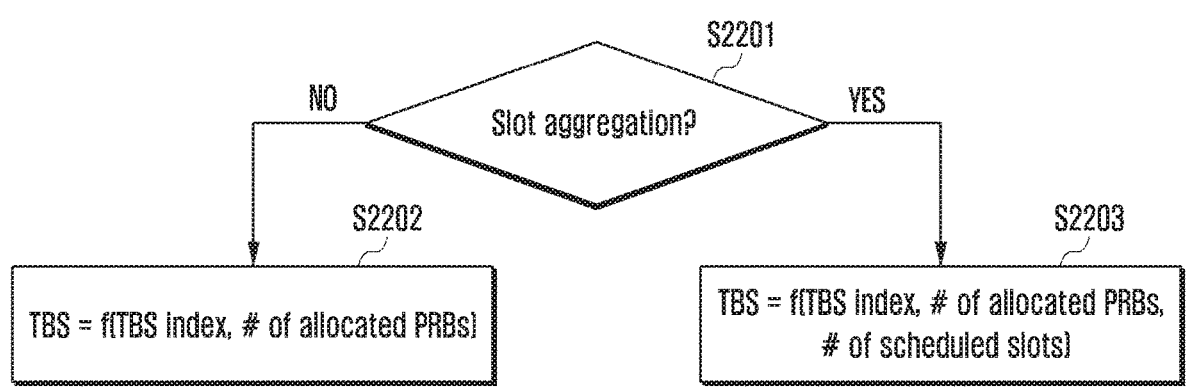
FIG. 22 is a diagram illustrating a procedure for determining a transport block size (TBS) depending on whether slot aggregation or not, according to an embodiment of the present disclosure.

FIG. 22 is a diagram illustrating a procedure for determining a TBS depending on whether slot aggregation or not according to an embodiment of the present disclosure.

Referring to FIG. 22, at operation S2201 the terminal determines whether the slot aggregation is applied.

The terminal acquires information about whether the slot aggregation is applied, or information about how many (N) slots are aggregated, from the base station through the base station signaling. This signaling may be at least one of physical layer signaling, MAC layer signaling, and RRC signaling. Among them, the physical layer signaling is characterized by allowing the quick processing of the terminal.

If it is determined at operation S2201 that the slot aggregation is not applied, the terminal determines the TBS at operation S2202, based on a function, TBS=f(TBS index ($I_{TBS}$), Number of RBs ($N_{PRB}$) for data transmission).

However, if it is determined that the slot aggregation is applied, the terminal determines the TBS at operation S2203, based on another function, TBS=f(TBS index ($I_{TBS}$), Number of RBs ($N_{PRB}$) for data transmission, Number (N) of aggregated slots).

This procedure of FIG. 22 may be equally applied to the TBS determination procedure of the base station.

By the way, the above-discussed slot aggregation method 1 or 2 may comply with a typical TBS determination method regardless of the slot aggregation because one TBS is mapped to one slot.

As another method for determining the TBS when the slot aggregation is applied, the TBS table composed of TBS values determined by the function f(x) when the slot aggregation is applied may be defined according to the number (N) of aggregated slots.

The second embodiment may be modified variously. For example, in case of considering aggregation in the frequency domain, the TBS may be determined in a similar manner. For example, when aggregation is applied in units of sub-bands having a certain size in the frequency domain, the TBS may be generalized as follows.

TBS=f(TBS index ($I_{TBS}$), Number of RBs ($N_{PRB}$) for data transmission, Number (M) of aggregated frequency domain sub-bands)

As another example, in case of applying scheduling in units of mini-slot, the TBS may be determined. The mini-slot is a scheduling unit smaller in size than the slot in the time domain, and one slot may be composed of K mini-slots. Therefore, for scheduling in units of mini-slot, the TBS may be generalized as follows.

TBS=f(TBS index ($I_{TBS}$), Number of RBs ($N_{PRB}$) for data transmission, 1/K)

When the slot aggregation is applied as described above, a method for controlling UL Tx power will be described hereinafter through the second embodiment—2.

Second Embodiment—2

Now, the concept of the second embodiment—2 will be described with reference to FIG. 23.

Figure 23:
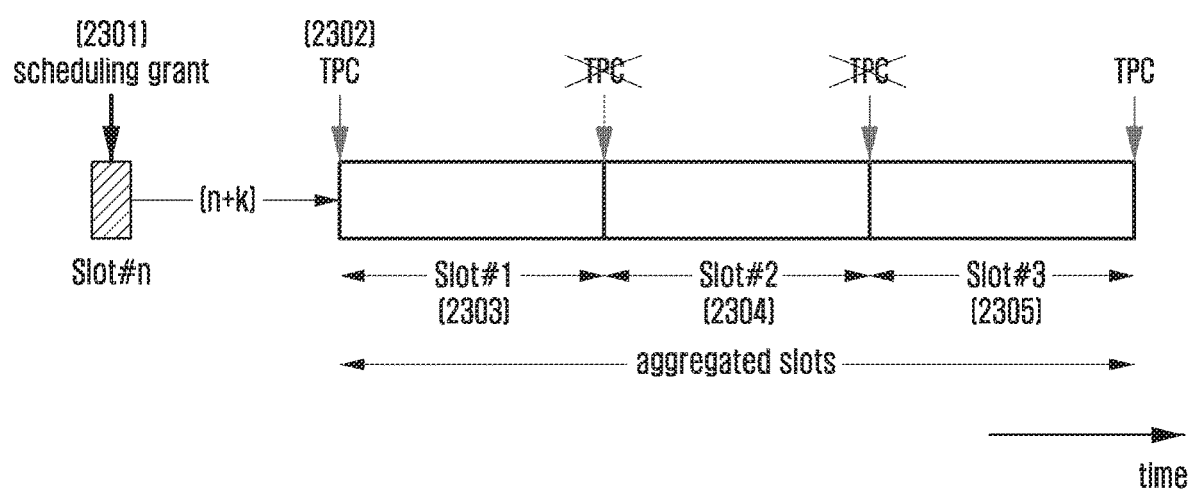
FIG. 23 is a diagram illustrating a method for adjusting transmission power of an uplink signal of a terminal according to an embodiment of the present disclosure.

FIG. 23 is a diagram illustrating a method for adjusting transmission power of an uplink signal of a terminal according to an embodiment of the present disclosure.

Referring to FIG. 23, the scheduling information 2301 for downlink data or uplink data transmitted by the base station includes an uplink TPC command 2302 of the terminal. The base station adjusts the transmission power of an uplink signal of the terminal through the uplink TPC command, basically, in units of slot which is a basic unit of scheduling. However, when the slot aggregation is applied, it is necessary to reduce the complexity of the reception operation of the base station by keeping a transmission power value of the terminal constant in the aggregated N slots. This is particularly useful when a signal to be transmitted is modulated by means of a quadrature amplitude modulation (QAM) scheme. The QAM scheme represents information to be transmitted according to the size and phase of a signal. Therefore, if a signal size changes during a transmission interval according to the TPC command, the receiver may be confronted with an increase in the complexity of the demodulation operation or a lowering of reception performance. Accordingly, when the slot aggregation is applied, the terminal keeps a transmission power value thereof constant in the aggregated N slots by applying the obtained TPC command only once to a starting point of the first slot (slot #1; 2303) among the aggregated N slots without applying the TPC command to the remaining N−1 slots (slot #2; 2304, slot #3; 2305) (namely, TPC=0 for the remaining N−1 slots).

Figure 24:
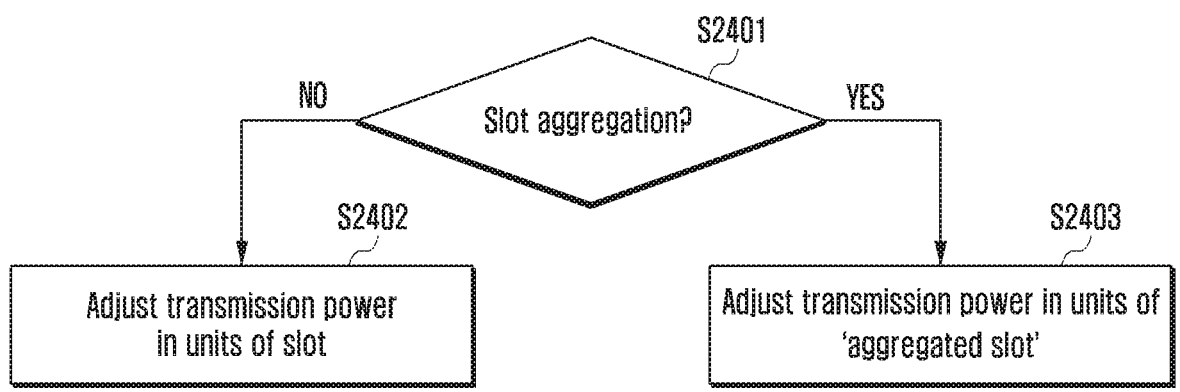
FIG. 24 is a diagram illustrating a method for adjusting transmission power of a terminal depending on whether slot aggregation or not according to an embodiment of the present disclosure.

FIG. 24 is a diagram illustrating a method for adjusting transmission power of a terminal depending on whether slot aggregation or not according to an embodiment of the present disclosure.

Referring to FIG. 24, at operation S2401 the terminal determines whether the slot aggregation is applied.

The terminal acquires information about whether the slot aggregation is applied, or information about how many (N) slots are aggregated, from the base station through the base station signaling. This signaling may be at least one of physical layer signaling, MAC layer signaling, and RRC signaling. Among them, the physical layer signaling is characterized by allowing the quick processing of the terminal.

If it is determined at operation S2401 that the slot aggregation is not applied, the terminal adjusts the transmission power in units of slot at operation S2402.

However, if it is determined that the slot aggregation is applied, the terminal adjusts the transmission power in units of aggregated slots at operation S2403.

The procedure of FIG. 24 may be applied in common regardless of whether a signal transmitted by the terminal is a data channel or a control channel.

When the slot aggregation is applied as described above, a method for calculating how the HARQ soft buffer for the HARQ operation of the terminal is divided for each HARQ process will be described hereinafter through the second embodiment—3.

Second Embodiment—3

In the HARQ operation, the terminal generates a decoding result as ACK/NACK control information in response to data transmitted by the base station and feeds back the ACK/NACK control information to the base station. In case of NACK, a series of transmission and reception procedures are required until the base station retransmits the data, so that a time interval occurs between the initial data transmission and the data retransmission. Therefore, during this time interval, the base station may efficiently use radio resources by transmitting any other data to the terminal.

The HARQ process is a kind of ID for the data, and enables the receiver to perform the HARQ combining with respect to data of the same HARQ process. The use of a plurality of HARQ processes allows efficient utilization of radio resources. Normally, one HARQ process is allocated to one slot.

Figure 25:
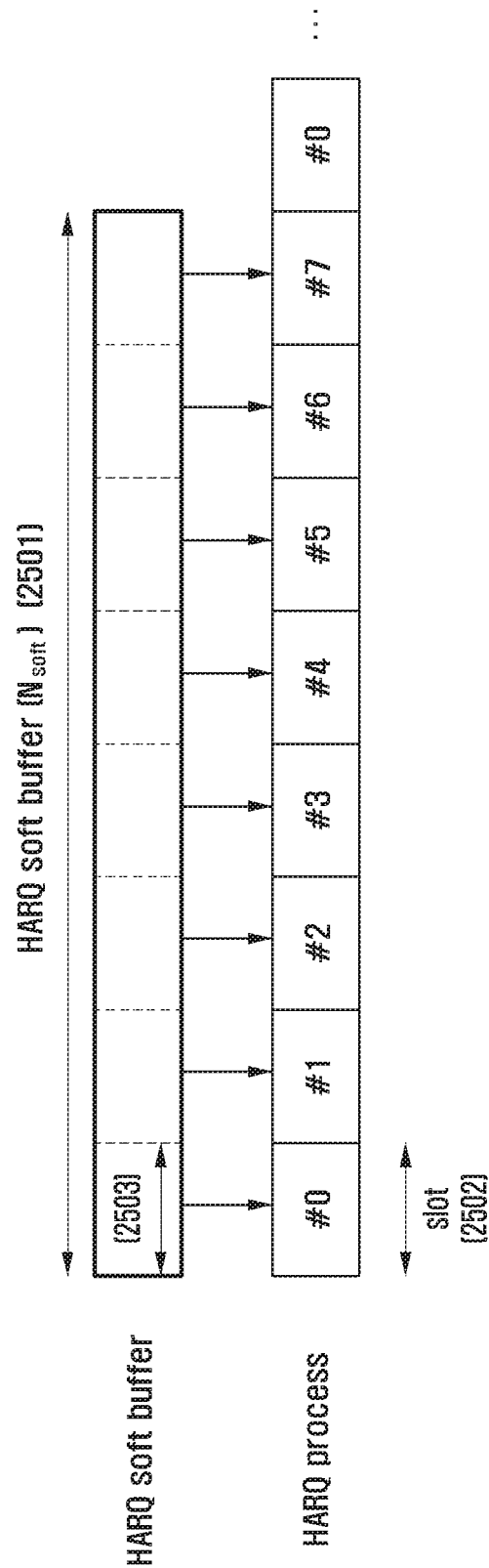
FIG. 25 is a diagram illustrating a soft buffer size for each hybrid automatic repeat request (HARQ) process when slot aggregation is not applied.

FIG. 25 exemplarily shows that the HARQ soft buffer of the terminal is divided according to HARQ processes when the maximum number of HARQ processes ($M_{HARQ}$) is 8 and when the slot aggregation is not applied according to an embodiment of the present disclosure.

If the HARQ soft buffer size of the terminal is defined as $N_{soft}$ 2501, the soft buffer size allocable for each HARQ process is '$N_{soft}/M_{HARQ}$', e.g., '$N_{soft}/8$'. That is, if the terminal fails in data decoding with respect to the HARQ process #n, the decoding-failed data corresponding to '$N_{soft}/8$' bits 2503 is stored in the soft buffer for the HARQ process #n.

Figure 26:
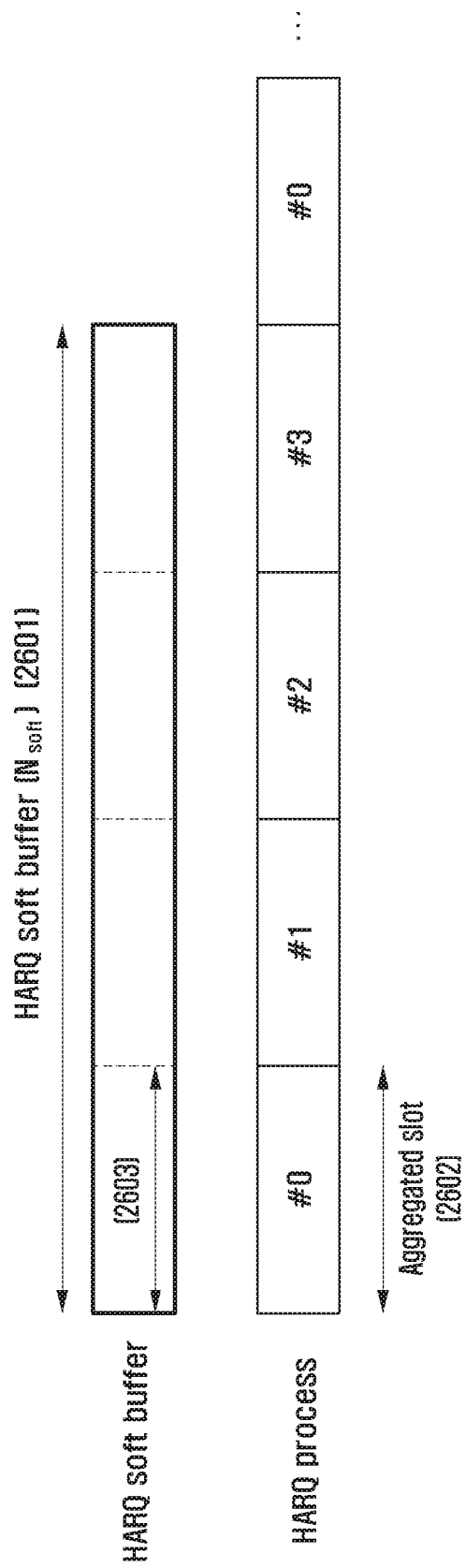
FIG. 26 is a diagram illustrating a method for dividing an HARQ soft buffer for each HARQ process when slot aggregation is applied according to an embodiment of the present disclosure.

FIG. 26 exemplarily shows that the HARQ soft buffer of the terminal is divided according to HARQ processes when the slot aggregation is applied according to an embodiment of the present disclosure.

When the TB is mapped to the aggregated N slots according to the above-discussed slot aggregation method 3, one HARQ process is allocated to the aggregated N slots.

Referring to FIG. 26, up to four HARQ processes are possible when two slots are aggregated. Therefore, when the HARQ soft buffer size of the terminal is defined as $N_{soft}$ 2601), the soft buffer size allocable for each HARQ process is '$N_{soft}/M_{HARQ}/N$', e.g., '$N_{soft}/8/2=N_{soft}/4$'. That is, if the terminal fails in data decoding with respect to the HARQ process #n, the decoding-failed data corresponding to '$N_{soft}/4$' bits 2603 is stored in the soft buffer for the HARQ process #n. As a result, the soft buffer size for each HARQ process is greater when the slot aggregation is applied than when the slot aggregation is not applied.

The soft buffer size for each HARQ process may be generalized depending on whether the slot aggregation is applied, as follows.

If the slot aggregation is not applied:
Soft buffer size for each HARQ process=$g(M_{HARQ})$
If the slot aggregation is applied:
Soft buffer size for each HARQ process=$g(M_{HARQ},$ Number (N) of aggregated slots), or
Soft buffer size for each HARQ process=$g(M'_{HARQ})$, $M'_{HARQ}=M_{HARQ}/N$ In the above, the function g(x) means a function of determining a soft buffer size per HARQ process which has x as input factors. In addition, $M_{HARQ}$ denotes the maximum number of HARQ processes when the slot aggregation is not applied, and $M'_{HARQ}$ denotes the maximum number of HARQ processes when the slot aggregation is applied.

Meanwhile, in LTE, the soft buffer size per TB ($N_{IR}$) is determined by the following equation.

$$N_{IR} = \left\lfloor \frac{N_{soft}}{K_C \cdot K_{MIMO} \cdot \min(M_{DL\_HARQ}, M_{limit})} \right\rfloor$$

$N_{soft}$: HARQ soft buffer size (or soft channel bit size) determined by terminal capability
$N_{IR}$: Soft buffer size per TB
$M_{DL\_HARQ}$: Maximum number of HARQ processes in downlink data transmission
$K_{MIMO}$: Parameter considering MIMO transmission, being 2 in transmission of two codewords, and being 1 in transmission of one codeword
$K_C$: Number of component carriers
$M_{limit}$: Constant, fixed to 8, which limits the maximum number of HARQ processes When the above equation is transformed to case of applying the slot aggregation, the soft buffer size per TB ($N_{IR}$) may be calculated as follows.

$$N_{IR} = \left\lfloor \frac{N_{soft}}{K_C \cdot K_{MIMO} \cdot \min(M_{DL\_HARQ}/N, M_{limit})} \right\rfloor \text{ or}$$

$$N_{IR} = \left\lfloor \frac{N_{soft} \cdot N}{K_C \cdot K_{MIMO} \cdot \min(M_{DL\_HARQ}, M_{limit})} \right\rfloor$$

As a modification of the second embodiment—3, the soft buffer size per HARQ process may be determined in a similar manner even in case of applying scheduling in units of mini-slot. The mini-slot is a scheduling unit smaller in size than the slot in the time domain, and one slot may be composed of K mini-slots. Therefore, for scheduling in units of mini-slot, the soft buffer size per HARQ process may be generalized as follows.

Figure 27:
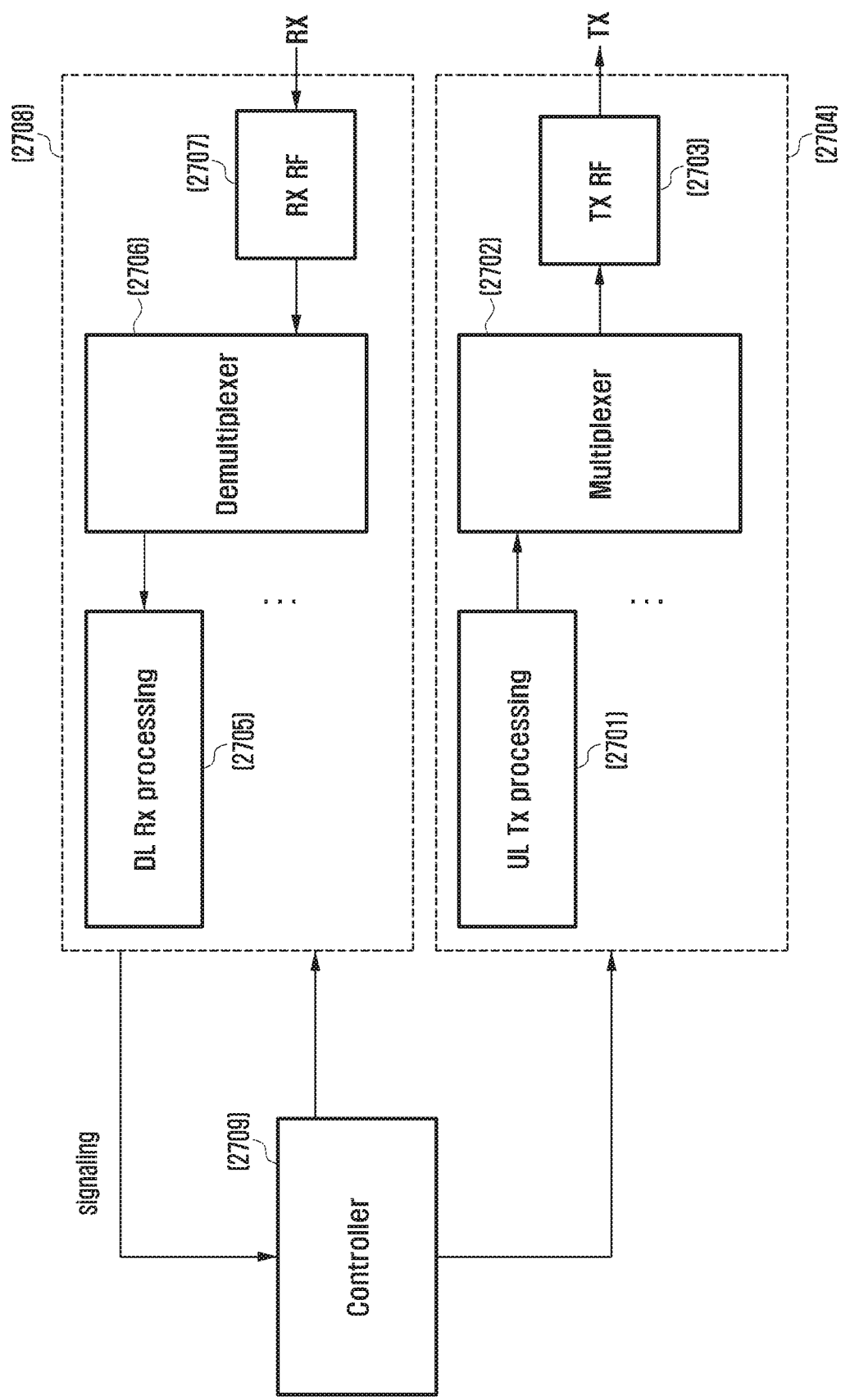
FIG. 27 is a diagram illustrating a terminal according to an embodiment of the present disclosure.

Soft buffer size for each HARQ process=$g(M_{HARQ}, 1/K)$, or
Soft buffer size for each HARQ process=$g(M'_{HARQ})$, $M'_{HARQ}=M_{HARQ} \times K$ FIG. 27 shows a terminal according to an embodiment of the present disclosure.

For convenience of explanation, the description and illustration of elements which are not directly related to the present disclosure are omitted.

Referring to FIG. 27, the terminal includes a transmitter 2704, a receiver 2708, and a controller 2709. The transmitter 2704 is composed of an UL Tx processing block 2701, a multiplexer 2702, and a Tx RF block 2703. The receiver 2708 is composed of a DL Rx processing block 2705, a demultiplexer 2706, and a Rx RF block 2707.

The controller 2709 controls the respective blocks of the receiver 2708 for receiving a DL signal and the respective blocks of the transmitter 2704 for transmitting an UL signal, based on the control information, acquired through the base station signaling, such as information about whether the slot aggregation is applied, or information about how many slots are aggregated.

In the transmitter 2704 of the terminal, the UL Tx processing block 2701 generates a signal to be transmitted by performing a process such as channel coding and modulation. The signal generated by the UL Tx processing block 2701 is multiplexed with any other UL signal by the multiplexer 2702, processed by the Tx RF block 2703, and transmitted to the base station.

The receiver 2708 of the terminal demultiplexes a signal received from the base station and distributes it to the respective DL Rx processing blocks. The DL Rx processing block 2705 acquires control information or data transmitted by the base station by performing a process such as demodulation and channel decoding of the received signal. The terminal receiver 2708 offers an output result of the DL Rx processing block 2705 to the controller 2709 to support the operation of the controller 2709.

While the present disclosure has been particularly shown and described with reference to various embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

Third Embodiment

Hereinafter, embodiments of the present disclosure will be described with reference to the accompanying drawings. In the following description, well known elements, functions, operations, techniques, etc. may not be described or illustrated in detail to avoid obscuring the subject matter of the present disclosure. In addition, the terms used herein are defined in consideration of the functions of this disclosure, and may be varied according to the intention of the user, the operator, or the like. Therefore, the definition should be based on this disclosure.

Described hereinafter is a technique for a terminal to receive broadcast information from a base station in a wireless communication system. The present disclosure relates to a communication technique and system for integrating the 5G communication system, which supports a higher data rate than the 4G system, with IoT technology. Based on the 5G communication technology and the IoT related technology, this disclosure may be applied to intelligent services (e.g., smart home, smart building, smart city, smart car or connected car, health care, digital education, retail, security and safety related service, etc.).

The terms referring to broadcast information, the terms referring to control information, the terms related to communication coverage, the terms (e.g., an event) referring to a status change, the terms referring to a network entity, the terms referring to messages, the terms referring to elements of an apparatus, etc. are used hereinafter for convenience of explanation. Therefore, the present disclosure is not limited by such terms, and other terms having equivalent technical meanings may be used alternatively.

For convenience of explanation, some terms and names defined in the 3rd generation partnership project long term evolution (3GPP LTE) standard may be used. However, the present disclosure is not limited by such terms and names, and may be equally applied to any other system that conforms to any other standard.

Outgrowing an initial voice-oriented service, the wireless communication system is evolving into a wideband wireless communication system for providing a high-speed, high-quality packet data service, based on various communication standards such as high speed packet access (HSPA), LTE, E-UTRA, LTE-A or LTE-Pro of 3GPP, high rate packet data (HRPD) or ultra mobile broadband (UMB) of 3GPP2, and 802.16 of IEEE.

The LTE system, which is an example of a wideband wireless communication system, adopts an OFDM scheme for downlink (DL) and also adopts a SC-FDMA scheme for uplink (UL). The uplink refers to a radio link in which the terminal (also referred to as user equipment (UE) or a mobile station (MS)) transmits data or control signals to the base station (also referred to as BS or eNode B). The downlink refers to a radio link in which the base station transmits data or control signals to the terminal. The above multiple access scheme distinguishes data or control information according to users by allocating and operating time-frequency resources for transmitting the data or control information for each user so as not to be overlapped with each other, namely, so as to realize the orthogonality.

A future communication system after LTE, namely, the 5G communication system, should satisfy various requirements of a user and a service provider and also support services that meets such requirements. The services considered for the 5G communication system include eMBB, mMTC, ultra reliable low latency communication (URLLC), and the like.

The eMBB aims to provide a data rate higher than a data rate supported by the existing LTE, LTE-A or LTE-Pro. For example, in the 5G communication system, the eMBB is required to provide a peak data rate of 20 Gbps in the downlink and a peak data rate of 10 Gbps in the uplink in view of one base station. At the same time, the eMBB should provide an enhanced user-perceived data rate. In order to satisfy such requirements, the improvement of transmission/reception technology is needed including further enhanced multi-input multi-output (MIMO) technology. Also, by using a frequency bandwidth greater than 20 MHz in a frequency band of 3~6 GHz or more than 6 GHz instead of the 2 GHz band currently used by LTE, the data rate required in the 5G communication system can be satisfied.

In addition, the mMTC is considered to support application services such as internet of thing (IoT) in the 5G communication system. In order to efficiently provide the IoT, the mMTC requires supporting the access of a large number of terminals in a cell, enhancing the coverage of the terminal, increasing a battery life, and reducing the cost of the terminal. Because of providing a communication function for various sensors and devices, the IoT should be capable of supporting a large number of terminals (e.g., 1,000,000 terminals/km$^2$) in a cell. Also, the terminal supporting the mMTC is likely to be located in a shaded area, such as a building underground, out of the coverage of a cell, the mMTC requires a wider coverage than other services provided by the 5G communication system. The terminal supporting the mMTC should be a low-cost terminal, and also requires a very long battery life because it is difficult to exchange the battery frequently.

Finally, the URLLC is a cellular-based wireless communication service that is used for mission-critical purposes, such as a remote control for a robot or machinery, an industrial automation, an unmanaged aerial vehicle, a remote health care, and an emergency alert, and should provide communication of ultra-high reliability and ultra-low latency. For example, a service that supports the URLLC should meet air interface latency of less than 0.5 milliseconds, and also have a packet error rate of less than $10^{-5}$. Therefore, for a service supporting the URLLC, the 5G system should provide a smaller transmit time interval (TTI) than other services, and also have a design requirement of having to allocate a wide resource in the frequency band.

The above-discussed services considered in the 5G communication system should be integrated with each other, based on a single framework. That is, for an effective resource management and control, it is desirable that such services are controlled and transmitted by being integrated into one system rather than being operated independently.

The base station and the terminals, which are apparatuses constituting the 5G communication system, should maintain synchronization with each other in downlink and uplink. The downlink synchronization includes a process in which the terminal performs time/frequency synchronization with the base station by using a synchronization signal received from the base station and acquires cell information (e.g., a unique cell number (Cell ID)) of the base station. Also, the uplink synchronization includes a process of adjusting the transmission timing of the terminal so that uplink signals of the terminals in a cell can arrive at the base station within a CP cycle. Unless otherwise specified, the synchronization used herein means the downlink synchronization in which the terminal performs time and frequency synchronization with respect to a base station signal and obtains cell information.

In the current 5G communication system, the following requirements are considered for the downlink synchronization of the terminal.

First, the downlink synchronization required in the 5G communication system aims at providing a common framework regardless of services provided in the 5G system. Namely, a synchronization signal and procedure should be provided so that the terminal can perform synchronization and system access in accordance with a common synchronization signal structure and a common synchronization procedure regardless of various requirements of different services provided by the 5G communication system.

In the 5G communication system, a method and procedure for the downlink synchronization of the terminal should be designed to be unvaried regardless of beam modes used to improve the data rate and coverage by the base station. In the 5G communication system, especially the millimeter wave based communication system, beam-based transmission is particularly required because of various attenuation characteristics including higher path loss attenuation. For the same reasons, the synchronization signal also requires beam-based transmission. The 5G communication system considers multi-beam and single-beam based transmission and reception techniques to compensate for a path loss described above. The multi-beam based transmission is a method using a plurality of beams having a narrow beam width and a large beam gain. Since beams having a narrow beam width should cover wide angles, the signal should be transmitted through a plurality of beams in a plurality of directions. The single-beam based transmission is a method using a single beam having a wide beam width and a small beam gain. Insufficient coverage caused by a small beam gain may be supplemented with repetitive transmission or the like. The downlink synchronization signal also requires beam-based transmission as in case of data transmission, and the 5G communication system aims at providing the same access procedure regardless of the above-mentioned beams. Namely, in the initial access process, the terminal should be capable of the time and frequency synchronization with the base station and the cell search, based on the synchronization signal without information about a beam operation scheme used for the synchronization signal transmission.

Also, in the 5G communication system, a method and procedure for the synchronization of the terminal should be designed regardless of a duplex mode operated by the base station. In LTE, different transmission methods of the synchronization signal are used depending on a time division duplex (TDD) and a FDD.

Specifically, an index of an OFDM symbol through which a primary synchronization signal and a secondary synchronization signal constituting the synchronization signal are transmitted is designed differently depending on whether the base station uses TDD or FDD. Therefore, the terminal may determine the duplex mode of the base station by using a time difference indicated by the OFDM symbol between the primary and secondary synchronization signals. However, if the position of the synchronization signal varies according to the duplex, the terminal in the synchronization process has a burden of having to detect it. That is, problems such as an increase in the complexity of the terminal and an increase in the power consumption during the synchronization process may be caused. Thus, in the 5G communication system, the same transmission and procedure of the synchronization signal are required regardless of the duplex mode.

Also, in the 5G communication system, a method and procedure for the synchronization of the terminal should be designed equally regardless of the numerology provided by the base station. In the 5G communication system, a plurality of numerologies may be used to efficiently provide services that need various requirements. Here, the numerology includes a subcarrier spacing and the length of a CP which are necessary for signal generation in OFDM-based modulation and demodulation. It is therefore desirable that the terminal and the base station comply with the same downlink synchronization method and procedure regardless of various values of the subcarrier spacing or various lengths of the CP which are provided in the 5G communication system.

Additionally, in the 5G communication system, a method and procedure for the synchronization of the terminal should be designed equally regardless of whether the frequency band operated by the base station is operating in a standalone mode or a non-standalone mode. Further, a method and procedures for synchronization of the terminal in the 5G communication system are required to be designed equally regardless of whether the frequency band is a licensed band or an unlicensed band.

In a downlink method and apparatus of the terminal provided in the 5G communication system, the synchronization method and procedure should be designed as in LTE such that the terminal can perform the time and frequency synchronization with the base station in order to perform communication with the base station and also can perform the cell search. For the synchronization and cell search of the terminal, the base station should transmit a synchronization signal including cell information. By detecting the synchronization signal, the terminal may perform the time and frequency synchronization and obtain the cell information.

In order to achieve the above object, the 5G communication system considers two kinds of synchronization signals and physical broadcast channels as in LTE. In the 5G communication system, the synchronization signals transmitted by the base station to enable the terminal to perform the initial synchronization and cell search may be classified into a first synchronization signal and a second synchronization signal.

The first synchronization signal may be referred to as the primary synchronization signal. The first synchronization signal may be transmitted for the purpose of enabling the terminal to perform synchronization with respect to the time and frequency on which the base station is based. Also, the first synchronization signal may include a part of the cell information. Here, the cell information refers to a unique cell number allocated to the base station controlling a cell. The first synchronization signal may be used as a RS for coherent detection of the second synchronization signal.

The second synchronization signal may be referred to as the secondary synchronization signal. The second synchronization signal may be used for detection of the cell information. If a part of the cell information is included in the first synchronization signal, the remaining cell information may be transmitted in the second synchronization signal. If the cell information is not included in the first synchronization signal, the terminal may acquire the cell information from only the second synchronization signal. Also, the second synchronization signal may be used as a RS for coherent demodulation in receiving a broadcast channel transmitted by the base station after the terminal detects the cell number.

Using the first synchronization signal and the second synchronization signal described above, the terminal may perform the time and frequency synchronization with the base station and also perform the cell search. Then, using a broadcast channel transmitted by the base station, the terminal may acquire important information necessary for system access. Here, the broadcast channel may also be referred to as PBCH as in LTE. In the LTE, the PBCH for the same purpose is transmitted by the base station, and the PBCH provided in the LTE includes the following information.

System frequency size
Physical HARQ Indicator Channel (PHICH) reception information
System frame number
Number of antenna ports The information transmitted through the PBCH is the minimum information for obtaining the system information necessary for the terminal to access the base station. In the 5G communication system, information to be transmitted through the PBCH may be different from information to be transmitted in the LTE PBCH. For example, the LTE PBCH sends information necessary for the terminal to receive the PHICH. In contrast, the 5G system that operates asynchronous-based HARQ for uplink HARQ does not need the PHICH, thus requiring no information for receiving the PHICH.

In the present disclosure, all of the first synchronization signal, the second synchronization signal, and the broadcast channel may be referred to as a synchronization block. However, the synchronization block considered in the present disclosure is not limited to including the first synchronization signal, the second synchronization signal, and the broadcast channel, and any other information necessary for the time and frequency synchronization and cell search of the terminal may be included in the synchronization block.

Figure 28:
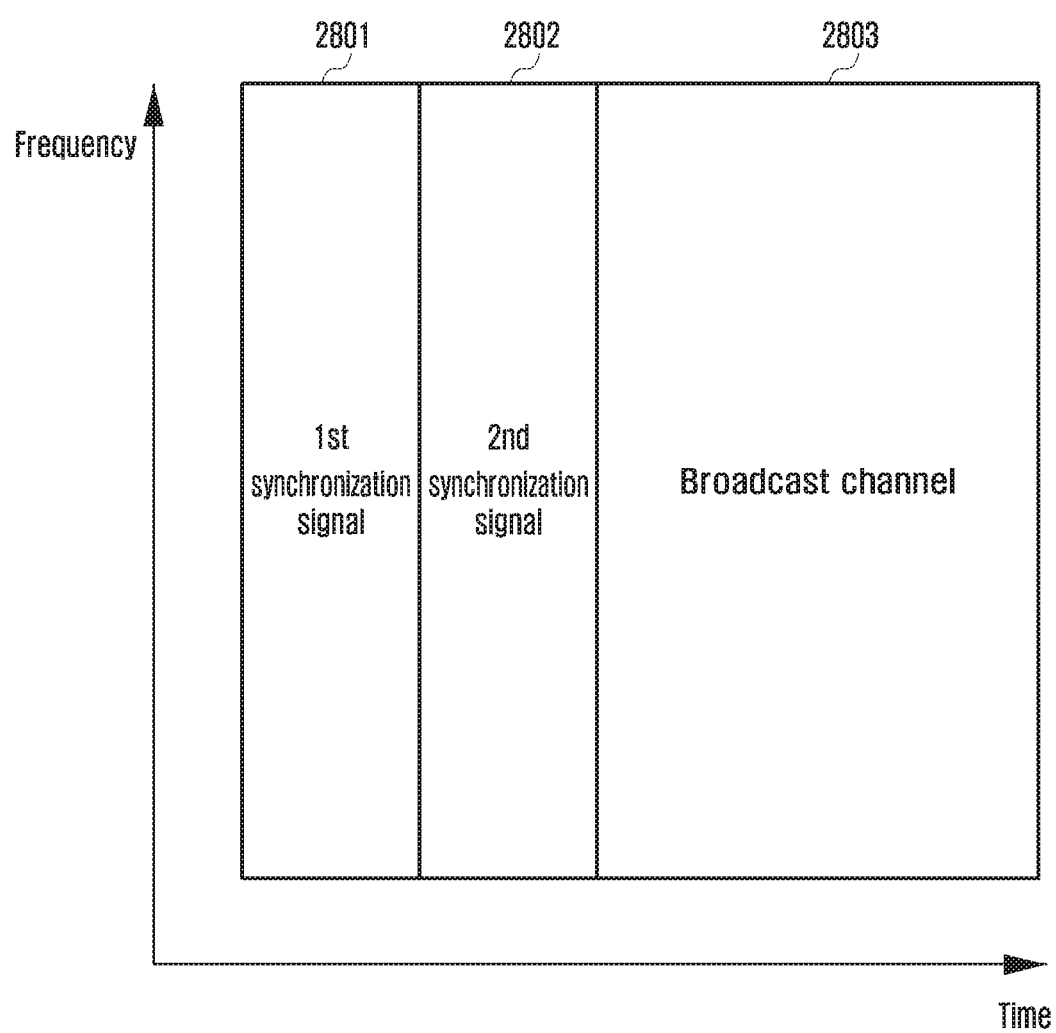
FIG. 28 is a diagram illustrating an example of a synchronization signal and broadcast channel structure of the 5G communication system according to an embodiment of the present disclosure.

FIG. 28 is a diagram illustrating an example of a synchronization signal and broadcast channel structure of the 5G communication system according to an embodiment of the present disclosure.

Referring to FIG. 28, the synchronization signal of the 5G communication system according to the present disclosure includes a first synchronization signal 2801, a second synchronization signal 2802, and a broadcast channel 2803. In FIG. 28, the first synchronization signal 2801, the second synchronization signal 2802, and the broadcast channel 2803 are transmitted at the same position in the frequency domain, and have a time division multiplexing structure for transmission at different times.

The first synchronization signal 2801 may be composed of at least one OFDM symbol. Although it is assumed herein that the first synchronization signal 2801 is composed of one OFDM symbol, the present disclosure is not limited to the number of OFDM symbols used for the first synchronization signal 2801. As in LTE, the first synchronization signal 2801 may be configured using a Zadoff-Chu sequence (ZC sequence) having excellent cross correlation characteristics. The length of the ZC sequence and detailed frequency mapping used in the first synchronization signal 2801 will be described below.

The second synchronization signal 2802 may also be composed of at least one OFDM symbol similar to the first synchronization signal 2801. Although it is proposed herein that the second synchronization signal 2802 is composed of two OFDM symbols, the present disclosure is not limited to the number of OFDM symbols used for the second synchronization signal 280s.

While the second synchronization signal 2802 is generated by using a pseudo noise (PN) sequence or a maximum-length sequence (M-sequence) in LTE, the second synchronization signal 2802 according to the present disclosure does not exclude the use of any other sequence. For example, the synchronization signal may be configured using the ZC sequence, and a message in which a cyclic redundancy check (CRC) is added to cell information and then a forward error correction coding is performed may be used for transmission of the second synchronization signal 2802.

The broadcast channel 2803 may be composed of a plurality of OFDM symbols in consideration of the size and coverage of information to be transmitted.

In the present disclosure, it is assumed that the first synchronization signal 2801, the second synchronization signal 2802, and the broadcast channel 2803 are transmitted with the same frequency width. The exact frequency width may vary depending on a sequence forming the synchronization signal and a method of mapping the sequence to a subcarrier of OFDM.

When the first synchronization signal 2801, the second synchronization signal 2802, and the broadcast channel 2803 have a time division multiplexing structure as shown in FIG. 28, the base station has an advantage of maximizing the coverage of the synchronization signal, if necessary. In addition, since the first synchronization signal 2801, the second synchronization signal 2802, and the broadcast channel 2803 are transmitted at the same frequency position, the terminal has an advantage of performing the coherent demodulation of the broadcast channel 2803 by using the second synchronization signal 2802. Therefore, for the transmission of the synchronization signals of the 5G system, the signal structure as shown in FIG. 28 may be considered.

Figure 29:
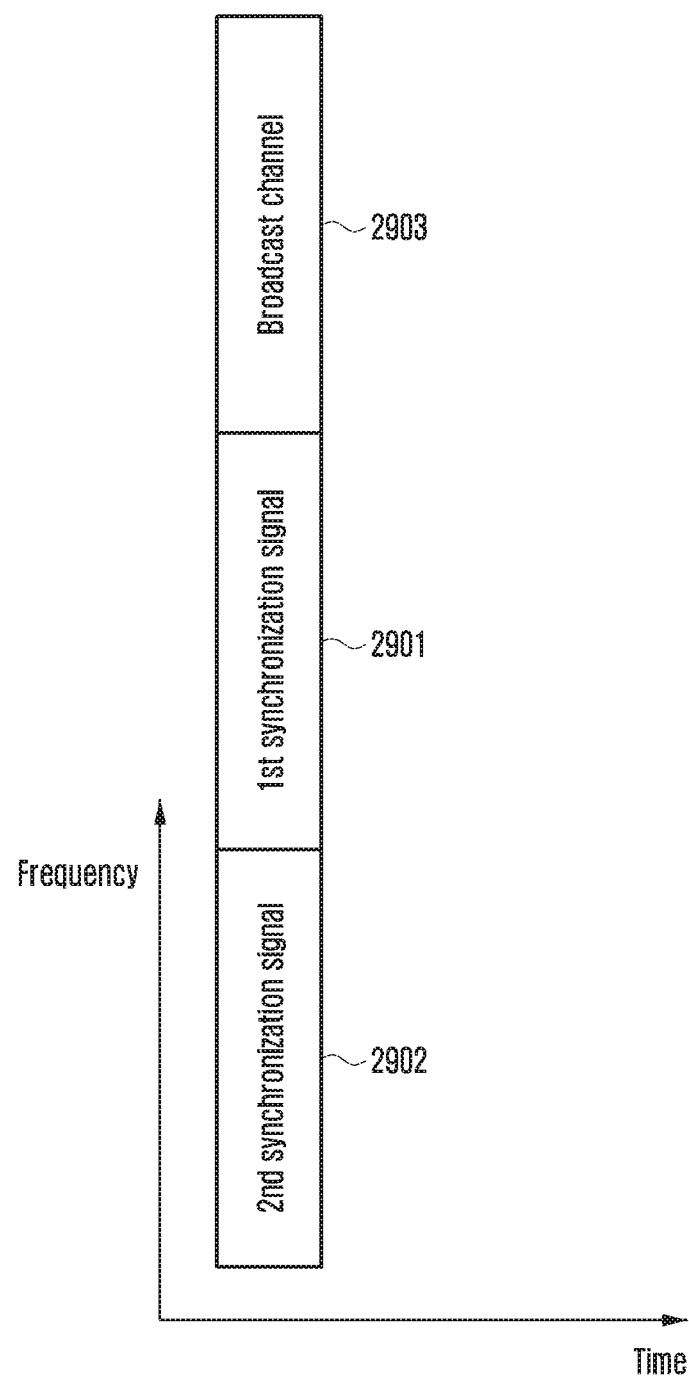
FIG. 29 is a diagram illustrating another example of a synchronization signal and broadcast channel structure of the 5G communication system according to an embodiment of the present disclosure.

FIG. 29 is a diagram illustrating another example of a synchronization signal and broadcast channel structure of the 5G communication system according to an embodiment of the present disclosure.

Referring to FIG. 29, the synchronization signal of the 5G communication system according to the present disclosure includes a first synchronization signal 2901, a second synchronization signal 2902, and a broadcast channel 2903. In FIG. 29, the first synchronization signal 2901, the second synchronization signal 2902, and the broadcast channel 2903 are located at the same time resource, and have a frequency division multiplexing structure for transmission at different frequency resources.

The first synchronization signal 2901, the second synchronization signal 2902, and the broadcast channel 2903 may be transmitted at the same OFDM symbol. Although it is proposed herein that the first synchronization signal 2901, the second synchronization signal 2902, and the broadcast channel 2903 are transmitted at the same one OFDM symbol, the present disclosure is not limited to the number of OFDM symbols used for transmission of the synchronization signals and the broadcast channel. As in LTE, the first synchronization signal 2901 may be configured using the ZC sequence having excellent cross correlation characteristics. The length of the ZC sequence and detailed frequency mapping will be described below.

While the second synchronization signal 2902 is generated by using the PN sequence or the M-sequence in LTE, the second synchronization signal 2902 according to the present disclosure may use any other sequence. For example, the synchronization signal may be configured using the ZC sequence, and a message in which the CRC is added to cell information and then a forward error correction coding is performed may be used for transmission of the second synchronization signal 2902.

In the present disclosure, it is assumed that the first synchronization signal and the second synchronization signal are transmitted with the same frequency width. The exact frequency width may vary depending on a sequence forming the synchronization signal and a method of mapping the sequence to a subcarrier of the synchronization signal.

When the first synchronization signal 2901, the second synchronization signal 2902, and the broadcast channel 2903 have a frequency division multiplexing structure as shown in FIG. 29, there is a disadvantage that the coverage of the synchronization signal may be reduced. In addition, since the first synchronization signal 2901, the second synchronization signal 2902, and the broadcast channel 2903 are transmitted at different frequency positions, there is a disadvantage of failing to perform the coherent demodulation of the broadcast channel 2903 by using the second synchronization signal 2902.

However, as described above, in order for the base station to transmit the synchronization signal in the omni-direction by using a beam having a narrow beam width in case of the multi-beam based transmission of the synchronization signal, the first synchronization signal 2901, the second synchronization signal 2902, and the broadcast channel 2903 as shown in FIG. 29 should be repeatedly transmitted in various directions. Since the multi-beam base transmission of the synchronization signal and the broadcast channel uses a fixed beam pattern, it is difficult for the base station to transmit the synchronization signal and the broadcast channel on a specific beam and simultaneously transmit data to the terminal by using another beam in the same OFDM symbol. Therefore, the remaining frequency resources that do not transmit the synchronization signal and the broadcast channel in the OFDM symbol should be used only for the purpose of transmitting a common cell signal, or not used for data transmission. In the end, for the multi-beam base transmission of the synchronization signal and the broadcast channel, a structure in which the synchronization signal and the broadcast channel are frequency division multiplexed as shown in FIG. 29 is more advantageous to effective use of time and frequency resources than a structure in which the synchronization block is time division multiplexed as shown in FIG. 28.

Figure 30:
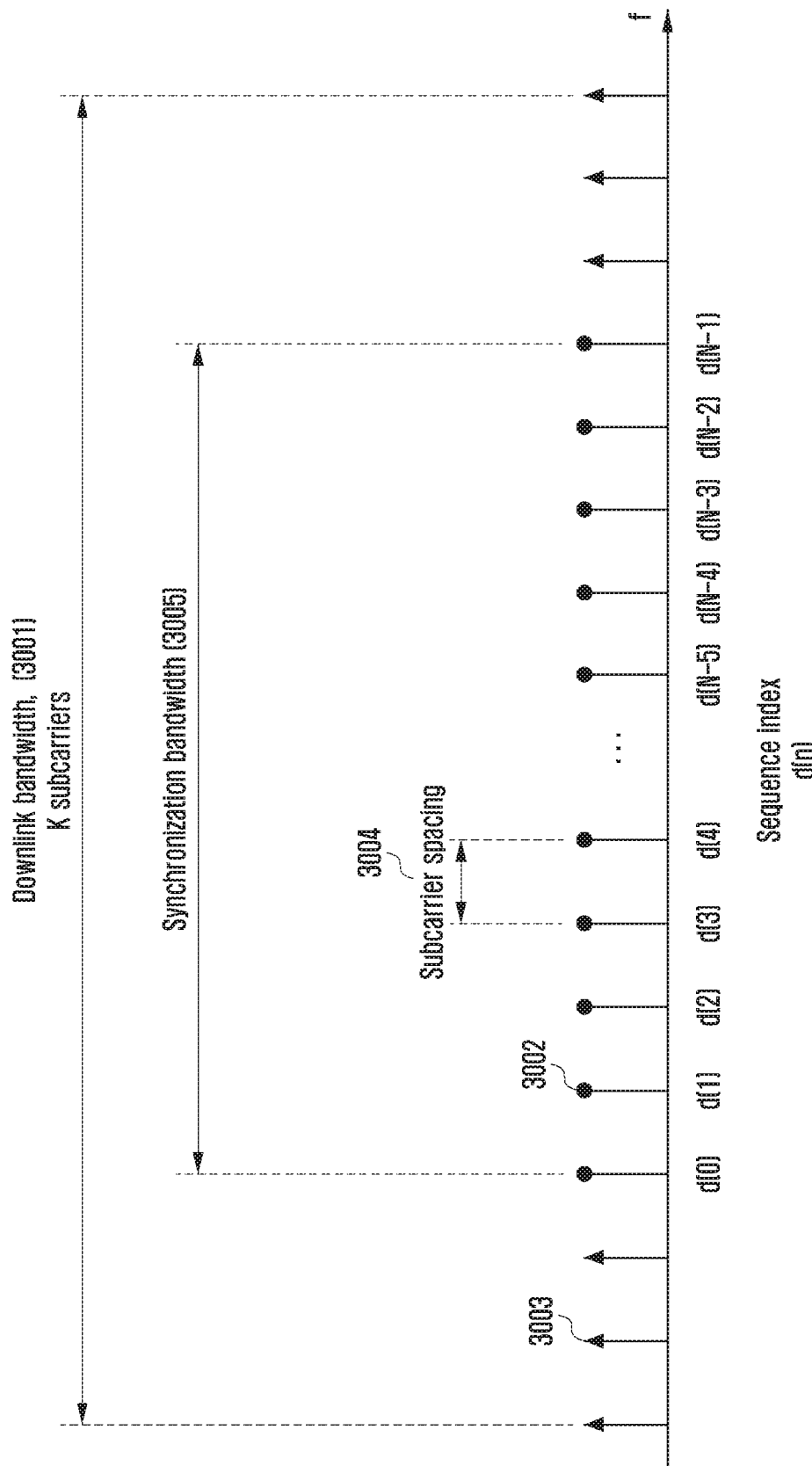
FIG. 30 is a diagram illustrating a method for generating first and second synchronization signals in the frequency domain according to an embodiment of the present disclosure.

FIG. 30 is a diagram illustrating a method for generating first and second synchronization signals in the frequency domain according to an embodiment of the present disclosure.

Referring to FIG. 30, a method for mapping the sequence of the first and second synchronization signals in the frequency domain so as to generate the first and second synchronization signals.

The OFDM symbol for transmitting a downlink signal of the 5G communication system is composed of K subcarriers in a downlink bandwidth 3001. The K subcarriers 3002 and 3003 are located in the frequency domain, being spaced apart from each other in units of subcarrier spacing 3004.

The K subcarriers that constitute the OFDM symbol through which the synchronization signal is transmitted may be classified into a subcarrier 3002 for synchronization signal transmission and a subcarrier 3003 for data transmission.

If necessary, the subcarrier 3003 for data transmission may not be used for data transmission and may not transmit any signal.

In case of the subcarrier 3002 for synchronization signal transmission, a sequence for the synchronization signal may be mapped to N subcarriers within a synchronization signal transmission bandwidth 3005. At this time, the sequence used for generation of the first and second synchronization signals also includes N samples. The number of subcarriers, N, for synchronization signal transmission may be determined by the length of the sequence used for the first and second synchronization signals. If the sequence used for the first and second synchronization signals is 'd(n) (n=0 to N−1)', d(n) is mapped from a lower subcarrier index among subcarriers existing within the synchronization signal bandwidth. The sequence for the first and second synchronization signals may be composed of one or more sequences or may be mapped to each subcarrier by modulating cell information. A method for generating the sequence for the first and second synchronization signals may vary depending on the role of each synchronization signal and required performance.

The present disclosure proposes a method and apparatus for constructing the first and second synchronization signals in the 5G communication system.

Third Embodiment—1

Proposed in the third embodiment—1 is a method for generating the first synchronization signal required for the terminal performing the initial access in the 5G communication system to perform the time and frequency synchronization with a base station signal.

In the 5G communication system according to the third embodiment—1, it is proposed that the first synchronization signal transmitted for the initial access of the terminal by the base station is generated through the ZC sequence. The length of the ZC sequence, $N_{ZC}$, may be determined according to the bandwidth used for transmission of the synchronization signal. For example, if the 5G communication system uses a bandwidth of 5 MHz for the synchronization signal and uses a subcarrier spacing of 15 kHz for OFDM signal generation, the length N of the sequence of the first synchronization signal is designed so that 15 kHz×N does not exceed 5 MHz. Equation 1 indicates the ZC sequence.

$$Z_q(n) = \exp\left(-j2\pi q \frac{n(n+1)/2}{N_{ZC}}\right), n = 0 \sim N_{ZC} - 1 \qquad \text{Equation 1}$$

Here, $Z_q(n)$ denotes the ZC sequence having a length N with respect to a root index q. Also, $N_{ZC}$ is the length of the ZC sequence, and may be expressed as a prime number not divided by any number other than 1. $Z_q(n)$ may be mapped to d(n) of FIG. 30 on a one-to-one basis.

In LTE, the first synchronization signal may transmit a part of the cell information. The first synchronization signal in LTE may transmit the cell information corresponding to 0 to 2. In LTE, this is referred to as a cell number. The cell number may be calculated as a remainder value when the cell information allocated to the base station is divided by 168. That is, the cell number has a relation of 'cell information mod 168'. The remaining cell information is referred to as a cell group number and is transmitted through the second synchronization signal. Therefore, the first synchronization signal in LTE is generated using one of the ZC sequences having three different root indexes according to the cell number allocated to the base station. For example, if the cell number is 0, the ZC sequence having a root index q of 25 is used for generating the first synchronization signal. Also, if the cell number is 1, the ZC sequence having a root index q of 29 is used for generating the first synchronization signal. Finally, if the cell number is 2, the ZC sequence having a root index q of 34 is used for generating the first synchronization signal. The terminal in the LTE system may detect the first synchronization signal and the cell number by using the first synchronization signal correlator corresponding to three different root indexes.

However, as in LTE, if the first synchronization signal is composed of one of three ZC sequences and if the terminal needs to detect it, the terminal should have hardware for detecting the three first synchronization signals. This may cause problems of increasing the complexity of terminal and the power consumption. Therefore, proposed in the present disclosure is that the first synchronization signal is generated in the same ZC sequence regardless of the cell number unique to the base station. Also, proposed is that the terminal performs only the time and frequency synchronization using the first synchronization signal and estimates the cell number using the second synchronization signal.

In the 5G communication system according to the third embodiment—1, proposed is that the second synchronization signal transmitted by the base station for initial access of the terminal is generated by the ZC sequence. In the typical LTE, the secondary synchronization signal corresponding to the second synchronization signal is generated using the PN sequence. However, since the second synchronization signal generated by the PN sequence has a relatively high peak to average power ratio (PAPR), it is difficult to apply power boosting even when the base station needs coverage extension for the synchronization signal. In addition, the secondary synchronization signal of LTE generated using the PN sequence has a problem of poor cross correlation characteristics between the secondary synchronization signals according to cell information. Such a high cross correlation value between the secondary synchronization signals may deteriorate the cell search performance using the secondary synchronization signal.

Figure 31:
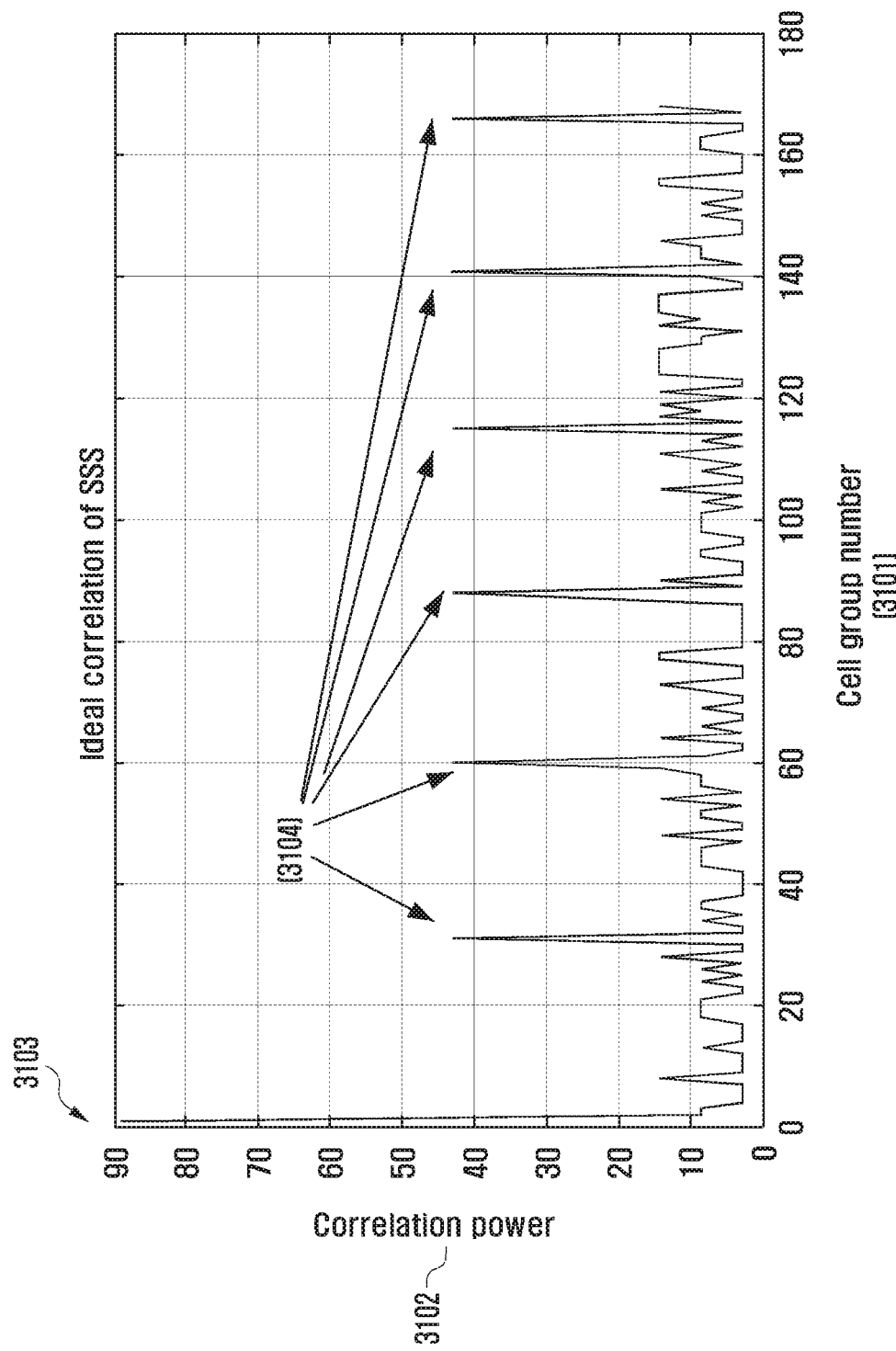
FIG. 31 is a diagram illustrating a cross correlation value according to cell information of a second synchronization signal used in LTE according to an embodiment of the present disclosure.

FIG. 31 is a diagram illustrating a cross correlation value according to cell information of a second synchronization signal used in LTE according to an embodiment of the present disclosure.

Referring to FIG. 31, a graph that shows the magnitude of a cross correlation value when generating the secondary synchronization signal by using the PN sequence of an arbitrary cell group number (here, in case where the cell group number is 0) and then cross-correlating this with the secondary synchronization signal generated with another cell group number corresponding to 0 to 167.

In FIG. 31, the horizontal axis 3101 represents a cell group number from 0 to 167. The vertical axis 3102 indicates the magnitude of a cross correlation when the secondary synchronization signal corresponding to a cell group number 0 is cross-correlated with the secondary synchronization signal corresponding to a cell group number on the horizontal axis 3101. As shown in FIG. 31, the secondary synchronization signal has the maximum cross-correlation value 3103 when cross-correlating with the second synchronization signal generated in the same cell group number. In addition, it can be seen that the cross-correlation value with the second synchronization signal generated with different cell group numbers is low, but the secondary synchronization signal corresponding to some specific cell group number has a high cross-correlation value 3104. As described above, a high correlation value for other cell group numbers may increase the probability of erroneously detecting the cell group number when the terminal performs a cell search process in a low signal-to-noise ratio (SNR) region. It is therefore desirable that a new sequence is used for generating the second synchronization signal of the 5G communication system.

For the above reasons, the present disclosure proposes the use of the ZC sequence for generating the second synchronization signal in the 5G communication system. In addition, the second synchronization signal may be used to transmit the cell information of the base station to the terminal in the 5G communication system. Namely, the cell number of a cell controlled by the base station may be transmitted using the second synchronization signal. As a method for transmitting the cell number by using the second synchronization signal using the ZC sequence, the present disclosure proposes the use of a cyclic shift in the time domain or frequency domain of the second synchronization signal.

A method for the base station to generate the second synchronization signal to achieve a purpose of transmitting the cell number by using a time domain cyclic shift of the second synchronization signal includes a method of mapping the ZC sequence to a subcarrier used for synchronization signal transmission. Also, the method for generating the second synchronization signal according to the above purpose includes a method of performing an inverse fast Fourier transform (IFFT) operation by inputting each subcarrier to the IFFT operation. Further, the method for generating the second synchronization signal according to the above purpose includes a method of performing a cyclic shift of an IFFT-completed signal in proportion to the cell number of a cell controlled by the base station.

Equation 2 represents an operation for performing a cyclic shift of the second synchronization signal completed with the IFFT operation in proportion to the cell number.

$$s_k(i)=s((i+k*N_{CS}) \bmod N), i=0\sim N-1 \qquad \text{Equation 2}$$

Here, $s_k(i)$ denotes a time-domain signal of the second synchronization signal that is cyclically shifted according to the cell number k. Also, s(i) denotes a result value obtained by mapping the ZC sequence to a subcarrier and performing the IFFT operation. In addition, $N_{CS}$ is a unit of basic cyclic shift according to cell number k and may be predetermined according to the maximum path delay spread value of the environment in which the 5G communication system is operated.

Then, the method for generating the second synchronization signal according to the above purpose includes a process of inserting a CP into $s_k(i)$ for protection against multipath delay and transmitting it through an antenna.

Figure 32:
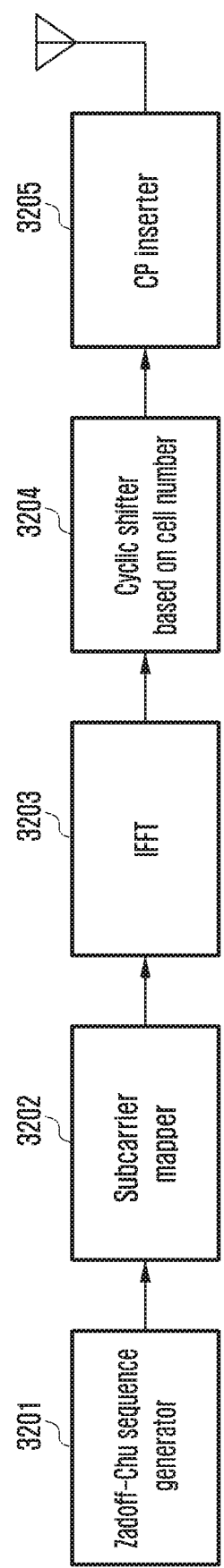
FIG. 32 is a diagram illustrating an example of an apparatus of a base station for generating a second synchronization signal in order to achieve a purpose of transmitting a cell number by using a time domain cyclic shift of the second synchronization signal according to an embodiment of the present disclosure.

FIG. 32 is a diagram illustrating an example of an apparatus of a base station for generating a second synchronization signal in order to achieve a purpose of transmitting a cell number by using a time domain cyclic shift of the second synchronization signal according to an embodiment of the present disclosure.

Referring to FIG. 32, a second synchronization signal generating unit of the base station includes a ZC sequence generator 3201, a subcarrier mapper 3202, an IFFT 3203, a cyclic shifter 3204 based on a cell number, and a CP inserter 3205.

The ZC sequence generator 3201 generates a ZC signal for generation of the second synchronization signal. The subcarrier mapper 3202 maps the ZC sequence generated by the ZC sequence generator 3201 to a subcarrier allocated for the second synchronization signal. The IFFT 3203 performs IFFT on the signal mapped to the subcarrier. The cyclic shifter 3204 based on the cell number cyclically shifts an IFFT output signal by the number of samples determined according to the cell number. The CP inserter 3205 inserts a CP into a signal delivered from the cyclic shifter 3204 based on the cell number, and then transmits the CP-inserted signal to the next RF unit and antenna.

Another method for the base station to generate the second synchronization signal to achieve the purpose of transmitting the cell number by using the time domain cyclic shift of the second synchronization signal includes a method of performing a phase rotation on the ZC sequence in proportion to the cyclic shift determined according to the cell number.

Equation 3 represents an operation for performing the phase rotation on the ZC sequence in proportion to the cyclic shift determined according to the cell number.

$$S_k(n)=Z_q(n)e^{j2\pi nk/N_{CS}} \qquad \text{Equation 3}$$

Here, $Z_q(n)$ denotes the ZC sequence used for the second synchronization signal. Also, $S_k(n)$ denotes the ZC sequence to which a phase rotation is applied according to a cell number k.

In addition, the method for generating the second synchronization signal according to the above purpose includes a method of mapping the phase rotation applied ZC sequence to a subcarrier used for synchronization signal transmission. Also, the method for generating the second synchronization signal according to the above purpose includes a method of performing the IFFT operation by entering an input to the IFFT. Then, the method for generating the second synchronization signal according to the above purpose includes a process of inserting a CP into $s_k(i)$ for protection against multipath delay and transmitting it through an antenna.

Figure 33:
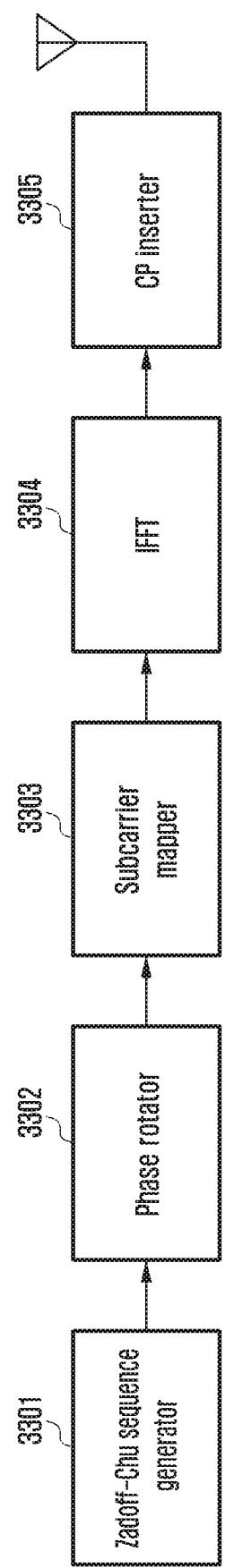
FIG. 33 is a diagram illustrating another example of an apparatus of a base station for generating a second synchronization signal in order to achieve a purpose of transmitting a cell number by using a time domain cyclic shift of the second synchronization signal according to an embodiment of the present disclosure.

FIG. 33 is a diagram illustrating another example of an apparatus of a base station for generating a second synchronization signal in order to achieve a purpose of transmitting a cell number by using a time domain cyclic shift of the second synchronization signal according to an embodiment of the present disclosure.

Referring to FIG. 33, a second synchronization signal generating unit of the base station includes a ZC sequence generator 3301, a phase rotator 3302, a subcarrier mapper 3303, an IFFT 3304, and a CP inserter 3305.

The ZC sequence generator 3301 generates a ZC signal for generation of the second synchronization signal. The phase rotator 3302 applies a phase rotation, determined by the cell number according to Equation 3, to the ZC sequence. The subcarrier mapper 3303 maps the ZC sequence phase-rotated by the phase rotator 3302 to a subcarrier allocated for the second synchronization signal. The IFFT 3304 performs IFFT on the signal mapped to the subcarrier. The CP inserter 3305 inserts a CP into an IFFT output signal and then transmits the CP-inserted signal to the next RF unit and antenna.

When the ZC sequence is used for generating the second synchronization signal and the cell number is transmitted using the time-domain cyclic shift of the second synchronization signal, the cell number that can be generated by the ZC sequence corresponding to one root index q is floor(N/$N_{CS}$) at most. Here, N is the size of the IFFT for generating the OFDM symbol. If all the cell information (e.g., 504 cell numbers) considered in the 5G communication system cannot be transmitted using the time domain cyclic shift of the second synchronization signal, the following method may be used.

1. If all the cell numbers cannot be represented using the cyclic shift in the time domain, all the cell numbers can be represented using a plurality of ZC sequences using different root indexes. For example, the second synchronization signal corresponding to a cell number required in the 5G communication system may be generated using a plurality of ZC sequences such as a root index 1 of the ZC sequence for cell numbers from 0 to floor(N/$N_{CS}$)−1, a root index 2 of the ZC sequence for cell numbers from floor(N/$N_{CS}$) to floor (N/$N_{CS}$)×2−1, and the like.

2. If all the cell numbers cannot be represented using the cyclic shift in the time domain, the remaining cell information may be included in the broadcast information. For example, when a cell number corresponding to values from 0 to floor(N/$N_{CS}$) can be transmitted through the second synchronization signal using the ZC sequence, the remaining information can be transmitted through the broadcast information. That is, if the cell numbers required in the 5G communication system are 504, the cell information transmitted through the second synchronization signal becomes floor(N/$N_{CS}$) cell numbers, and additional cell information 504/floor(N/$N_{CS}$) is transmitted through the broadcast channel. In this case, if the cell number information transmitted through the second synchronization signal is $N_{cell\_id1}$, and if the cell information transmitted through the broadcast channel is $N_{cell\_id2}$, the terminal may estimate the cell number of the base station as $N_{cell\_id1} \times (504/\text{floor}(N/N_{CS})) + N_{cell\_id2}$. At this time, the broadcast channel is scrambled only with the cell information $N_{cell\_id1}$ provided in the second synchronization signal. Therefore, the terminal should descramble the broadcast channel by using the cell information $N_{cell\_id1}$ obtained from the second synchronization signal.

The method for the base station to generate the second synchronization signal to achieve the purpose of transmitting the cell number by using the frequency domain cyclic shift of the second synchronization signal includes a method of differently mapping the ZC sequence to subcarriers used for synchronization signal transmission, depending on the cell numbers.

Equation 4 indicates an operation of cyclically shifting the ZC sequence in the frequency domain according to the cell information of a cell controlled by the base station when the second synchronization signal is generated.

$$S_k(n)=S((n+k) \bmod N), n=0 \sim N-1 \quad \text{Equation 4}$$

Here, $S_k(n)$ denotes a frequency domain signal of the second synchronization signal for transmitting a cell number k in the frequency domain. Also, S(n) denotes a ZC signal used for generating the second synchronization signal, and N denotes an FFT size.

In addition, the method for generating the second synchronization signal according to the above purpose includes a method of performing the IFFT operation by inputting each subcarrier to the IFFT. Then, the method for generating the second synchronization signal according to the above purpose includes a process of inserting a CP into an IFFT-processed signal for protection against multipath delay and transmitting it through an antenna.

Figure 34:
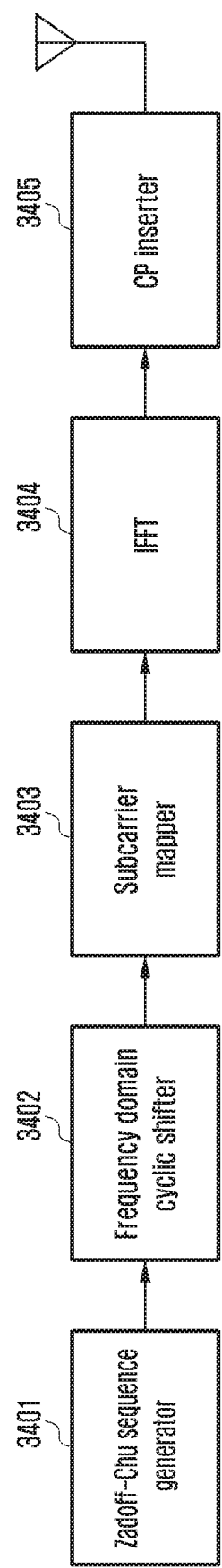
FIG. 34 is a diagram illustrating an example of an apparatus of a base station for generating a second synchronization signal in order to achieve a purpose of transmitting a cell number by using a frequency domain cyclic shift of the second synchronization signal according to an embodiment of the present disclosure.

FIG. 34 is a diagram illustrating an example of an apparatus of a base station for generating a second synchronization signal in order to achieve a purpose of transmitting a cell number by using a frequency domain cyclic shift of the second synchronization signal according to an embodiment of the present disclosure.

Referring to FIG. 34, a second synchronization signal generating unit of the base station includes a ZC sequence generator 3401, a frequency domain cyclic shifter 3402, a subcarrier mapper 3403, an IFFT 3404, and a CP inserter 3405.

The ZC sequence generator 3401 generates a ZC signal for generation of the second synchronization signal. The frequency domain cyclic shifter 3402 applies a cyclic shift, determined by the cell number according to Equation 4, to the ZC sequence. The subcarrier mapper 3403 maps the ZC sequence cyclic-shifted by the frequency domain cyclic shifter 3402 to a subcarrier allocated for the second synchronization signal. The IFFT 3404 performs IFFT on the signal mapped to the subcarrier. The CP inserter 3405 inserts a CP into an IFFT output signal and then transmits the CP-inserted signal to the next RF unit and antenna.

When the ZC sequence is used for generating the second synchronization signal and the cell number is transmitted using the frequency-domain cyclic shift of the second synchronization signal, the cell number that can be generated by the ZC sequence corresponding to one root index q is N at most. If all the cell numbers (e.g., 504 cell numbers) to be used in the 5G communication system cannot be generated using the frequency domain cyclic shift of the second synchronization signal, the following method may be used.

1. If all the cell numbers cannot be represented using the cyclic shift in the frequency domain, all the cell numbers can be represented using a plurality of ZC sequences using different root indexes. For example, the second synchronization signal corresponding to a cell number required in the 5G communication system may be generated using a plurality of ZC sequences such as a root index 1 of the ZC sequence for cell numbers from 0 to N−1, a root index 2 of the ZC sequence for cell numbers from N to N×2−1, and the like.

2. If all the cell numbers cannot be represented using the cyclic shift in the frequency domain, the remaining cell information may be included in the broadcast information. For example, when cell number information corresponding to values from 0 to N can be transmitted through the second synchronization signal using the ZC sequence, the remaining cell information can be transmitted through the broadcast information. Namely, if the cell numbers required in the 5G communication system are 504, the cell information transmitted through the second synchronization signal becomes N cell numbers, and additional cell information 504/N is transmitted through the broadcast channel. In this case, if the cell number information transmitted through the second synchronization signal is $N_{cell\_id21}$, and if the cell information transmitted through the broadcast channel is $N_{cell\_id2}$, the terminal may estimate the cell number of the base station as $N_{cell\_id1} \times (504/N) + N_{cell\_id2}$. At this time, the broadcast channel is scrambled only with the cell information $N_{cell\_id1}$ provided in the second synchronization signal. Therefore, the terminal should descramble the broadcast channel by using the cell information $N_{cell\_id1}$ obtained from the second synchronization signal.

Third Embodiment—2

The third embodiment—2 according to the present disclosure relates to the configuration of a synchronization block in the 5G communication system. As described above, the synchronization block considered in the 5G communication system includes the first synchronization signal, the second synchronization signal, and the broadcast information. A corresponding signal performs a similar purpose to the existing LTE, but may have a different structure from LTE by newly added requirements in the 5G communication system, and may be used for other purposes.

As described in the third embodiment—1 of the present disclosure, the cell information of the base station is transmitted only using the second synchronization signal in the 5G communication system. Since the amount of information on the cell information to be transmitted by the second synchronization signal is further increased in comparison with LTE, the second synchronization signal requires a transmission technique more robust against noise or interference. For this, the third embodiment—2 of the present disclosure proposes a method for repeatedly transmitting the second synchronization signal to two OFDM symbols.

Figure 35:
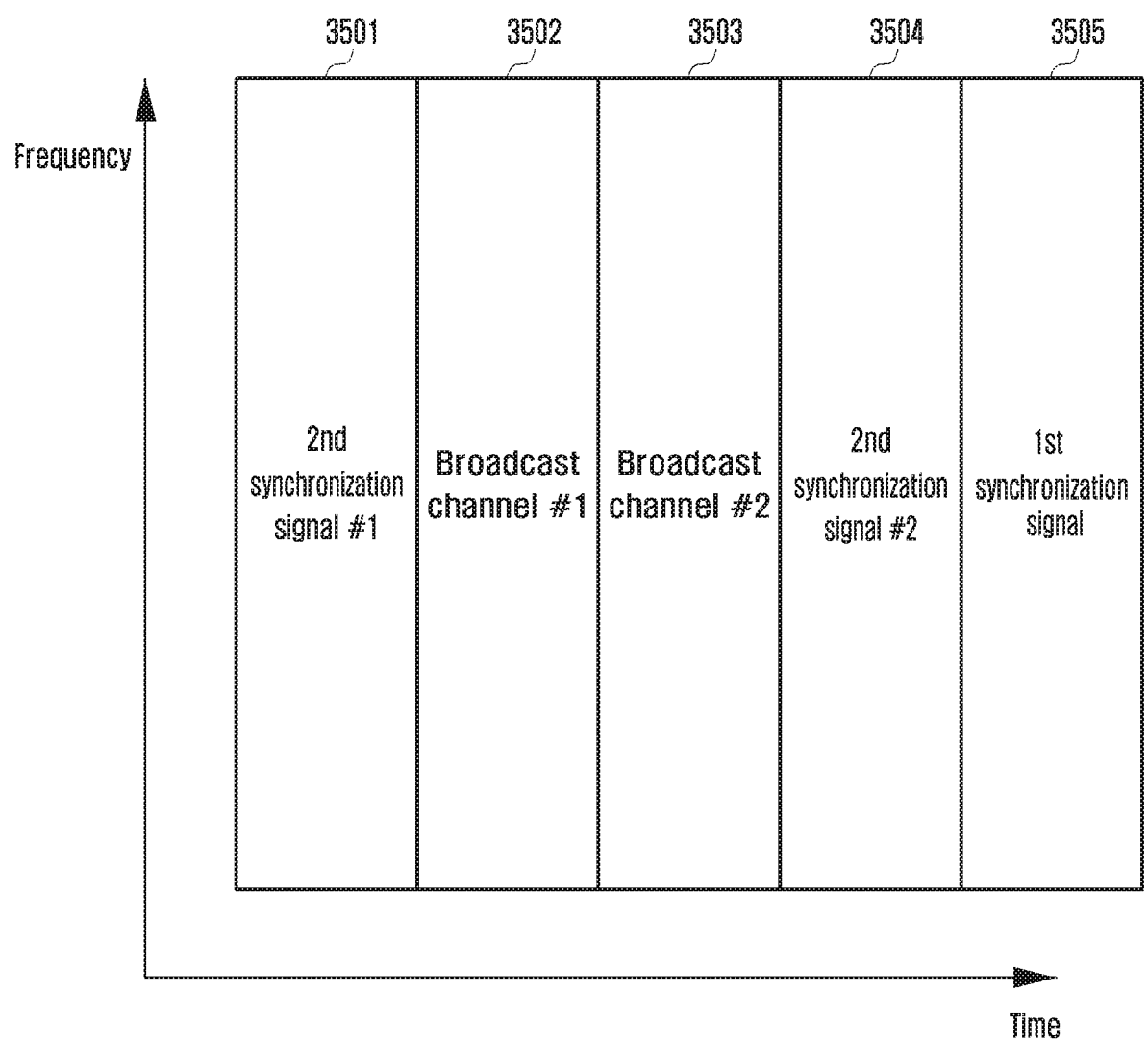
FIG. 35 is a diagram illustrating an example of multiplexing a synchronization signal and a broadcast channel in the time domain in order to construct a synchronization block in the 5G communication system according to an embodiment of the present disclosure.

FIG. 35 is a diagram illustrating an example of multiplexing a synchronization signal and a broadcast channel in the time domain in order to construct a synchronization block in the 5G communication system according to an embodiment of the present disclosure.

Referring to FIG. 35, the synchronization block considered in the 5G communication system is composed of second synchronization signals 3501 and 3504, broadcast channels 3502 and 3503, and a first synchronization signal 3505. In the synchronization block, a first symbol of the second synchronization signal 3501 (hereinafter referred to as the second synchronization signal #1) is first transmitted. Then, the broadcast channel may be transmitted in two OFDM symbols 3502 and 3503. Thereafter, a second symbol of the second synchronization signal 3504 (hereinafter referred to as the second synchronization signal #2) is transmitted. Finally, the first synchronization signal 3505 is transmitted.

In FIG. 35, two OFDM symbols 3501 and 3504 used for transmitting the second synchronization signal are composed of the same signal. That is, the two OFDM symbols

3501 and 3504 are generated using the same cell information and the same second synchronization signal generation method. However, the second synchronization signals transmitted in two OFDM symbols may be transmitted through different antenna ports. The base station transmits the second synchronization signal #1 3501 and the broadcast channel #1 3502 by using the same antenna port. Also, the base station transmits the second synchronization signal #2 3504 and the broadcast channel #2 3503 by using the same antenna port. Therefore, the terminal may obtain channel information necessary for demodulating the broadcast channel #1 3502 from the second synchronization signal #1 3501 on the assumption that the broadcast channel #1 3502 and the second synchronization signal #1 3501 are transmitted through the same antenna port. Also, the terminal may obtain channel information necessary for demodulating the broadcast channel #2 3503 from the second synchronization signal #2 3504 on the assumption that the broadcast channel #2 3503 and the second synchronization signal #2 3504 are transmitted through the same antenna port. The terminal may receive the system information transmitted through the broadcast channel by combining the broadcast channel #1 3502 and the broadcast channel #2 3503. The first synchronization signal 3505 is transmitted last among the synchronization signals and the broadcast channels that constitute the synchronization block, thus lowering the complexity of the terminal.

In the 5G communication system, it is very likely to use dynamic TDD in order to maximize the efficiency of time and frequency resources on uplink and downlink.

The TDD means that, when the base station divides time into uplink and downlink resources in the same frequency resource, the base station dynamically determines time resources of uplink and downlink according to the data traffic characteristics required in the uplink and downlink. In operating the dynamic TDD, if the base station continuously operates only an uplink subframe or slot, the base station cannot transmit a downlink control channel capable of scheduling the terminal. In addition, if the base station continuously operates only a downlink subframe or slot, the terminal cannot transmit an uplink control channel Therefore, a subframe or slot structure considered for downlink data transmission in the 5G communication system is designed to include a downlink control channel, a downlink data channel, a GAP section, and an uplink control channel in one subframe or slot. Also, a subframe or a slot structure considered for uplink data transmission in the 5G communication system is composed of a downlink control channel, a GAP section, an uplink data channel, and an uplink control channel in one subframe or slot. In the subframe and slot structure, the synchronization block composed of the first synchronization signal, the second synchronization signal, and the broadcast channel should be transmitted in the downlink transmission interval. Therefore, the synchronization block should be transmitted in an appropriate position within the subframe or slot for transmission of the synchronization block.

Additionally, in order to satisfy various services and various requirements required in the 5G communication system, it is highly possible to apply a plurality of numerologies (especially, subcarrier spacing) in one system. When a plurality of subcarrier spacing values are used, the OFDM symbol cycles are different depending on the subcarrier spacing values even if the number of OFDM symbols used for the downlink control channel, the downlink data channel, the uplink data channel, the GAP, and the uplink control channel is the same. Thus, the lengths of time during which a downlink signal and an uplink signal are transmitted in a subframe or slot may be different. Therefore, it may be difficult to transmit the synchronization signal at the same absolute time position without collision with the UL Tx interval or the GAP section in the subframe or slot regardless of all the subcarrier spacing values.

Figure 36:
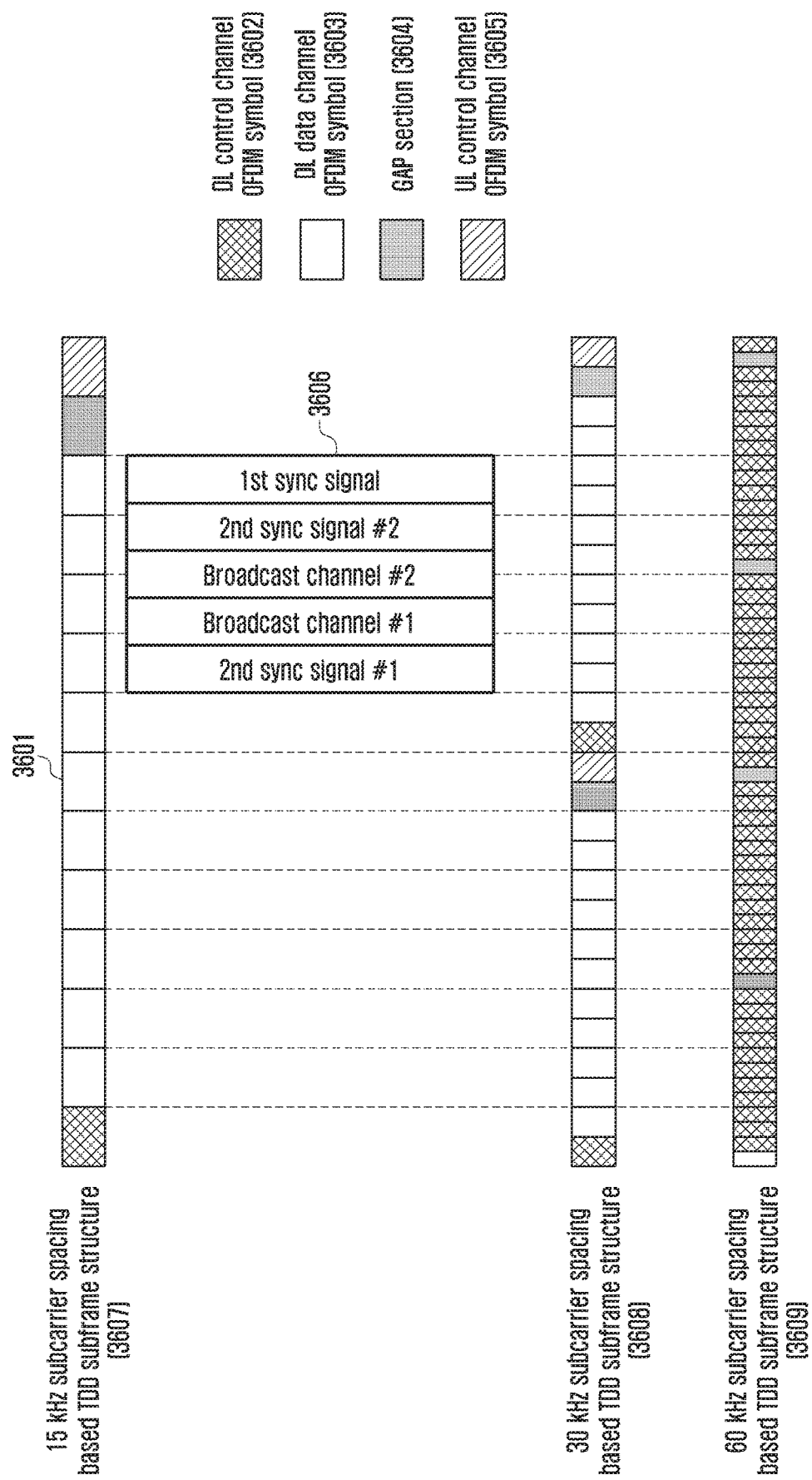
FIG. 36 is a diagram illustrating an example of a transmission timing for transmitting a synchronization signal in the 5G communication system according to an embodiment of the present disclosure.

FIG. 36 is a diagram illustrating an example of a transmission timing for transmitting a synchronization signal in the 5G communication system considered in according to an embodiment of the present disclosure.

The 5G communication system shown in FIG. 36 includes one subframe 3601 (or slot, hereinafter collectively referred to as a subframe) for efficiently supporting the dynamic TDD. In particular, the subframe 3601 through which the synchronization block is transmitted is always a subframe including an OFDM symbol 3603 for transmitting the downlink data channel. Also, the subframe 3601 through which the synchronization block is transmitted is composed of an OFDM symbol 3602 for downlink control channel transmission, a GAP section 3604, and an OFDM symbol 3605 for uplink control channel transmission. Although it is shown that the OFDM symbol 3602 for downlink control channel transmission, the GAP section 3604, and the OFDM symbol 3605 for uplink control channel transmission are all formed in one OFDM symbol, the present disclosure may alternatively use a plurality of OFDM symbols rather than one OFDM symbol.

Referring to FIG. 36, the OFDM symbol 3602 for downlink control channel transmission, the OFDM symbol 3603 for downlink data channel transmission, the GAP section 3604, and the OFDM symbol 3605 for uplink control channel transmission have different sections depending on subcarrier spacing used in OFDM. In this case, there is a need to change a transmission position of the synchronization block 3606 depending on a subframe interval used by the base station for data transmission.

For example, in the TDD subframe structure 3607 determined in units of 15 kHz subcarrier spacing as shown in FIG. 36, the base station may transmit the synchronization block 3606 through continuous OFDM symbols that do not collide with the uplink control channel section 3605 and the GAP section 3604.

FIG. 36 shows that the synchronization block 3606 is transmitted from the tenth OFDM symbol on the basis of the 15 kHz subcarrier spacing. If the base station operates the TDD subframe structure 3608 having the 30 kHz subcarrier spacing and uses the transmission time point of the synchronization block 3606 determined based on the 15 kHz subcarrier spacing, no collision occurs in the uplink control channel transmission section 3605 and the GAP section 3604.

However, if the base station operates the TDD subframe structure 3609 having the 60 kHz subcarrier spacing in FIG. 36 and uses the transmission time point of the synchronization block determined based on the 15 kHz subcarrier spacing, the synchronization block 3606 collides with the OFDM symbol 3602 for downlink control channel transmission, the GAP section 3604, and the OFDM symbol 3605 for uplink control channel transmission. In this case, the synchronization block 3606 cannot be transmitted at that transmission time point.

In order to solve the above problem that the synchronization block is overlapped with the uplink control channel or the GAP section depending on the subcarrier spacing used for data transmission, the present disclosure proposes a method for varying the timing of the OFDM symbol through which synchronization block is transmitted in a subframe depending on the subcarrier spacing used for signal transmission by the base station.

If there is no overlap with the OFDM symbol 3602 for downlink control channel transmission, the GAP section 3604, and the OFDM symbol 3605 for uplink control channel transmission in the subframe for transmission of the synchronization block, the terminal may start at any OFDM symbol. However, the reference subcarrier spacing and the CP length for determining the index of the OFDM symbol should be unvaried regardless of the subcarrier spacing and the CP length available for the base station.

In this example shown in FIG. 36, the synchronization block may begin to be transmitted only in the OFDM symbol defined by the 15 kHz subcarrier spacing regardless of the subcarrier spacing used by the base station for data transmission. Therefore, even if the base station uses the TDD subframe structure with a 60 kHz subcarrier spacing, the synchronization block may begin to be transmitted only in the OFDM symbol determined with a 15 kHz subcarrier spacing in one subframe.

The base station transmits the synchronization block in different OFDM symbol indexes depending on the subcarrier spacing used in the subframe through which the synchronization block is transmitted. Therefore, the base station needs to inform the terminal about the index of the OFDM symbol from which the synchronization block transmission starts. If the base station does not inform the index of the OFDM symbol, the terminal cannot perform synchronization for the subframe boundary.

In the present disclosure, the base station may transmit the OFDM symbol index, at which transmission of the synchronization block starts, through a broadcast channel or a separate synchronization signal. The terminal performing the initial synchronization performs time-frequency synchronization through the first and second synchronization signals, and completes a cell search. Then, through the broadcast channel or a separate synchronization signal for delivering a transmission start OFDM symbol index of the synchronization block, the terminal can know the OFDM symbol at which transmission of the synchronization block starts. At this time, the terminal cannot know the subcarrier spacing used for data transmission in the subframe including the synchronization block. Since the broadcast channel or the separate synchronization signal transmits only the OFDM symbol index, the terminal cannot know the absolute start position of the OFDM symbol in the subframe. Therefore, in calculating the absolute starting position of the OFDM symbol, the terminal may calculate the absolute start position of the OFDM symbol by using a predetermined subcarrier spacing (e.g., 15 kHz) regardless of the subcarrier spacing used for data transmission in the corresponding subframe. The terminal can synchronize the boundary of the next subframe after detecting the position of the OFDM symbol from which transmission of the synchronization block starts.

Figure 37:
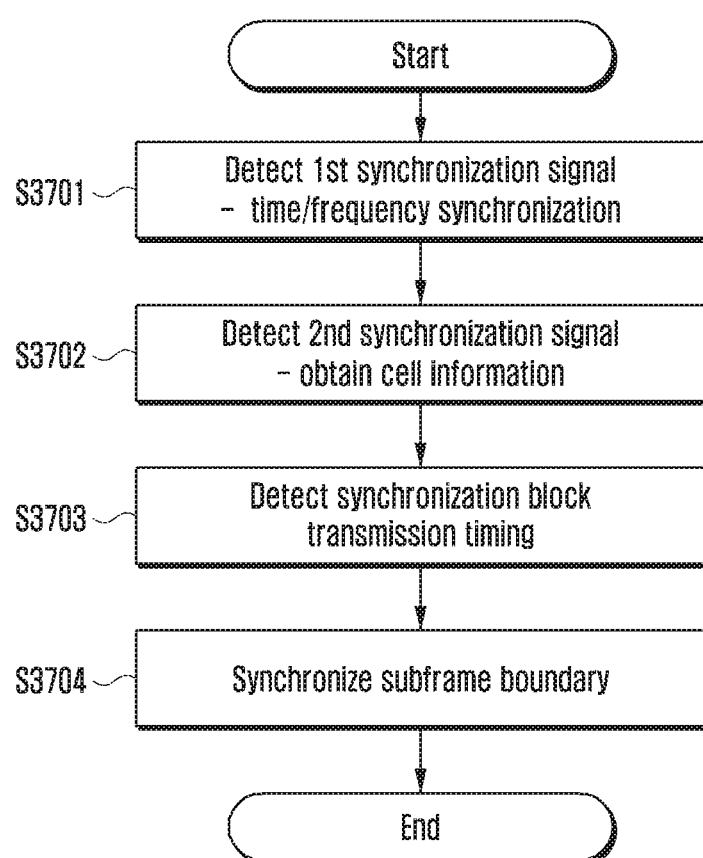
FIG. 37 is a flow diagram illustrating an example of performing a subframe boundary synchronization by a terminal in consideration of various synchronization block transmission timings in the 5G communication system according to an embodiment of the present disclosure.

FIG. 37 is a flow diagram illustrating an example of performing a subframe boundary synchronization by a terminal in consideration of various synchronization block transmission timings in the 5G communication system considered according to an embodiment of the present disclosure.

Referring to FIG. 37, the terminal performs synchronization and cell search using the synchronization block and then completes the subframe boundary synchronization by sequentially performing a first synchronization signal detection S3701, a second synchronization signal detection S3702, a synchronization block transmission timing detection S3703, and a subframe boundary synchronization S3704.

At the first synchronization signal detection operation S3701, the terminal detects the first synchronization signal, performs time synchronization on the OFDM symbol boundary through the first synchronization signal, and performs an approximate frequency offset estimation.

Then, the terminal performs the second synchronization signal detection operation S3702 according to a time and frequency synchronization value estimated at the first synchronization signal detection operation S3701. At this operation, the terminal detects a cell number of the base station to be accessed using the second synchronization signal.

Thereafter, the terminal detects the synchronization block transmission timing at operation S3703. When the base station transmits the synchronization block transmission timing information through the broadcast channel, the terminal may demodulate and decode the broadcast channel so as to obtain the position information of the OFDM symbol at which transmission of the synchronization block starts. When the base station transmits the synchronization block transmission timing information through a separate synchronization signal, the terminal may use the cross correlation of the separate synchronization signal similarly to the detection of the second synchronization signal so as to obtain the position information of the OFDM symbol at which transmission of the synchronization block starts.

Then, at operation S3704, the terminal may obtain the boundary synchronization of the subframe according to the transmission start OFDM symbol position of the synchronization block in the subframe through which the synchronization block is transmitted.

In order to solve the above problem that the synchronization block is overlapped with the uplink control channel or the GAP section depending on the subcarrier spacing used for data transmission, the present disclosure proposes a method for varying the timing of the OFDM symbol for transmission of the synchronization block depending on the subcarrier spacing used for signal transmission by the base station.

The terminal may start the transmission of the synchronization block at a fixed OFDM symbol which is not overlapped with the OFDM symbol 3602 for downlink control channel transmission, the GAP section 3604, and the OFDM symbol 3605 for uplink control channel transmission in a subframe for the synchronization block transmission. The position of the fixed OFDM symbol at which the transmission of the synchronization block starts may have different OFDM symbol indexes according to the subcarrier spacing used in the corresponding subframe by the base station. The terminal performing the synchronization using the synchronization block cannot know the subcarrier spacing used by the subframe that transmits the synchronization block. Therefore, through the broadcast channel, the base station should inform the data subcarrier spacing used in the subframe that transmits the synchronization block.

The terminal performing the initial synchronization may perform time-frequency synchronization through the first and second synchronization signals, completes a cell search, and then receive subcarrier spacing information used for data transmission in the subframe including the synchronization block. Through this information, the terminal can know the OFDM symbol at which the synchronization block transmission starts. After detecting the position of this OFDM symbol, the terminal may synchronize the boundary of the next subframe.

Figure 38:
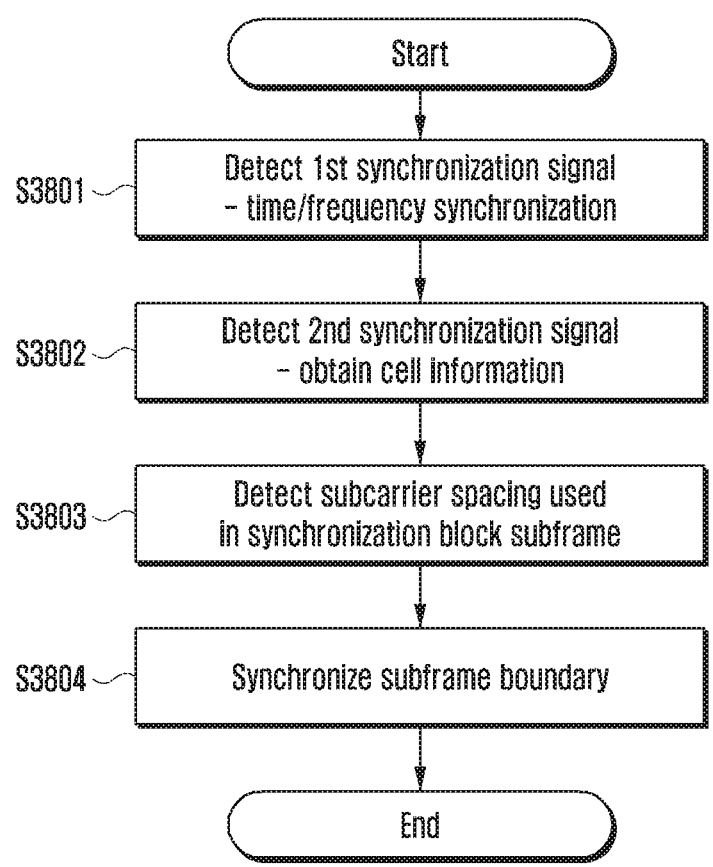
FIG. 38 is a flow diagram illustrating another example of performing a subframe boundary synchronization by a terminal when considering various synchronization block transmission timings in the 5G communication system according to an embodiment of the present disclosure.

FIG. 38 is a flow diagram illustrating another example of performing a subframe boundary synchronization by a terminal when considering various synchronization block transmission timings in the 5G communication system considered according to an embodiment of the present disclosure.

Referring to FIG. 38, the terminal performs synchronization and cell search using the synchronization block and then completes the subframe boundary synchronization by sequentially performing a first synchronization signal detection S3801, a second synchronization signal detection S3802, a detection of subcarrier spacing used in a synchronization block subframe S3803, and a subframe boundary synchronization S3804.

At the first synchronization signal detection operation S3801, the terminal detects the first synchronization signal, performs time synchronization on the OFDM symbol boundary through the first synchronization signal, and performs an approximate frequency offset estimation.

Then, the terminal performs the second synchronization signal detection operation S3802 according to a time and frequency synchronization value estimated at the first synchronization signal detection operation S3801. At this operation, the terminal detects a cell number of the base station to be accessed using the second synchronization signal.

Thereafter, the terminal detects the subcarrier spacing used in the subframe having the synchronization block by demodulating and decoding the broadcast information at operation S3803. Since the OFDM symbol index for synchronization block transmission is predetermined for each corresponding subcarrier, the terminal can know the OFDM symbol through which the synchronization block is transmitted. Then, at operation S3804, the terminal may obtain the boundary synchronization of the subframe according to the transmission start OFDM symbol position of the synchronization block in the subframe through which the synchronization block is transmitted.

Third Embodiment—3

The 5G communication system should be designed with emphasis on compatibility such that any future service can be able to freely operate within the 5G communication system framework. In order to provide future compatibility, the 5G communication system does not consider a cell-reference reference signal (CRS) used in LTE for terminal channel estimation, base station signal quality measurement, and path attenuation measurement. Since the CRS is always transmitted over the entire bandwidth regardless of data transmission, there is a future compatibility problem when future services are provided. Also, since the CRS should be always transmitted even when there is no signal to be transmitted by the base station, it is not desirable in view of transmission power of the base station. Therefore, the RS may be transmitted only when the base station has data to be transmitted to the terminal. However, if there is no signal always transmitted over the entire band in the 5G communication system, the terminal cannot measure the quality of the base station signal and measure the path attenuation. Therefore, the present disclosure proposes a method for using a synchronization signal for measurement of base station signal quality and measurement of path attenuation by the terminal.

In LTE, the transmission power of the synchronization signal may be determined according to the implementation of the base station. If it is desired to increase the coverage of the synchronization signal in a cell controlled by the base station, the base station may increase the transmission power for the synchronization signal. On the other hand, if it is not necessary to increase the coverage of the synchronization signal in a cell like a small cell, the transmission power for the synchronization signal may be minimized according to the required coverage.

If the transmission power of the synchronization signal is changed according to the determination of the base station, the terminal cannot accurately measure the quality of the base station signal and measure the path attenuation. In order to solve such a problem, the present disclosure proposes a method for transmitting an absolute value of transmission power used for transmission of the synchronization signal to the terminal through broadcast information. In order to achieve the above purpose, it is proposed that the synchronization block composed of the synchronization signal and the broadcast channel is transmitted with the same transmission power. In addition, the transmission power of the synchronization block may be unvaried within a time section that allows the coherent combining of the broadcast channel to extend the coverage of the broadcast channel. If the transmission power of the synchronization signal is changed within the time section of coherent combining of the broadcast channel, information of the broadcast channel is changed so that the terminal cannot perform the coherent combining of the broadcast channel Therefore, the transmission power of the synchronization block should be unvaried in a section where the base station transmits the same broadcast channel to provide the coherent combining of the broadcast channel.

Third Embodiment—4

In the synchronization procedure considered in the 5G communication system, the terminal that turns on the first time performs synchronization signal detection according to the synchronization signal transmission period assumed by the terminal. Further, the terminal attempts to detect the first and second synchronization signals generated with the pre-defined subcarriers. When the terminal completes the initial access, the terminal may receive information about an additional synchronization signal from the base station. The additional synchronization signal may exist at a different frequency location from that of the synchronization signal used for the initial access. In the 5G communication system, when the base station operates an additional synchronization signal in addition to the synchronization signal used for the initial access, setting information of the synchronization signal used to set the additional synchronization signal by the base station is as follows.

Transmission period information of additional synchronization signal
  Location of frequency resource through which the synchronization signal is transmitted
  Subcarrier spacing of the synchronization signal
  ZC sequence root index used for the synchronization signal When the terminal receives the setting information of a new synchronization signal from the base station after completing the initial access, the terminal may attempt to detect the new synchronization signal based on the synchronization signal information.

Figure 39:
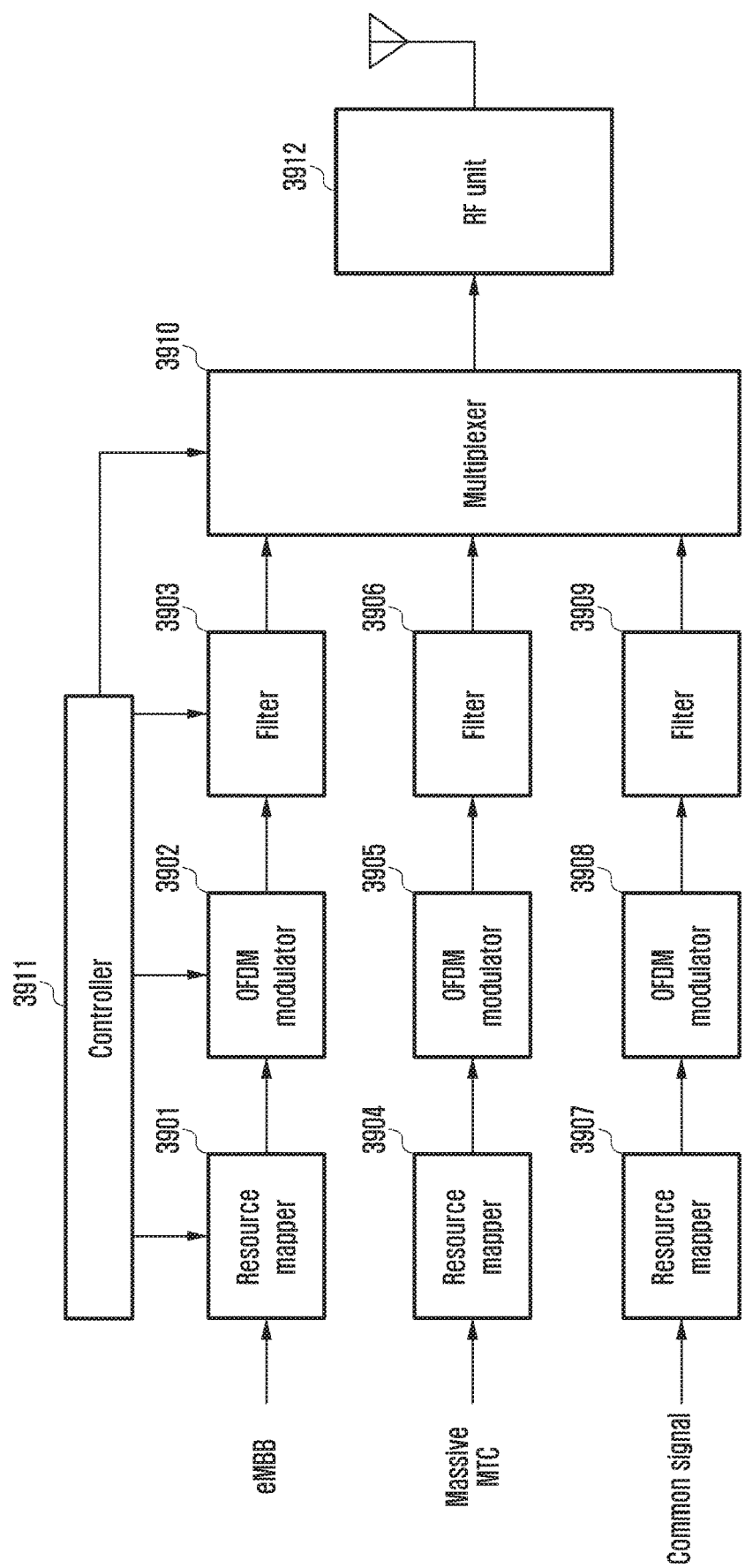
FIG. 39 is a block diagram illustrating an internal structure of a base station transmitter according to an embodiment of the present disclosure.
Figure 40:
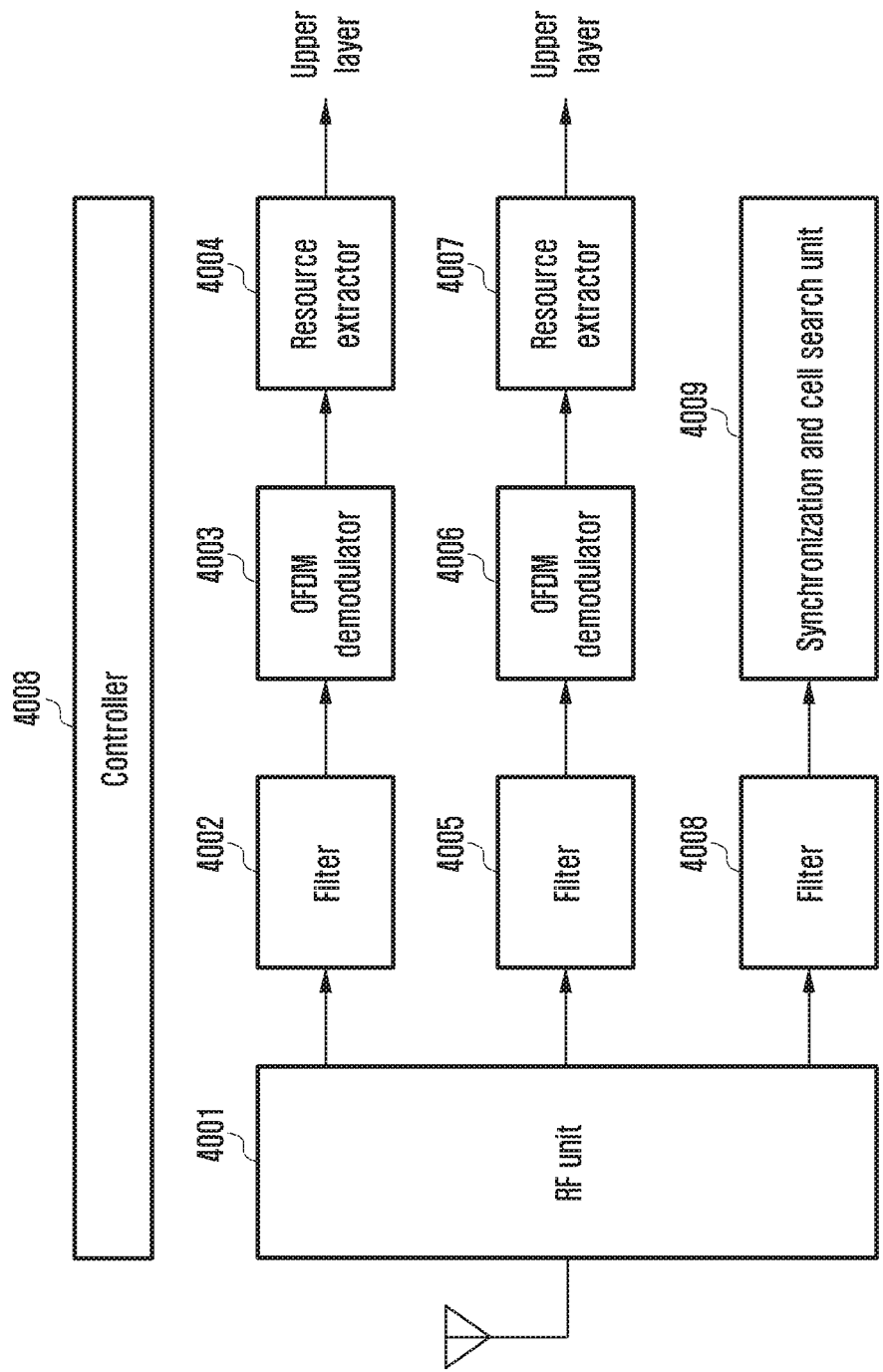
FIG. 40 is a block diagram illustrating an internal structure of a terminal receiver according to an embodiment of the present disclosure.

In order to perform the above-described embodiments of the present disclosure, a transmitter of the base station and a receiver of the terminal are shown in FIGS. 39 and 40, respectively. The transmitter of the base station and the receiver of the terminal should operate in accordance with to the initial access method and apparatus of the 5G communication system proposed in the above embodiments.

FIG. 39 is a block diagram illustrating an internal structure of a base station transmitter according to an embodiment of the present disclosure.

Referring to FIG. 39, the base station transmitter of the present disclosure includes resource mapping units 3901, 3904 and 3907, OFDM modulation units 3902, 3905 and 3908, and filters 3903, 3906 and 3909 so as to transmit signals corresponding to respective services.

The resource mapping units 3901, 3904 and 3907 perform QPSK/QAM modulation on data to be transmitted, and map the data to time and frequency domain resources.

The OFDM modulation units 3902, 3905 and 3908 perform OFDM modulation based on signals mapped by the resource mapping units 3901, 3904 and 3907. Here, the OFDM modulation includes a process of performing an IFFT and inserting a CP before the OFDM symbol.

The filters 3903, 3906 and 3909 perform filtering to satisfy a frequency band spectrum mask restriction of signals generated by the OFDM modulation units 3902, 3905 and 3908.

A physical channel and a signal for each service may be generated through the resource mapping unit, the OFDM modulation unit, and the filter which are allocated to each service. For example, in order to transmit a physical channel and a signal for supporting the eMBB service, such physical channel and signal may be generated through the resource mapping unit 3901, the OFDM modulation unit 3902, and the filter 3903 which are allocated to eMBB transmission. At this time, the resource mapping unit 3901, the OFDM modulation unit 3902, and the filter 3903 may generate a physical channel and a signal by using numerology defined for the eMBB. Similarly, a common signal includes a signal for synchronization of the terminal and system information acquisition, and a physical channel and a signal for the common signal may be generated through the resource mapping unit 3907, the OFDM modulation unit 3908, and the filter 3909 which are allocated for the common signal. At this time, the common signal may be generated using numerology defined for the common signal. Also, unlike LTE, the resource mapping unit 3907 may freely set the frequency position at which the common signal is transmitted.

The transmitter of the base station further includes a multiplexer 3910 for multiplexing respective filter outputs. In addition, the transmitter of the base station includes a controller 3911 for efficiently controlling the resource mapping units 3901, 3904 and 3907, the OFDM modulation units 3902, 3905 and 3908, the filters 3903, 3906 and 3909, and the multiplexer 3910. Finally, the transmitter of the base station includes an RF unit 3912 and an antenna for transmitting the multiplexed services to the terminals.

The structure of the base station may be applied to the first, second and other embodiments.

FIG. 40 is a block diagram illustrating an internal structure of a terminal receiver according to an embodiment of the present disclosure.

Referring to FIG. 40, the terminal receiver includes an antenna, an RF unit 4001, filters 4002, 4005 and 4008, OFDM demodulation units 4003 and 4006, resource extraction units 4004 and 4007, a controller 4008, and a synchronization and cell search unit 4009.

The filters 4002, 4005 and 4008, the OFDM demodulation units 4003 and 4006, and the resource extraction units 4004 and 4007 need several to support services having two or more different numerologies. FIG. 40 shows an example of supporting two different services.

In detail, a signal received by the terminal is converted into a baseband signal in the pass band through the RF unit 4001. The baseband signal is input to the filters 4002, 4005 and 4008. The terminal may selectively turn on or off the filters according to a service to be received, or may change the numerology of the filter. At this time, the filter is used to eliminate the interference of the signal which is FDM in the adjacent frequency region.

The synchronization and cell search unit 4009 perform the cell search and the synchronization of the terminal according to embodiments of the present disclosure.

The OFDM demodulation units 4003 and 4006 are used for OFDM demodulation of the filtered signal. The OFDM demodulation units 4003 and 4006 may include a CP removal unit and an FFT.

The resource extraction units 4004 and 4007 extract a physical channel and a signal from resources occupied by each service.

The controller 4008 may control a series of processes so that the terminal can operate according to the above-described embodiments of the present disclosure.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include read-only memory (ROM), random-access memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by a terminal in a communication system, the method comprising:
   receiving, from a base station, configuration information including measurement information of a radio link quality;
   receiving, from the base station on a physical downlink control channel, downlink control information (DCI) including a bandwidth part (BWP) indicator indicating a BWP among at least one BWP configured to the terminal;

performing a BWP switching to the BWP indicated by the BWP indicator; and monitoring, based on the measurement information, the radio link quality in the BWP according to the BWP switching.

2. The method of claim 1, wherein the BWP is a first BWP, and wherein the configuration information includes a duration of a timer after which the terminal falls back to a second BWP.

3. The method of claim 2, wherein the performing of the BWP switching further comprises:

starting the timer for the terminal; and performing BWP switching to the second BWP in case that the timer expires.

4. The method of claim 1, further comprising:

transmitting capability information including information on a BWP switch delay, wherein the BWP switching is performed within a duration determined based on the information on the BWP switch delay.

5. A method performed by a base station in a communication system, the method comprising:

transmitting, to a terminal, configuration information including measurement information of a radio link quality; and transmitting, to the terminal on a physical downlink control channel, downlink control information (DCI) including a bandwidth part (BWP) indicator indicating a BWP among at least one BWP configured to the terminal, wherein a BWP switching to the BWP indicated by the BWP indicator is performed, and wherein the radio link quality is monitored based on the measurement information, in the BWP according to the BWP switching.

6. The method of claim 1, wherein the BWP is a first BWP, and wherein the configuration information includes a duration of a timer after which the terminal falls back to a second BWP.

7. The method of claim 6, wherein the timer is started for the terminal, and wherein BWP switching to the second BWP is performed in case that the timer expires.

8. The method of claim 5, further comprising:

receiving capability information including information on a BWP switch delay, wherein the BWP switching is performed within a duration determined based on the information on the BWP switch delay.

9. A terminal in a communication system, the terminal comprising:

a transceiver; and a controller configured to:

receive, via the transceiver from a base station, configuration information including measurement information of a radio link quality, receive, via the transceiver from the base station on a physical downlink control channel, downlink control information (DCI) including a bandwidth part (BWP) indicator indicating a BWP among at least one BWP configured to the terminal, perform a BWP switching to the BWP indicated by the BWP indicator, and monitor, based on the measurement information, the radio link quality in the BWP according to the BWP switching.

10. The terminal of claim 9, wherein the BWP is a first BWP, and wherein the configuration information includes a duration of a timer after which the terminal falls back to a second BWP.

11. The terminal of claim 10, wherein the controller is further configured to:

start the timer for the terminal, and perform BWP switching to the second BWP in case that the timer expires.

12. The terminal of claim 9, wherein the controller is further configured to transmit capability information including information on a BWP switch delay, and wherein the BWP switching is performed within a duration determined based on the information on the BWP switch delay.

13. A base station in a communication system, the base station comprising:

a transceiver; and a controller configured to:

transmit, via the transceiver to a terminal, configuration information including measurement information of a radio link quality, and transmit, via the transceiver to the terminal on a physical downlink control channel, downlink control information (DCI) including a bandwidth part (BWP) indicator indicating a BWP among at least one BWP configured to the terminal, wherein a BWP switching to the BWP indicated by the BWP indicator is performed, and wherein the radio link quality is monitored based on the measurement information, in the BWP according to the BWP switching.

14. The base station of claim 13, wherein the BWP is a first BWP, and wherein the configuration information includes a duration of a timer after which the terminal falls back to a second BWP.

15. The base station of claim 14, wherein the timer is started for the terminal, and wherein BWP switching to the second BWP is performed in case that the timer expires.

16. The base station of claim 13, wherein the controller is further configured to receive capability information including information on a BWP switch delay, and wherein the BWP switching is performed within a duration determined based on the information on the BWP switch delay.

* * * * *